(12) United States Patent
Suzuki et al.

(10) Patent No.: US 6,587,410 B1
(45) Date of Patent: Jul. 1, 2003

(54) RECORDING/REPRODUCING APPARATUS AND METHOD THAT CAN RECORD/REPRODUCE A SIGNAL PROPERLY, AND TO CORRECT PHASE DIFFERENCE BETWEEN CONTROL/DRIVING SIGNALS TO APPROPRIATE LASER OF MAGNETIC DRIVE CIRCUIT

(75) Inventors: Yoshihisa Suzuki, Bisai (JP); Sayoko Tanaka, Gifu (JP)

(73) Assignee: Sanyo Electric Company, Ltd., Moriguchi (JP)

(*) Notice: Subject to any disclaimer, the term of this patent is extended or adjusted under 35 U.S.C. 154(b) by 0 days.

(21) Appl. No.: 09/649,591

(22) Filed: Aug. 29, 2000

(30) Foreign Application Priority Data

Aug. 31, 1999 (JP) .......................................... 11-245862

(51) Int. Cl.[7] ................................................. G11B 7/05
(52) U.S. Cl. .............................. 369/47.28; 369/13.02; 369/53.34
(58) Field of Search .......................... 369/47.28, 47.51, 369/47.53, 59.15, 47.4

(56) References Cited

U.S. PATENT DOCUMENTS

| 5,696,742 A | * | 12/1997 | Ogata et al. ................... 369/32 |
| 5,790,482 A | * | 8/1998 | Saga et al. ............. 369/47.51 X |
| 5,848,045 A | * | 12/1998 | Kirino et al. ............. 369/47.53 |
| 5,999,502 A | * | 12/1999 | Nakata et al. ............ 369/44.26 |
| 6,028,828 A | * | 2/2000 | Maeda ....................... 369/47.4 |
| 6,052,350 A | * | 4/2000 | Kura ....................... 369/59.15 |
| 6,055,218 A | * | 4/2000 | Takeda et al. ............. 369/44.28 |
| 6,115,338 A | * | 9/2000 | Masaki et al. ........ 369/47.53 X |
| 6,144,627 A | * | 11/2000 | Muto ................... 369/53.29 X |
| 6,160,775 A | * | 12/2000 | Oohata et al. ........... 369/53.29 |
| 6,198,711 B1 | * | 3/2001 | Fujita et al. .............. 369/59.16 |
| 6,212,144 B1 | * | 4/2001 | Asano ...................... 369/47.25 |
| 6,240,056 B1 | * | 5/2001 | Tanese et al. ............. 369/47.28 |
| 6,243,326 B1 | * | 6/2001 | Sumi et al. ............. 369/59.1 X |
| 6,310,846 B1 | * | 10/2001 | Fuji ..................... 369/27.53 X |
| 6,320,832 B1 | * | 11/2001 | Nakao et al. ............. 369/47.53 |

* cited by examiner

Primary Examiner—Aristotelis M. Psitos
(74) Attorney, Agent, or Firm—Armstrong, Westerman & Hattori, LLP

(57) ABSTRACT

Various conditions such as the power of a pulse beam for recording emitted from an optical head to a magneto-optical recording medium, the power of continuous light in reproduction, the intensity of the magnetic field applied from a magnetic head, the phase difference between the magnetic field applied from the magnetic head and the pulse beam emitted from the optical head, and the equalizer coefficient of an equalizer are optimized based on the error rate of a reproduced signal by actually recording a signal to a magneto-optical recording medium and reproducing the recorded signal. A signal is recorded and/or reproduced to/from a magneto-optical recording medium according to the optimized conditions. A control circuit provides control of a servo circuit, an equalizer, a laser drive circuit and a magnetic head drive circuit. As a result, the phase difference between a pulse beam and a magnetic field, the intensity of a pulse beam, and intensity of a magnetic field in recording a signal, and also the intensity of a laser beam and the coefficient of an equalizer to remove waveform interference in reproducing a signal are optimized to carry out recording and/or reproduction of a signal correctly to and/or from a magneto-optical recording medium according to the optimized result.

9 Claims, 21 Drawing Sheets

RECORDING/REPRODUCING APPARATUS AND METHOD THAT CAN RECORD/ REPRODUCE A SIGNAL PROPERLY, AND TO CORRECT PHASE DIFFERENCE BETWEEN CONTROL/DRIVING SIGNALS TO APPROPRIATE LASER OF MAGNETIC DRIVE CIRCUIT

BACKGROUND OF THE INVENTION

1. Field of the Invention

The present invention relates to a signal recording/reproduction method and apparatus that optimizes the laser beam intensity, magnetic field intensity, phase difference between a laser beam and a magnetic field, and an equalizer coefficient according to a reproduced signal in recording and/or reproducing a signal to and/or from a magneto recording medium to record and/or reproduce a signal to and/from a magneto-optical recording medium according to the optimized results.

2. Description of the Background Art

Attention is focused on a magneto-optical recording medium as a rewritable and reliable recording medium of large storage capacity. Magneto-optical recording media are now being adapted to practical use as a computer memory or the like. Standardization of a magneto-optical recording medium having a recording capacity of 6.0 Gbytes is in progress for practical applications. Reproduction of a signal from such a magneto-optical recording medium of high density is carried out by the MSR (magnetically induced super resolution) method in which a magnetic domain of a recording layer in a magneto-optical recording medium is transferred to a region of a reproduction layer exceeding a predetermined temperature by projecting a laser beam, and detecting the transferred magnetic domain.

In recording a signal on a magneto-optical recording medium using a pulsed laser beam (referred to as "pulse beam" hereinafter) and a magnetic domain modulated by a recording signal, the phase difference between the pulse beam and the magnetic field must be optimized. There was a problem that a signal cannot be recorded properly when a magnetic field is applied at a timing where the magnetic film of the magneto-optical recording medium is not increased to the temperature that can alter the direction of magnetization by an external magnetic field.

From the standpoint of recording a signal at high density to a magneto-optical recording medium, there was a problem that a small magnetic domain cannot be formed if the intensity of the pulse beam projected on the magneto-optical recording medium is too strong since a region wider than the desired region will attain a temperature exceeding the predetermined temperature.

In the case where the intensity of the pulse beam projected on the magneto-optical recording medium is too strong during signal recording in the land/groove scheme, an adjacent land or groove will also attain a temperature higher than the predetermined temperature so that a signal already recorded will be erased.

If the intensity of the magnetic field applied on the magneto-optical recording medium during signal recording is too weak, it will be difficult to form a magnetic domain having the desired direction of magnetization in the magnetic layer. There was problem that a signal cannot be recorded properly.

Various problems are also encountered in reproducing a signal from a magneto-optical recording medium. If the intensity of the laser beam projected onto the magneto-optical recording medium is too weak, the intensity of the reproduced signal is reduced to degrade the S/N. If the intensity of the laser beam is too strong, a signal will be reproduced also from an adjacent land or groove to cause crosstalk.

There is also the case where waveform interference occurs in the magneto-optical signal reproduced by a laser beam. Since the amplitude of a magneto-optical signal with waveform interference is small, it is necessary to remove the waveform interference.

SUMMARY OF THE INVENTION

In view of the foregoing, an object of the present invention is to provide a signal recording/reproduction method and apparatus to record and/or reproduce a signal properly to and/or from a magneto-optical recording medium by optimizing the phase difference between the pulse beam and the magnetic field, the intensity of the pulse beam, and the intensity of the magnetic field in recording a signal, and also the intensity of the laser beam and the equalizer coefficient to remove waveform interference in reproducing a signal, and recording and/or reproducing a signal to and/or from a magneto-optical recording medium according to the optimized results.

According to an aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The generated first driving signal is provided to the magnetic head drive circuit.

The control circuit generates a second driving signal for the optical head to emit a pulse beam of a predetermined intensity with the phase difference from the first driving signal altered. The generated second driving signal is provided to the laser drive circuit.

The optimum phase difference between the first and second driving signals is determined according to a magneto-optical signal reproduced by the optical head corresponding to a signal recorded on the magneto-optical recording medium with the phase difference between the first and second driving signals altered according to the first and second driving signals.

According to the recording/reproduction apparatus of the present aspect, a first driving signal to apply a magnetic field is generated, in addition to a second driving signal to generate a pulse beam with the phase difference from the first driving signal altered. A predetermined signal is recorded on the magneto-optical recording medium according to the first and second driving signals. The optimum phase difference between the first and second driving signals is determined according to a magneto-optical signal which is a reproduced version of that recorded signal.

According to the invention of the present aspect, the correct phase difference can be determined to allow proper signal recording since a signal is actually recorded on a magneto-optical recording medium and the phase difference is determined according to a reproduced signal thereof.

According to another aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The first driving signal is provided to the magnetic head drive circuit.

The control circuit generates a second driving signal for the optical head to emit a pulse beam of a predetermined intensity. The second driving signal has an optimum phase difference from the first driving signal. The second driving signal is provided to the laser drive circuit.

After a signal is recorded on the magneto-optical recording medium by the first and second driving signals, the control circuit generates a third driving signal that alters the intensity of the laser beam to reproduce the recorded signal. The generated third driving signal is provided to the laser drive circuit.

The control circuit determines a provisional optimum laser beam intensity for the optical head to reproduce a signal according to a magneto-optical signal reproduced from the magneto-optical recording medium according to the third driving signal, and generates a fourth driving signal to set the intensity of the laser beam to the determined provisional optimum laser beam intensity. The generated fourth driving signal is provided to the laser drive circuit.

A provisional optimum equalizer coefficient to remove waveform interference is determined according to a magneto-optical signal removed of waveform interference corresponding to a magneto-optical signal reproduced from the magneto-optical recording medium by the optical head according to the fourth driving signal with the equalizer coefficient of the equalizer altered. The equalizer coefficient of the equalizer is set to the provisional optimum equalizer coefficient.

In the recording/reproduction apparatus of the present aspect, the phase difference is optimized between the first driving signal generating a magnetic field to be applied to the magneto-optical recording medium in signal recording and a second driving signal generating a pulse beam to be projected on the magneto-optical recording medium, followed by determination of a provisional optimum laser beam intensity in reproducing a recording signal. The equalizer coefficient of the equalizer which is one of the reproduced signal processing system is optimized provisionally according to the optimum phase difference and the provisional optimum laser beam intensity.

According to the invention of the present aspect, optimization can be effected also for the signal reproduction system in addition to the optical system that directly detects a signal from a magneto-optical recording medium.

According to a further aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The first driving signal is provided to the magnetic head drive circuit.

The control circuit generates a second driving signal for the optical head to emit a pulse beam of a predetermined intensity. The second driving signal has an optimum phase difference from the first driving signal. The second driving signal is provided to the laser drive circuit.

After a signal is recorded on the magneto-optical recording medium by the first and second driving signals, the control circuit generates a fourth driving signal to set a provisional optimum laser beam intensity to reproduce that recorded signal. The fourth driving signal is provided to the laser drive circuit.

A provisional optimum equalizer coefficient in removing waveform interference from a magneto-optical signal reproduced from the magneto-optical recording medium by the optical head using a laser beam according to the fourth driving signal is determined. The equalizer coefficient of the equalizer is set to the determined provisional optimum equalizer coefficient.

After the optimum phase difference between the first and second driving signals, the provisional optimum laser beam intensity, and the provisional optimum equalizer coefficient are determined, the control circuit generates a fifth driving signal for the magnetic head to generate a magnetic field modulated by a recording signal and having the maximum magnetic field intensity. The fifth driving signal is provided to the magnetic head drive circuit.

The control circuit generates a sixth driving signal for the optical head to emit a pulse beam whose intensity is altered. The sixth driving signal has an optimum phase difference from the fifth driving signal. The sixth driving signal is provided to the laser drive circuit.

The servo circuit is controlled so that a signal is recorded in the order of a land of a magneto-optical recording medium, a first groove adjacent to the land, and a second groove adjacent to the land, or in the order of a groove of a magneto-optical recording medium, a first land adjacent to the groove, and a second land adjacent to the groove according to the fifth and sixth driving signals.

After a signal is recorded in the order of a land, a first groove, and a second groove, or in the order of a groove, a first land, and a second land according to the fifth and sixth driving signals, an optimum pulse beam intensity is determined to record a signal according to a magneto-optical signal reproduced by the optical head corresponding to the signal recorded on the land or groove by the optimum laser beam.

In the recording/reproduction apparatus of the present aspect, after optimizing the phase difference between the first driving signal generating a magnetic field to be applied to a magneto-optical recording medium in signal recording and the second driving signal generating a pulse beam to be projected on the magneto-optical recording medium, determining a provisional optimum laser beam intensity for reproduction of a recording signal, and optimizing provisionally the equalizer coefficient of the equalizer which is one of the reproduced signal processing system according to the optimum phase difference and the provisional optimum laser beam intensity, the intensity of the pulse beam for recording a signal onto a magneto-optical recording medium is optimized based on the optimum phase difference between the magnetic field and pulse beam in recording a signal, the provisional optimum laser beam intensity for signal reproduction, and the provisional optimum equalizer coefficient.

According to the invention of the present aspect, the proper pulse beam intensity can be determined since the intensity of the pulse beam is optimized also including the signal processing system in addition to the optical head and the magnetic head. Also, the optimum pulse beam intensity can be determined in the normal usage status since the signal recorded at the land (or groove) is reproduced after recording the signal in the order of the land (or groove), the first groove adjacent to that land (or groove), and the second groove (or first land, second land) in recording a signal with the intensity of the pulse beam altered.

According to still another aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The first driving signal is provided to the magnetic head drive circuit.

The control circuit generates a second driving signal for the optical head to emit a pulse beam of a predetermined intensity. The second driving signal has an optimum phase difference from the first driving signal. The second driving signal is provided to the laser drive circuit.

After a signal is recorded on the magneto-optical recording medium by the first and second driving signals, the control circuit generates a fourth driving signal to set a provisional optimum laser beam intensity for reproduction of the recorded signal. The fourth driving signal is provided to the laser drive circuit.

The provisional optimum equalizer coefficient in removing waveform interference from a magneto-optical signal reproduced from the magneto-optical recording medium using a laser beam according to the fourth driving signal by the optical head is determined. The equalizer coefficient of the equalizer is set to that determined provisional optimum equalizer coefficient.

After the optimum phase difference between the first and second driving signals, the provisional optimum laser beam intensity, and the provisional optimum equalizer coefficient are determined, the control circuit generates a fifth driving signal for the optical head to generate a magnetic field modulated by the recording signal and having the greatest magnetic field intensity. The fifth driving signal is provided to the magnetic head drive circuit.

The control circuit generates a seventh driving signal for the optical head to emit a pulse beam having the optimum intensity to record a signal on a magneto-optical recording medium and determined using the optimum phase difference between the first and second driving signals, the provisional optimum laser beam intensity, and the provisional optimum equalizer coefficient. The seventh driving signal has an optimum phase difference from the fifth driving signal. The seventh driving signal is provided to the laser drive circuit.

The servo circuit is controlled so that a signal is recorded on a magneto-optical recording medium in the order of a land, a first groove adjacent to that land, and a second groove adjacent to the land, or in the order of a groove, a first land adjacent to that groove, and a second land adjacent to that groove, according to the fifth and seventh driving signals.

After a signal is recorded on a land, a first groove, and a second groove, or at a groove, a first land, and a second land according to the fifth and seventh driving signals, the control circuit generates an eighth driving signal for the optical head to reproduce a signal recorded at the land or groove with the intensity of the laser beam altered. The eighth driving signal is provided to the laser drive circuit.

The optimum laser beam intensity is determined according to the magneto-optical recording signal reproduced from the land or groove based on the eighth driving signal by the optical head.

In the recording/reproduction apparatus of the present aspect, after optimizing the phase difference between the first driving signal generating a magnetic field to be applied to a magneto-optical recording medium in signal recording and the second driving signal generating a pulse beam to be projected on the magneto-optical recording medium, the provisional optimum laser beam intensity in reproducing a recording signal, a provisional optimum equalizer coefficient, and the laser beam intensity in recording a signal onto a magneto-optical recording medium, the laser beam intensity in reproducing a signal is optimized using conditions already optimized or provisionally optimized.

According to the invention of the present aspect, an optimum laser beam intensity for reproduction can be determined.

According to a still further aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The first driving signal is provided to the magnetic head drive circuit.

The control circuit generates a second driving signal for the optical head to emit a pulse beam of a predetermined intensity. The second driving signal has an optimum phase difference from the first driving signal. The second driving signal is provided to the laser drive circuit.

After a signal is recorded on the magneto-optical recording medium by the first and second driving signals, the control circuit generates a fourth driving signal to set a provisional optimum laser beam intensity for reproduction of the recorded signal. The fourth driving signal is provided to the laser drive circuit.

The provisional optimum equalizer coefficient in removing waveform interference from a magneto-optical signal reproduced from the magneto-optical recording medium using a laser beam according to the fourth driving signal by the optical head is determined. The equalizer coefficient of the equalizer is set to that determined provisional optimum equalizer coefficient.

After the optimum phase difference between the first and second driving signals, the provisional optimum laser beam intensity, and the provisional optimum equalizer coefficient are determined, the control circuit generates a fifth driving signal for the magnetic head to generate a magnetic field modulated by the recording signal and having the greatest magnetic field intensity. The fifth driving signal is provided to the magnetic head drive circuit.

The control circuit generates a seventh driving signal for the optical head to emit a pulse beam having the optimum intensity to record a signal on a magneto-optical recording medium, determined using the optimum phase difference between the first and second driving signals, the previous optimum laser beam intensity, and the provisional optimum equalizer coefficient. The seventh driving signal has an optimum phase difference from the fifth driving signal. The seventh driving signal is provided to the laser drive circuit.

The servo circuit is controlled so that a signal is recorded on a magneto-optical recording medium in the order of a land, a first groove adjacent to that land, and a second groove adjacent to the land, or in the order of a groove, a first land adjacent to that groove, and a second land adjacent to that groove, according to the fifth and seventh driving signals.

After a signal is recorded at a land, a first groove, and a second groove, or at a groove, a first land, and a second land according to the fifth and seventh driving signals, the control circuit generates a ninth driving signal for the optical head to emit a laser beam of the optimum intensity to reproduce a signal recorded at the land or groove. The ninth driving signal is provided to the laser drive circuit. The optimum equalizer coefficient to remove waveform interference is determined according to a magneto-optical signal removed of waveform interference corresponding to a magneto-optical signal reproduced from the signal recorded at a land or groove according to the ninth driving signal by the optical head with the equalizer coefficient of the equalizer altered. The equalizer coefficient of the equalizer is set as the optimum equalizer coefficient.

In the recording/reproduction apparatus of the present aspect, after optimizing the phase difference between the first driving signal generating a magnetic field to be applied to the magneto-optical recording medium in signal recording and the second driving signal generating a pulse beam to be projected onto the magneto-optical recording medium, a provisional equalizer coefficient, intensity of the pulse beam in recording a signal onto a magneto-optical recording medium, and the laser beam intensity in reproducing a signal, the equalizer coefficient of the equalizer which is one of the signal processing system is optimized using conditions that are already or provisionally optimized.

According to the invention of the present aspect, the proper equalizer coefficient can be determined.

According to yet a further aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The first driving signal is provided to the magnetic head drive circuit.

The control circuit generates a second driving signal for the optical head to emit a pulse beam of a predetermined intensity. The second driving signal has an optimum phase difference from the first driving signal. The second driving signal is provided to the laser drive circuit.

After a signal is recorded on the magneto-optical recording medium by the first and second driving signals, the control circuit generates a fourth driving signal to set a provisional optimum laser beam intensity for reproduction of the recorded signal. The fourth driving signal is provided to the laser drive circuit.

The provisional optimum equalizer coefficient in removing waveform interference from a magneto-optical signal reproduced from the magneto-optical recording medium using a laser beam according to the fourth driving signal by the optical head is determined. The equalizer coefficient of the equalizer is set to that determined provisional optimum equalizer coefficient.

After the optimum phase difference between the first and second driving signals, the provisional optimum laser beam intensity, and the provisional optimum equalizer coefficient are determined, the control circuit generates a fifth driving signal for the magnetic head to generate a magnetic field modulated by the recording signal and having the greatest magnetic field intensity. The fifth driving signal is provided to the magnetic head drive circuit.

The control circuit generates a seventh driving signal for the optical head to emit a pulse beam having the optimum intensity to record a signal on a magneto-optical recording medium, determined using the optimum phase difference between the first and second driving signals, the provisional optimum laser beam intensity, and the provisional optimum equalizer coefficient. The seventh driving signal has an optimum phase difference from the fifth driving signal. The seventh driving signal is provided to the laser drive circuit.

The servo circuit is controlled so that a signal is recorded on a magneto-optical recording medium in the order of a land, a first groove adjacent to that land, and a second groove adjacent to the land, or in the order of a groove, a first land adjacent to that groove, and a second land adjacent to that groove, according to the fifth and seventh driving signals.

After a signal is recorded at a land, a first groove, and a second groove, or at a groove, a first land, and a second land according to the fifth and seventh driving signals, the control circuit generates a ninth driving signal for the optical head to emit a laser beam of the optimum intensity to reproduce a signal recorded at the land. The ninth driving signal is provided to the laser drive circuit. The equalizer coefficient of the equalizer is set to the optimum equalizer coefficient determined from the magneto-optical signal which is a reproduced version of the signal recorded at the land or groove by the optical head according to the ninth driving signal.

The control circuit generates a tenth driving signal for the magnetic head to generate a magnetic field modulated by the recording signal to be altered in intensity. The tenth driving signal has a phase identical to that of the fifth driving signal. The tenth driving signal is provided to the magnetic head drive circuit.

The optimum magnetic field intensity to record a signal is determined from the magneto-optical signal reproduced by the optical head according to the ninth driving signal corresponding to the signal recorded to the magneto-optical recording medium according to the seventh and tenth driving signals.

In the recording/reproduction apparatus of the present aspect, after optimizing the phase difference between the first driving signal generating a magnetic field to be applied to a magneto-optical recording medium and the second driving signal generating a pulse beam to be projected onto the magneto-optical recording medium in signal recording, the optimum equalizer coefficient in reproducing a recording signal, the pulse beam intensity in recording a signal onto a magneto-optical recording medium, and the laser beam intensity in reproducing a signal, the magnetic field intensity in recording a signal is optimized using the conditions already optimized.

According to the invention of the present aspect, conditions sensitive to the recording property and reproduction property of a signal are previously optimized, and other conditions are optimized based on the optimized sensitive conditions. Therefore, the conditions can be optimized efficiently and properly.

According to yet another aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The first driving signal is provided to the magnetic head drive circuit.

The control circuit generates a second driving signal for the optical head to emit a pulse beam of a predetermined intensity. The second driving signal has an optimum phase difference from the first driving signal. The second driving signal is provided to the laser drive circuit.

After a signal is recorded on the magneto-optical recording medium by the first and second driving signals, the control circuit generates a fourth driving signal to set a provisional optimum laser beam intensity for reproduction of the recorded signal. The fourth driving signal is provided to the laser drive circuit.

The provisional optimum equalizer coefficient in removing waveform interference from a magneto-optical signal reproduced from the magneto-optical recording medium using a laser beam according to the fourth driving signal by the optical head is determined. The equalizer coefficient of the equalizer is set to that determined provisional optimum equalizer coefficient.

After the optimum phase difference between the first and second driving signals, the provisional optimum laser beam intensity, and the provisional optimum equalizer coefficient are determined, the control circuit generates a fifth driving signal for the magnetic head to generate a magnetic field modulated by the recording signal and having the greatest magnetic field intensity. The fifth driving signal is provided to the magnetic head drive circuit.

The control circuit generates a seventh driving signal for the optical head to emit a pulse beam having the optimum intensity to record a signal on a magneto-optical recording medium, determined using the optimum phase difference between the first and second driving signals, the provisional optimum laser beam intensity, and the provisional optimum equalizer coefficient. The seventh driving signal has an optimum phase difference from the fifth driving signal. The seventh driving signal is provided to the laser drive circuit.

The servo circuit is controlled so that a signal is recorded on a magneto-optical recording medium in the order of a land, a first groove adjacent to that land, and a second groove adjacent to the land, or in the order of a groove, a first land adjacent to that groove, and a second land adjacent to that groove, according to the fifth and seventh driving signals.

After a signal is recorded on a land, a first groove, and a second groove, or at a groove, a first land, and a second land according to the fifth and seventh driving signals, the control circuit generates a ninth driving signal for the optical head to emit a laser beam of the optimum intensity to reproduce a signal recorded at the land. The ninth driving signal is provided to the laser drive circuit. The equalizer coefficient of the equalizer is set to the optimum equalizer coefficient determined from the magneto-optical signal which is a reproduced version of the signal recorded at the land or groove by the optical head according to the ninth driving signal.

The control circuit generates a tenth driving signal for the magnetic head to generate a magnetic field modulated by the recording signal to have intensity altered. The tenth driving signal has a phase identical to that of the fifth driving signal. The tenth driving signal is provided to the magnetic head drive circuit.

The optimum magnetic field intensity to record a signal is determined from the magneto-optical signal reproduced by the optical head according to the ninth driving signal corresponding to the signal recorded to the magneto-optical recording medium according to the seventh and tenth driving signals. The control circuit generates an eleventh driving signal having that determined intensity. The eleventh driving signal has a phase identical to that of the fifth driving signal.

A signal is recorded and/or reproduced to and/or from a magneto-optical recording medium according to the optimum phase difference, optimum equalizer coefficient, the seventh driving signal, the ninth driving signal and the eleventh driving signal.

In the signal/reproduction apparatus of the present aspect, after optimizing the phase difference between the first driving signal generating a magnetic field to be applied onto a magneto-optical recording medium in signal recording and the second driving signal generating a pulse beam projected onto a magneto-optical recording medium, the equalizer coefficient, the pulse beam intensity in recording a signal onto the magneto-optical recording medium, the laser beam intensity in reproducing a signal, and the recording magnetic field intensity, a signal is recorded and/or reproduced to and/or from a magneto-optical recording medium according to the optimized conditions.

According to the invention of the present aspect, conditions sensitive to the recording and reproduction properties of a signal are previously optimized, and other conditions optimized according to the optimized sensitive conditions. Therefore, the conditions can be optimized efficiently and properly. Correct signal recording and reproduction are allowed since a signal can be recorded or reproduced with respect to the magneto-optical recording medium according to the optimized result.

According to yet a still further aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The first driving signal is provided to the magnetic head drive circuit.

The control circuit generates a second driving signal for the optical head to emit a pulse beam of a predetermined intensity. The second driving signal has an optimum phase difference from the first driving signal. The second driving signal is provided to the laser drive circuit.

After a signal is recorded on the magneto-optical recording medium by the first and second driving signals, the control circuit generates a fourth driving signal to set a provisional optimum laser beam intensity for reproduction of the recorded signal. The fourth driving signal is provided to the laser drive circuit.

The provisional optimum equalizer coefficient in removing waveform interference from a magneto-optical signal reproduced from the magneto-optical recording medium using a laser beam according to the fourth driving signal by the optical head is determined. The equalizer coefficient of the equalizer is set to that determined provisional optimum equalizer coefficient.

After the optimum phase difference between the first and second driving signals, the provisional optimum laser beam intensity, and the provisional optimum equalizer coefficient are determined, the control circuit generates a fifth driving signal for the magnetic head to generate a magnetic field modulated by the recording signal and having the greatest magnetic field intensity. The fifth driving signal is provided to the magnetic head drive circuit.

The control circuit generates a seventh driving signal for the optical head to emit a pulse beam having the optimum intensity to record a signal on a magneto-optical recording medium, determined using the optimum phase difference between the first and second driving signals, the provisional optimum laser beam intensity, and the provisional optimum equalizer coefficient. The seventh driving signal has an optimum phase difference from the fifth driving signal. The seventh driving signal is provided to the laser drive circuit.

The servo circuit is controlled so that a signal is recorded on a magneto-optical recording medium in the order of a land, a first groove adjacent to that land, and a second groove adjacent to the land, or in the order of a groove, a first land adjacent to that groove, and a second land adjacent to that groove, according to the fifth and seventh driving signals.

After a signal is recorded on a land, a first groove, and a second groove, or at a groove, a first land, and a second land according to the fifth and seventh driving signals, the control circuit generates a ninth driving signal for the optical head to emit a laser beam of the optimum intensity to reproduce a signal recorded at the land. The ninth driving signal is provided to the laser drive circuit. The equalizer coefficient of the equalizer is set to the optimum equalizer coefficient determined from the magneto-optical signal which is a reproduced version of the signal recorded at the land or groove by the optical head according to the ninth driving signal.

The control circuit generates a tenth driving signal for the magnetic head to generate a magnetic field modulated by the recording signal to have the intensity altered. The tenth driving signal has a phase identical to that of the fifth driving signal. The tenth driving signal is provided to the magnetic head drive circuit.

The optimum magnetic field intensity to record a signal is determined from the magneto-optical signal reproduced by the optical head according to the ninth driving signal corresponding to the signal recorded to the magneto-optical recording medium according to the seventh and tenth driving signals. The control circuit generates an eleventh driving signal having that determined intensity. The eleventh driving signal has a phase identical to that of the fifth driving signal.

After the optimum phase difference and optimum equalize coefficient are determined, and after the seventh driving signal for a land or groove, the ninth driving signal and the eleventh driving signal are generated, a provisional optimum laser beam intensity for the groove or land is determined. A pulse beam having the optimum intensity and a laser beam having the optimum intensity are determined based on the determined provisional optimum laser beam intensity. The control circuit provides a twelfth driving signal to generate a pulse beam having the optimum intensity, and a thirteenth driving signal to generate a laser beam having the optimum intensity.

A signal is recording and/or reproduced to/from a magneto-optical recording medium according to the optimum phase difference, optimum equalizer coefficient, seventh driving signal, ninth driving signal, eleventh driving signal, twelfth driving signal, and thirteenth driving signal.

According to the recording/reproduction apparatus of the present aspect, the phase difference between the first driving signal generating a magnetic field to be applied to the magneto-optical recording medium in signal recording and the second driving signal generating a pulse beam to be projected to a magneto-optical recording medium, the equalizer coefficient, the pulse beam intensity in recording a signal to a magneto-optical recording medium, the laser beam intensity in reproducing a signal, and the recording magnetic field intensity are set separately for both a land and groove. When the optimized conditions differ between the land and groove, signal recording and/or reproduction with respect to the magneto-optical recording medium is carried out using respective optimum conditions.

According to the invention of the present aspect, a signal can be recorded and/or reproduced more correctly since conditions can be optimized for the land and groove respectively.

According to an additional aspect of the present invention, a recording/reproduction apparatus recording and/or reproducing a signal to and/or from a magneto-optical recording medium includes an optical head projecting laser beam onto a magneto-optical recording medium and detecting reflected light thereof, a laser drive circuit driving a semiconductor laser in the optical head, a magnetic head applying a magnetic field to the magneto-optical recording medium, a magnetic head drive circuit driving the magnetic head, and a control circuit.

The control circuit generates a first driving signal for the magnetic head to generate a magnetic field of a predetermined intensity modulated by a recording signal. The first driving signal is provided to the magnetic head drive circuit.

The control circuit generates a second driving signal for the optical head to emit a pulse beam of a predetermined intensity. The second driving signal has an optimum phase difference from the first driving signal. The second driving signal is provided to the laser drive circuit.

After a signal is recorded on the magneto-optical recording medium by the first and second driving signals, the control circuit generates a fourth driving signal to set a provisional optimum laser beam intensity for reproduction of the recorded signal. The fourth driving signal is provided to the laser drive circuit.

The provisional optimum equalizer coefficient in removing waveform interference from a magneto-optical signal reproduced from the magneto-optical recording medium using a laser beam according to the fourth driving signal by the optical head is determined. The equalizer coefficient of the equalizer is set to that determined provisional optimum equalizer coefficient.

After the optimum phase difference between the first and second driving signals, the provisional optimum laser beam intensity, and the provisional optimum equalizer coefficient are determined, the control circuit generates a fifth driving signal for the magnetic head to generate a magnetic field modulated by the recording signal and having the greatest magnetic field intensity. The fifth driving signal is provided to the magnetic head drive circuit.

The control circuit generates a seventh driving signal for the optical head to emit a pulse beam having the optimum intensity to record a signal on a magneto-optical recording medium, determined using the optimum phase difference between the first and second driving signals, the provisional optimum laser beam intensity, and the provisional optimum equalizer coefficient. The seventh driving signal has an optimum phase difference from the fifth driving signal. The seventh driving signal is provided to the laser drive circuit.

The servo circuit is controlled so that a signal is recorded on a magneto-optical recording medium in the order of a land, a first groove adjacent to that land, and a second groove adjacent to the land, or in the order of a groove, a first land adjacent to that groove, and a second land adjacent to that groove, according to the fifth and seventh driving signals.

After a signal is recorded on a land, a first groove, and a second groove, or at a groove, a first land, and a second land according to the fifth and seventh driving signals, the control circuit generates a ninth driving signal for the optical head to emit a laser beam of the optimum intensity to reproduce a signal recorded at the land. The ninth driving signal is provided to the laser drive circuit. The equalizer coefficient of the equalizer is set to the optimum equalizer coefficient determined from the magneto-optical signal which is a reproduced version of the signal recorded at the land or groove by the optical head according to the ninth driving signal.

The control circuit generates a tenth driving signal for the magnetic head to generate a magnetic field modulated by the recording signal whose intensity is altered. The tenth driving signal has a phase identical to that of the fifth driving signal. The tenth driving signal is provided to the magnetic head drive circuit.

The optimum magnetic field intensity to record a signal is determined from the magneto-optical signal reproduced by the optical head according to the ninth driving signal corresponding to the signal recorded to the magneto-optical recording medium according to the seventh and tenth driving signals. The control circuit generates an eleventh driving signal having that determined intensity. The eleventh driving signal has a phase identical to that of the fifth driving signal.

After the optimum phase difference and optimum equalize coefficient are determined, and after the seventh driving signal for a land or groove, the ninth driving signal and the eleventh driving signal are generated, a provisional optimum laser beam intensity for the groove or land is determined. A pulse beam having the optimum intensity and a laser beam having the optimum intensity are determined based on the determined provisional optimum laser beam intensity. The control circuit provides a twelfth driving signal to generate a pulse beam having the optimum intensity, and a thirteenth driving signal to generate a laser beam having the optimum intensity.

According to the optimum phase difference, the optimum equalizer coefficient, the seventh driving signal, a fourteenth driving signal having as an amplitude the average of the amplitude of the ninth and twelfth driving signals and a phase identical to those of the ninth and twelfth driving signals, and a fifteenth driving signal having as the amplitude the average of the amplitude of the eleventh and thirteenth driving signals, and a phase identical to that of the eleventh and thirteenth driving signals, a signal is recording and/or reproduced to/from a magneto-optical recording medium.

In the recording/reproduction apparatus of the present aspect, the phase difference between the first driving signal generating a magnetic field to be applied to a magneto-optical recording medium in signal recording and the second driving signal generating a pulse beam to be projected onto a magneto-optical recording medium, the equalizer coefficient, the pulse beam intensity in recording a signal onto a magneto-optical recording medium, a laser beam intensity in reproducing a signal and the recording magnetic field intensity are optimized respectively for the land and groove. When the optimized conditions differ between the land and groove, a signal is recorded and/or reproduced to/from a magneto-optical recording medium using the average of respective optimum conditions.

According to the invention of the present aspect, the optimum conditions can be determined for both the land and groove.

According to another aspect of the present invention, a recording/reproduction method of recording and/or reproducing a signal to and/or from a magneto-optical recording medium includes: a first step of determining an optimum phase difference between a pulse beam and a magnetic field to record a signal onto a magneto-optical recording medium; a second step of recording a signal onto a magneto-optical recording medium using the optimum phase difference determined at the first step, reproducing that recorded signal with a laser beam whose intensity is altered, and determining a provisional optimum laser beam intensity according to the reproduced magneto-optical signal; a third step of recording a signal onto a magneto-optical recording medium using the optimum phase difference determined by the first step, and determining a provisional optimum equalizer coefficient of an equalizer that removes waveform interference of a magneto-optical signal corresponding to the recorded signal reproduced using the provisional optimum laser beam intensity determined at the second step; a fourth step of recording a signal at a land of a magneto-optical recording medium, a first groove adjacent to the land, and a second groove adjacent to the land using the optimum phase difference determined at the first step with the intensity of the pulse beam altered, and determining an optimum pulse beam intensity to record a signal according to a magneto-optical signal corresponding to the signal recorded on the land reproduced using the provisional optimum laser beam intensity determined at the second step, and the provisional optimum equalizer coefficient determined at the third step; a fifth step of recording a signal in the order of a land, a first groove, and a second groove using the pulse beam having the optimum intensity determined at the fourth step and the magnetic field having the optimum phase difference from the pulse beam determined at the first step and the maximum intensity modulated by a recording signal, reproducing the signal recorded at the land with the intensity of the laser beam altered, and determining an optimum laser beam intensity to reproduce a signal according to a magneto-optical signal removed of waveform interference corresponding to the reproduced magneto-optical signal using the provisional optimum equalizer coefficient determined at the third step; a sixth step of recording a signal in the order of a land, a first groove and a second groove using a pulse beam having the optimum intensity determined at the fourth step and a magnetic field having the optimum phase difference from the pulse beam determined at the first step and the maximum intensity modulated by a recording signal, reproducing the recorded signal on the land using the laser beam of the optimum intensity determined at the fifth step, and determining the optimum equalizer coefficient according to a magneto-optical signal removed of waveform interference corresponding to the reproduced magneto-optical signal with the equalizer coefficient altered; and a seventh step of recording a signal in the order of a land, a first groove, and a second groove using a pulse beam having the optimum intensity determined at the fourth step and a magnetic field having the optimum phase difference from the pulse beam determined at the first step and an intensity modulated by a recording signal to be altered, reproducing the signal recorded at the land using a laser beam of the optimum intensity determined at the fifth step, and determining the optimum magnetic field intensity according to a magneto-optical signal removed of waveform interference corresponding to the reproduced magneto-optical signal using the optimum equalizer coefficient determined at the sixth step.

A signal is recorded and/or reproduced to/from a magneto-optical recording medium using the phase difference determined at the first step, the optimum pulse beam intensity determined at the fourth step, the optimum laser beam intensity determined at the fifth step, the optimum equalizer coefficient determined at the sixth step, and the optimum magnetic field intensity determined at the seventh step.

In the recording/reproduction method of the present aspect, conditions sensitive to the recording and reproduction properties of signal are determined in priority. The other conditions are determined based on the determined sensitive conditions.

According to the invention of the present aspect, the conditions for signal recording and reproduction can be determined correctly.

According to a further aspect of the present invention, a recording/reproduction method of recording and/or reproducing a signal to/from a magneto-optical recording medium includes a land condition determination step of determining conditions in recording and/or reproducing a signal to/from a land of a magneto-optical recording medium, and a groove condition determination step of determining conditions in recording and/or reproducing a signal to/from a groove of a magneto-optical recording medium.

The land condition determination step includes: a first step of determining an optimum phase difference between a pulse beam and a magnetic field to record a signal onto a magneto-optical recording medium; a second step of recording a signal onto a land of a magneto-optical recording medium using the optimum phase difference determined at the first step, reproducing that recorded signal with a laser beam whose intensity is altered, and determining a provisional optimum laser beam intensity according to the reproduced magneto-optical signal; a third step of recording a signal onto a land of a magneto-optical recording medium using the optimum phase difference determined by the first step, and determining a provisional optimum equalizer coefficient of an equalizer that removes waveform interference of a magneto-optical signal corresponding to the recorded signal reproduced using the provisional optimum laser beam intensity determined at the second step; a fourth step of recording a signal at a land of a magneto-optical recording medium, a first groove adjacent to the land, and a second groove adjacent to the land using the optimum phase difference determined at the first step with the intensity of the pulse beam altered, and determining an optimum pulse beam intensity to record a signal according to a magneto-optical signal corresponding to the signal recorded on the land reproduced using the provisional optimum laser beam intensity determined at the second step, and the provisional optimum equalizer coefficient determined at the third step; a fifth step of recording a signal in the order of a land, a first groove, and a second groove using the pulse beam having the optimum intensity determined at the fourth step and the magnetic field having the optimum phase difference from the pulse beam determined at the first step and the maximum intensity modulated by a recording signal, reproducing the signal recorded at the land with the intensity of the laser beam altered, and determining an optimum laser beam intensity to reproduce a signal according to a magneto-optical signal removed of waveform interference corresponding to the reproduced magneto-optical signal using the provisional optimum equalizer coefficient determined at the third step; a sixth step of recording a signal in the order of a land, a first groove and a second groove using a pulse beam having the optimum intensity determined at the fourth step and a magnetic field having the optimum phase difference from the pulse beam determined at the first step and the maximum intensity modulated by a recording signal, reproducing the recorded signal on the land using the laser beam of the optimum intensity determined at the fifth step, and determining the optimum equalizer coefficient according to a magneto-optical signal removed of waveform interference corresponding to the reproduced magneto-optical signal with the equalizer coefficient altered; and a seventh step of recording a signal in the order of a land, a first groove, and a second groove using a pulse beam having the optimum intensity determined at the fourth step and a magnetic field having the optimum phase difference from the pulse beam determined at the first step and an intensity modulated by a recording signal to be altered, reproducing the signal recorded at the land using a laser beam of the optimum intensity determined at the fifth step, and determining the optimum magnetic field intensity according to a magneto-optical signal removed of waveform interference corresponding to the reproduced magneto-optical signal using the optimum equalizer coefficient determined at the sixth step.

The groove condition determination step includes: an eighth step of of recording a signal to a groove of a magneto-optical recording medium using the optimum phase difference determined at the first step, reproducing that recorded signal with a laser beam whose intensity is altered, and determining a provisional optimum laser beam intensity according to the reproduced magneto-optical signal; a ninth step of recording a signal in the order of a groove, a first land adjacent to the groove, and a second land adjacent to the groove using the optimum phase difference determined at the first step with the intensity of the pulse beam altered, and determining the optimum pulse beam to record a signal first step and the maximum intensity modulated by a recording signal, reproducing the signal recorded at the land with the intensity of the laser beam altered, and determining an optimum laser beam intensity to reproduce a signal according to a magneto-optical signal reproduced corresponding to the signal recorded on the groove using the provisional optimum laser beam intensity determined at the eighth step and the provisional optimum equalizer coefficient determined at the sixth step; and a tenth step of recording a signal in the order of a groove, a first land and a second land using a pulse beam having the optimum intensity determined at the ninth step and a magnetic field having the optimum phase difference from the pulse beam determined at the first step and the maximum intensity modulated by a recording signal, reproducing the recorded signal on the groove with the intensity of the laser beam altered, and determining the optimum laser beam intensity according to a magneto-optical signal removed of waveform interference corresponding to the reproduced magneto-optical signal using the optimum equalizer coefficient determined at the sixth step.

A signal is recorded and/or reproduced to/from a magneto-optical recording medium using the phase difference determined at the first step, the optimum pulse beam intensity determined at the fourth step, the optimum laser beam intensity determined at the fifth step, the optimum equalizer coefficient determined at the sixth step, the optimum magnetic field intensity determined at the seventh step, the optimum pulse beam determined at the ninth step, and the optimum laser beam intensity determined at the tenth step.

In the recording/reproduction method of the present aspect, conditions are optimized independently for the land and groove of a magneto-optical recording medium. A signal is recorded and/or reproduced to/from a land and groove according to the optimized condition.

According to the invention of the present aspect, a signal can be recorded and reproduced correctly.

According to still a further aspect of the present invention, a recording/reproduction method of recording and/or reproducing a signal to/from a magneto-optical recording medium includes a land condition determination step of determining conditions in recording and/or reproducing a signal to/from a land of a magneto-optical recording medium, and a groove condition determination step of determining conditions in recording and/or reproducing a signal to/from a groove of a magneto-optical recording medium.

The land condition determination step includes: a first step of determining an optimum phase difference between a pulse beam and a magnetic field to record a signal onto a magneto-optical recording medium; a second step of recording a signal onto a land of a magneto-optical recording medium using the optimum phase difference determined at the first step, reproducing that recorded signal with a laser beam whose intensity is altered, and determining a provisional optimum laser beam intensity according to the reproduced magneto-optical signal; a third step of recording a signal onto a land of a magneto-optical recording medium using the optimum phase difference determined by the first step, and determining a provisional optimum equalizer coefficient of an equalizer that removes waveform interference of a magneto-optical signal corresponding to the recorded signal reproduced using the provisional optimum laser beam intensity determined at the second step; a fourth step of recording a signal at a land of a magneto-optical recording medium, a first groove adjacent to the land, and a second groove adjacent to the land using the optimum phase difference determined at the first step with the intensity of the pulse beam altered, and determining an optimum pulse beam intensity to record a signal according to a magneto-optical signal corresponding to the signal recorded on the land reproduced using the provisional optimum laser beam intensity determined at the second step, and the provisional optimum equalizer coefficient determined at the third step; a fifth step of recording a signal in the order of a land, a first groove, and a second groove using the pulse beam having the optimum intensity determined at the fourth step and the magnetic field having the optimum phase difference from the pulse beam determined at the first step and the maximum intensity modulated by a recording signal, reproducing the signal recorded at the land with the intensity of the laser beam altered, and determining an optimum laser beam intensity to reproduce a signal according to a magneto-optical signal removed of waveform interference corresponding to the reproduced magneto-optical signal using the provisional optimum equalizer coefficient determined at the third step; a sixth step of recording a signal in the order of a land, a first groove and a second groove using a pulse beam having the optimum intensity determined at the fourth step and a magnetic field having the optimum phase difference from the pulse beam determined at the first step and the maximum intensity modulated by a recording signal, reproducing the recorded signal on the land using the laser beam of the optimum intensity determined at the fifth step, and determining the optimum equalizer coefficient according to a magneto-optical signal removed of waveform interference corresponding to the reproduced magneto-optical signal with the equalizer coefficient altered; and a seventh step of recording a signal in the order of a land, a first groove, and a second groove using a pulse beam having the optimum intensity determined at the fourth step and a magnetic field having the optimum phase difference from the pulse beam determined at the first step and an intensity modulated by a recording signal to be altered, reproducing the signal recorded at the land using a laser beam of the optimum intensity determined at the fifth step, and determining the optimum magnetic field intensity according to a magneto-optical signal removed of waveform interference corresponding to the reproduced magneto-optical signal using the optimum equalizer coefficient determined at the sixth step.

The groove condition determination step includes: an eighth step of of recording a signal to a groove of a magneto-optical recording medium using the optimum phase difference determined at the first step, reproducing that recorded signal with a laser beam whose intensity is altered, and determining a provisional optimum laser beam intensity according to the reproduced magneto-optical signal; a ninth step of sequentially recording a signal on the magneto-optical recording medium in the order of a groove, a first land adjacent to the groove, and a second land adjacent to the groove using the optimum phase difference determined at the first step with the intensity of the pulse beam altered, and determining the optimum pulse beam intensity to record a signal according to a magneto-optical signal reproduced corresponding to the signal recorded at the groove using the provisional optimum laser beam intensity determined at the eighth step and the optimum equalizer coefficient determined at the sixth step; and a tenth step recording a signal in the order of a groove, a first land and a second land using the pulse beam having the optimum intensity determined at the ninth step and the magnetic field having the optimum phase difference from the pulse beam determined at the first step, and the maximum intensity modulated by a recording signal, reproducing the signal recorded at the groove with the intensity of the laser beam altered, and determining the optimum laser beam intensity to reproduce a signal according to a magneto-optical signal removed of waveform interference corresponding to the reproduced magneto-optical signal using the optimum equalizer coefficient determined at the sixth step.

A signal is recorded and/or reproduced to/from a magneto-optical recording medium using the phase difference determined at the first step, the optimum laser beam intensity determined at the fifth step, the optimum equalizer coefficient determined at the sixth step, the optimum magnetic field intensity determined at the seventh step, the average between the optimum pulse beam intensity determined at the fourth step and the optimum pulse beam intensity determined at the ninth step, and the optimum laser beam intensity determined at the tenth step.

According to the recording/reproduction method of the present aspect, conditions are optimized independently for the land and groove of a magneto-optical recording medium. When the optimized conditions differ between the land and groove, a signal is recorded and/or reproduced to/from a land and groove according to conditions corresponding to the average of respective optimum values.

According to the invention of the present aspect, optimum conditions can be determined for the land and groove.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described with reference to the drawings.

Figure 1:
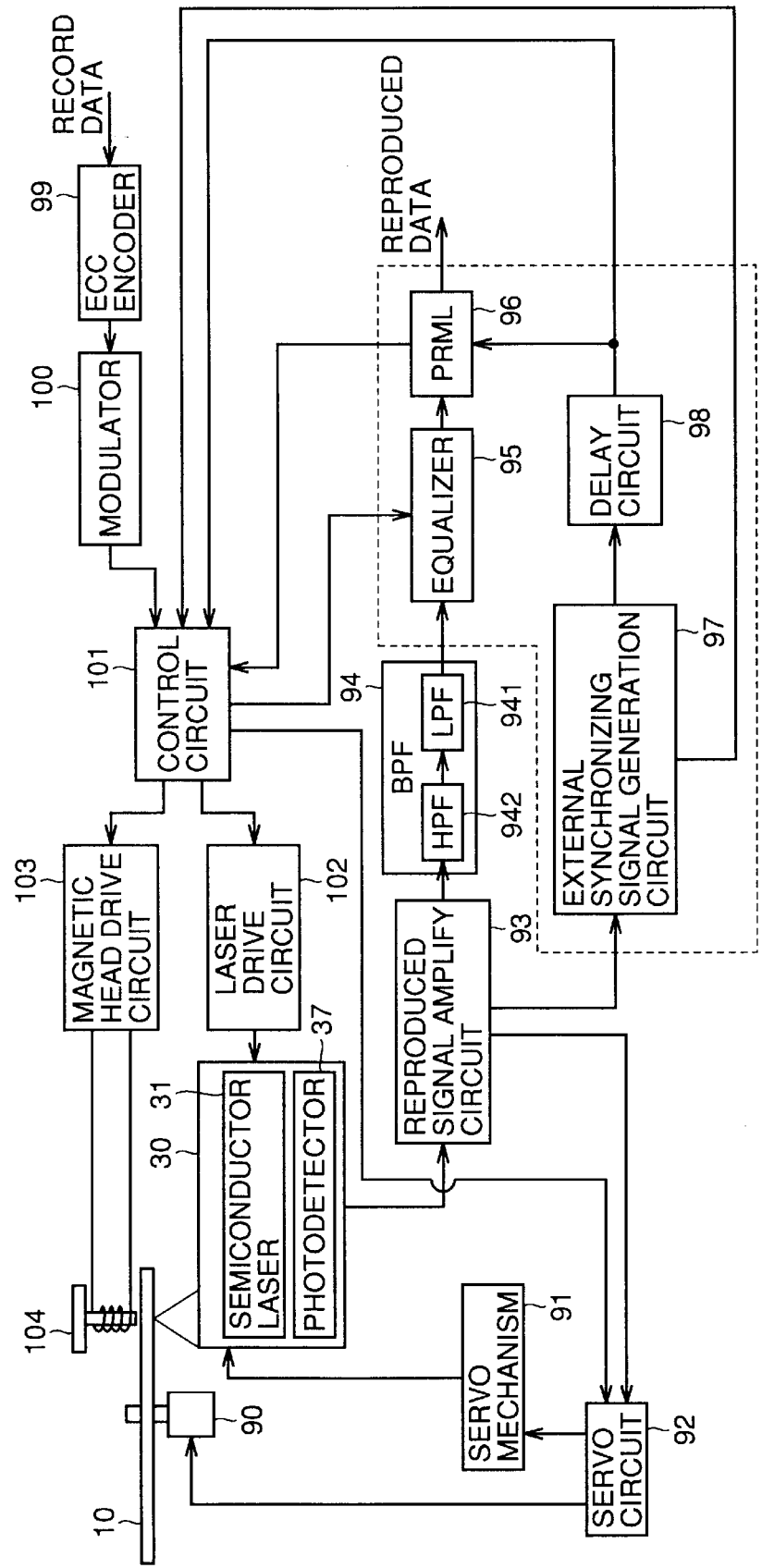
FIG. 1 is a block diagram of a recording/reproduction apparatus.

Referring to FIG. 1, a recording/reproduction apparatus of the present invention includes an optical head 30, a spindle motor 90, a servo mechanism 91, a servo circuit 92, a reproduced signal amplify circuit 93, a band pass filter (abbreviated as "BPF" hereinafter) 94, an equalizer 95, a PRML (partial response maximum likelihood) 96, an external synchronizing signal generation circuit 97, a delay circuit 98, an ECC encoder 99, a modulator 100, a control circuit 101, a laser drive circuit 102, a magnetic head drive circuit 103, and a magnetic head 104.

Optical head 30 includes a semiconductor laser 31 and a photodetector 10. A laser beam emitted from semiconductor laser 31 is projected onto a magneto-optical recording medium 10. Light reflected therefrom is detected by photodetector 37.

The wavelength of the laser beam emitted from semiconductor laser 31 is, for example, 650 (tolerance ±15) nm. However, the present invention is not limited to this wavelength, and a laser beam of a shorter wavelength of the ultraviolet region may employed.

Reproduced signal amplify circuit 93 amplifies the focus error signal detected by photodetector 37 of optical head 30, tracking error signal, address signal, optical signal, and magneto-optical signal to the predetermined intensity. The amplified focus error signal, tracking error signal and address signal are applied to servo circuit 92. The amplified optical signal is provided to external synchronizing signal generation circuit 97. The amplified magneto-optical signal is provided to BPF 94.

Servo circuit 92 controls servo mechanism 91 so as to access an arbitrary position of magneto-optical recording medium 10 according to the input address signal, and also so that the objective lens (not shown) in optical head 30 effects focus servo ON and tracking servo ON according to the focus error signal and the tracking error signal. Control is also provided so that spindle motor 90 rotates at a predetermined speed.

Servo mechanism 91 accesses an arbitrary position of magneto-optical recording medium 10 under control of servo circuit 92 and effects focus servo ON and tracking servo ON of the objective lens (not shown) in optical head 30.

Spindle motor 90 rotates magneto-optical recording medium 10 at a predetermined rotational speed under control of servo circuit 92. In the present invention, magneto-optical recording medium 10 is rotated so as to attain the linear velocity of 9.4 m/s and 11.75 m/s when the transfer rate of recording and/or reproducing a signal to/from magneto-optical recording medium 10 is 40 Mbps and 50 Mbps, respectively.

BPF 94 includes a low pass filter (LPF) 941 and a high pass filter (HPF) 942. The high frequency component of the magneto-optical signal from reproduced signal amplify circuit 93 is removed by LPF 941. The low frequency component of the magneto-optical signal is removed by HPF 942. The reference frequency to remove the high frequency component for LPF 941 is, for example, 25 MHz. The reference frequency to remove the low frequency component for HPF 942 is, for example, 1–200 KHz.

Equalizer 95 has circuitry that will be described afterwards to remove the waveform interference of a magneto-optical signal of a predetermined frequency input from BPF 94.

PRML 96 has circuitry configuration as will be described afterwards to convert the magneto-optical signal having the waveform interference removed by equalizer 95 into a digital signal, demodulate the magneto-optical signal modulated according to a predetermined scheme, correcting the error, and provide the processed data as reproduced data. Also, the number of errors is provided to control circuit 101.

External synchronizing signal generation circuit 97 generates an external synchronizing signal by a method that will be described afterwards according to the optical signal from reproduced signal amplify circuit 93. The generated external synchronizing signal is provided to delay circuit 98 and control circuit 101.

Delay circuit 98 generates a synchronizing signal corresponding to the external synchronizing signal having its phase delayed by a predetermined time. The generated synchronizing signal is provided to PRML 96 and control circuit 101.

ECC encoder 91 applies an error code to the digitized recording data.

Modulator 100 modulates the recording signal from ECC encoder 99 by a predetermined modulation scheme, for example the NRZI plus scheme.

In recording a signal to magneto-optical recording medium 10, control circuit 101 generates a driving signal modulated according to the recording signal from modulator 100 to drive magnetic head 104 in synchronization with the external synchronizing signal from external synchronizing signal generation circuit 97. This driving signal is provided to magnetic head drive circuit 103. Control circuit 101 also generates a driving signal for optical head 30 to emit a pulse beam. This driving signal is provided to laser drive circuit 102.

Driving signals are generated for the purpose of determining the optimum pulse intensity, optimum magnetic field intensity, and optimum phase difference between the pulse beam and the magnetic field in recording a signal to magneto-optical recording medium 10 and to determine the optimum laser beam intensity and optimum equalizer coefficient of equalizer 95 in reproducing a signal. The generated driving signals are provided to laser driving circuit 102 and magnetic head drive circuit 103 to provide control of servo circuit 92 and equalizer 95.

Laser drive circuit 102 drives semiconductor laser 31 in optical head 30 so that a pulse beam or a continuous beam is emitted from optical head 30 according to the driving signal from control circuit 101.

Magnetic head drive circuit 103 drives magnetic head 104 according to the driving signal from control circuit 101.

Semiconductor laser 31 in optical head 30 emits a pulse beam or a continuous beam according to the drive of laser drive circuit 102.

Magnetic head 104 applies a magnetic field to magneto-optical recording medium 10 according to the drive of magnetic head drive circuit 103.

In the recording/reproduction apparatus shown in FIG. 1, equalizer 95, PRML 96, external synchronizing signal generation circuit 97 and delay circuit 98 are formed of one LSI. Therefore, a recording/reproduction apparatus adapted with an LSI commonly having the function of the foregoing equalizer 95, PRML 96, external synchronizing signal generation circuit 97, and delay circuit 98 is included in the recording/reproduction apparatus of the present invention.

Figure 2:
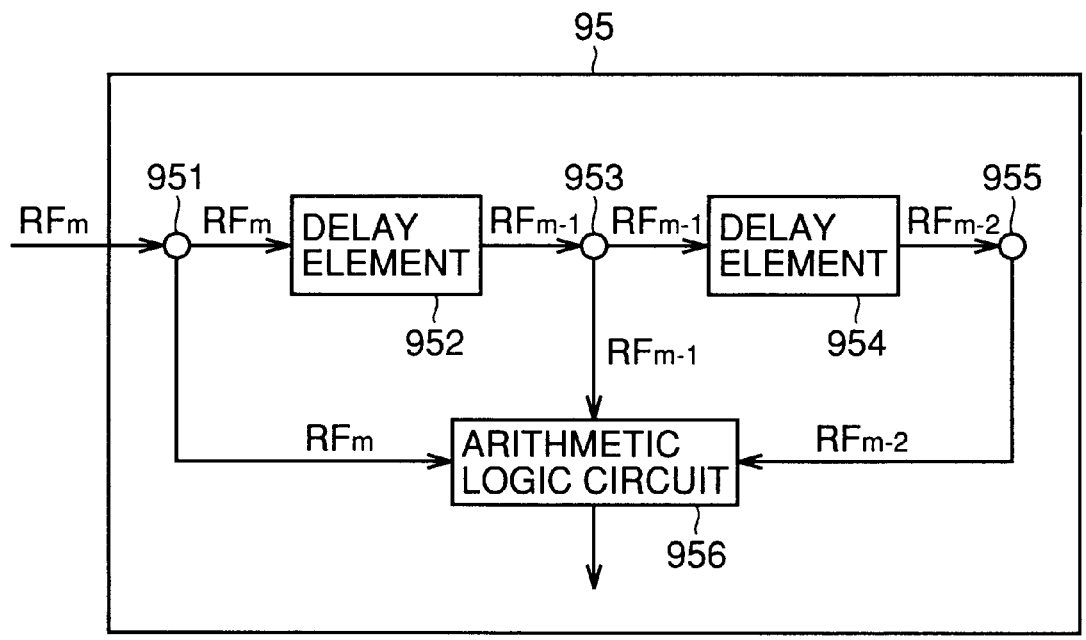
FIG. 2 shows a structure of an equalizer in the recording/reproduction apparatus of FIG. 1.

A circuit configuration of equalizer 95 will be described with reference to FIG. 2. Equalizer 95 includes a terminal 951, a delay element 952, a terminal 953, a delay element 954, a terminal 955, and an arithmetic logic circuit 956.

Delay elements 952 and 954 delay an input reproduced signal by a predetermined time for output. Arithmetic logic circuit 956 performs the operation of $RF_{m-1}-a(RF_m+RF_{m-2})$ according to a reproduced signal $RF_m$ from terminal 951, a reproduced signal $RF_{m-1}$ which is a delayed version of reproduced signal $RF_m$ by a predetermined time from terminal 953, and a reproduced signal $RF_{m-2}$ which is a delayed version of reproduced signal $RF_{m-1}$ from terminal 955 by a predetermined time.

Reproduced signal $RF_m$ from equalizer 95 is applied to delay circuit 952 and arithmetic logic circuit 956 via terminal 951. Delay circuit 952 delays reproduced signal $RF_m$ for a predetermined time, for example, one clock of the external synchronizing signal, to output reproduced signal $RF_{m-1}$. Reproduced signal $RF_{m-1}$ is applied to delay circuit 954 and arithmetic logic circuit 956 via terminal 953. Delay circuit 954 delays reproduced signal $RF_{m-1}$ by one clock of the external synchronizing signal to output reproduced signal $RF_{m-2}$. Reproduced signal $RF_{m-2}$ is applied to arithmetic logic circuit 956 via terminal 955. Arithmetic logic circuit 956 performs the operation of $RF_{m-1}-a(RF_m+RF_{m-2})$. Accordingly, the waveform interference of the reproduced signal is removed.

Figure 3:
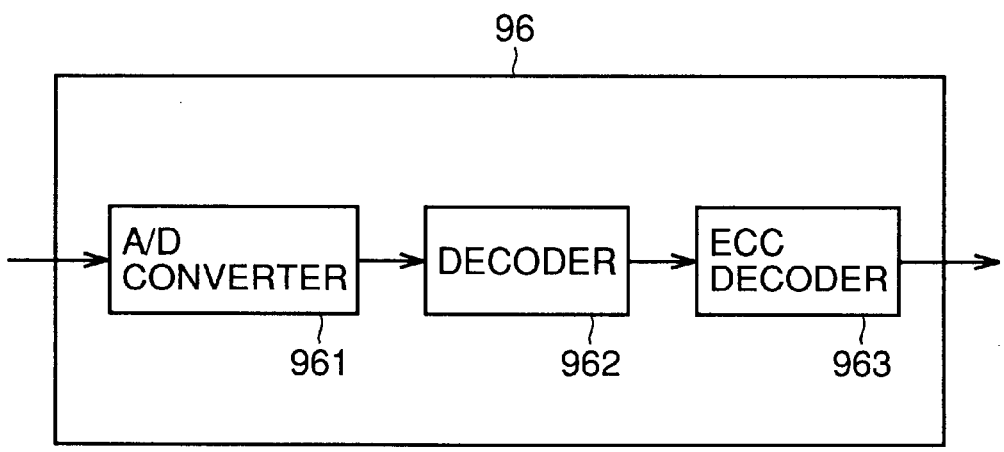
FIG. 3 shows a structure of an PRML of the recording/reproduction apparatus of FIG. 1.

The circuit configuration of PRML 96 will be described with reference to FIG. 3. PRML 96 includes an A/D converter 961, a decoder 962, and an ECC decoder 963.

A/D converter 961 converts the reproduced signal having the waveform interference removed at equalizer 95 into a digital signal. Decoder 962 decodes the reproduced signal. ECC decoder 963 corrects the error of the reproduced signal and provides the reproduced signal as reproduced data. Also, the number of errors is provided to control circuit 101.

Figure 4:
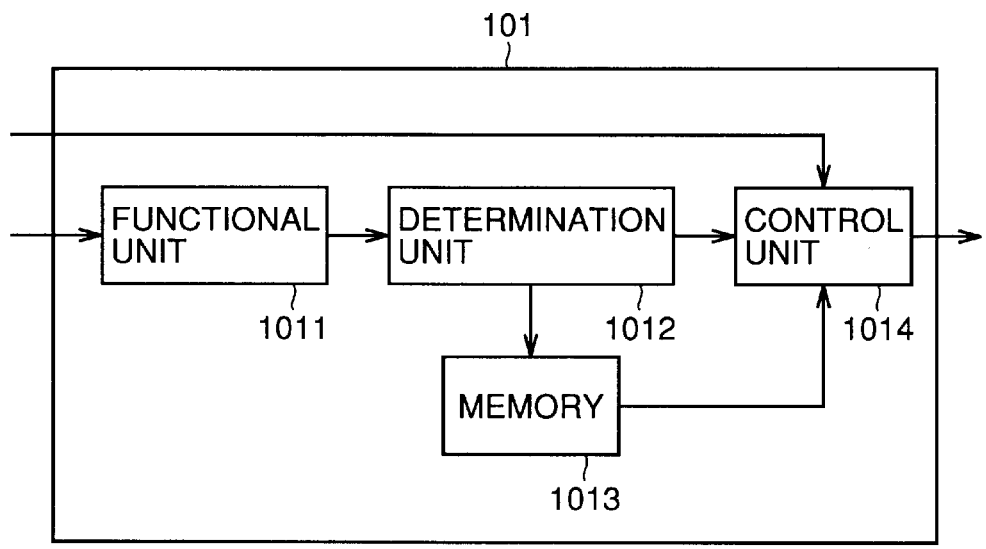
FIG. 4 shows a structure of a control circuit of the recording/reproduction apparatus of FIG. 1.

The circuit configuration of control circuit 101 will be described with reference to FIG. 4. Control circuit 101 includes a functional unit 1011, a determination unit 1012, a memory 1013 and a control unit 1014.

Functional unit 1011 calculates the error rate of the reproduced signal according to the number of errors of the reproduced signal from PRML 96. The calculated error rate is plotted against varied parameters. The result is provided to determination unit 1012.

Determination unit 1012 determines the optimum parameter by a method that will be described afterwards according to the result from functional unit 1011. The determined parameter is stored in memory 1013 and provided to control unit 1014.

Control unit 1014 generates driving signals to generate a pulse beam, continuous light, and a magnetic field according to the optimum parameter determined by determination unit 1012 and the optimum parameter stored in memory 1013. The generated driving signals are provided to laser drive circuit 102, magnetic head drive circuit 103, and to provide control of servo circuit 92 and equalizer 95.

Figure 5:
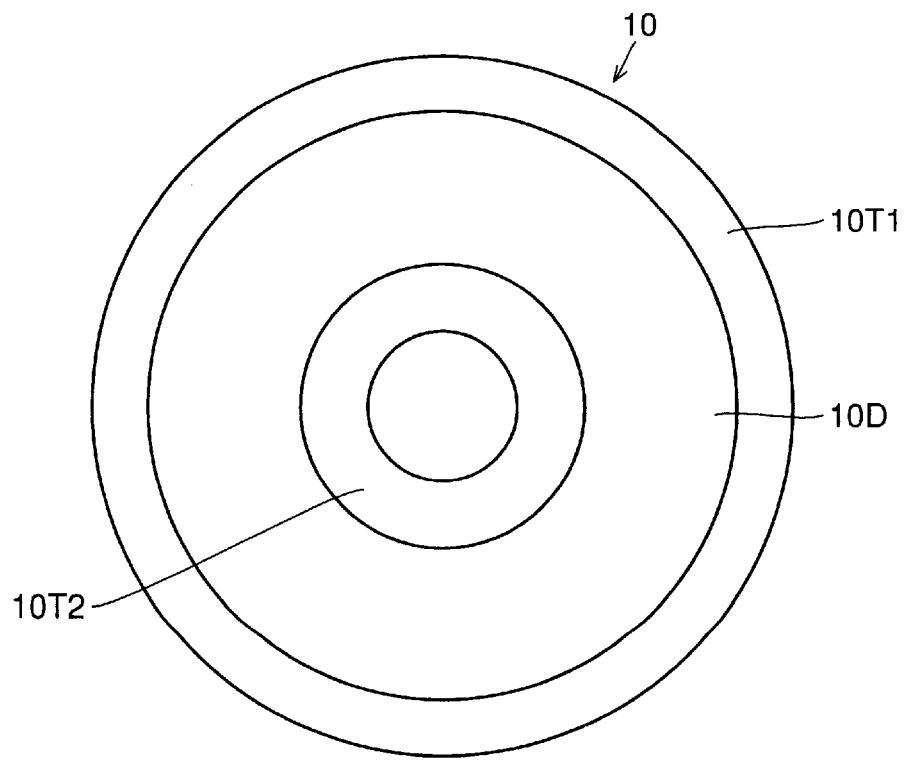
FIG. 5 is a plan view of a magneto-optical recording medium.

The planar structure of magneto-optical recording medium 10 to which and/or from which a signal is recorded and/or reproduced by the recording/reproduction apparatus of the present invention will be described with reference to FIG. 5. Magneto-optical recording medium 10 includes a planar structure of the arrangement of a TOC (table of contents) region 10T1, a data region 10D, and a TOC region 10T2 from the outer circumference. In TOC region 10T1 and TOC region 10T2, the same information is recorded by the wobble formed at the walls of both sides of a groove. The information recorded in TOC regions 10T1 and 10T2 include the pulse beam intensity, magnetic field intensity and phase difference between the pulse beam and the magnetic field in recording a signal onto magneto-optical recording medium 10, the laser beam intensity and equalizer coefficient of equalizer 95 in reproducing a signal from magneto-optical recording medium 10, and the like.

A signal is recorded and/or reproduced from the outer circumference of magneto-optical recording medium 10. Therefore, the information of TOC region 10T1 is first reproduced, and then the signal in data region 10D is recorded or reproduced. Therefore, TOC region 10T2 that is not essentially required is provided for the sake of assurance.

Figure 6:
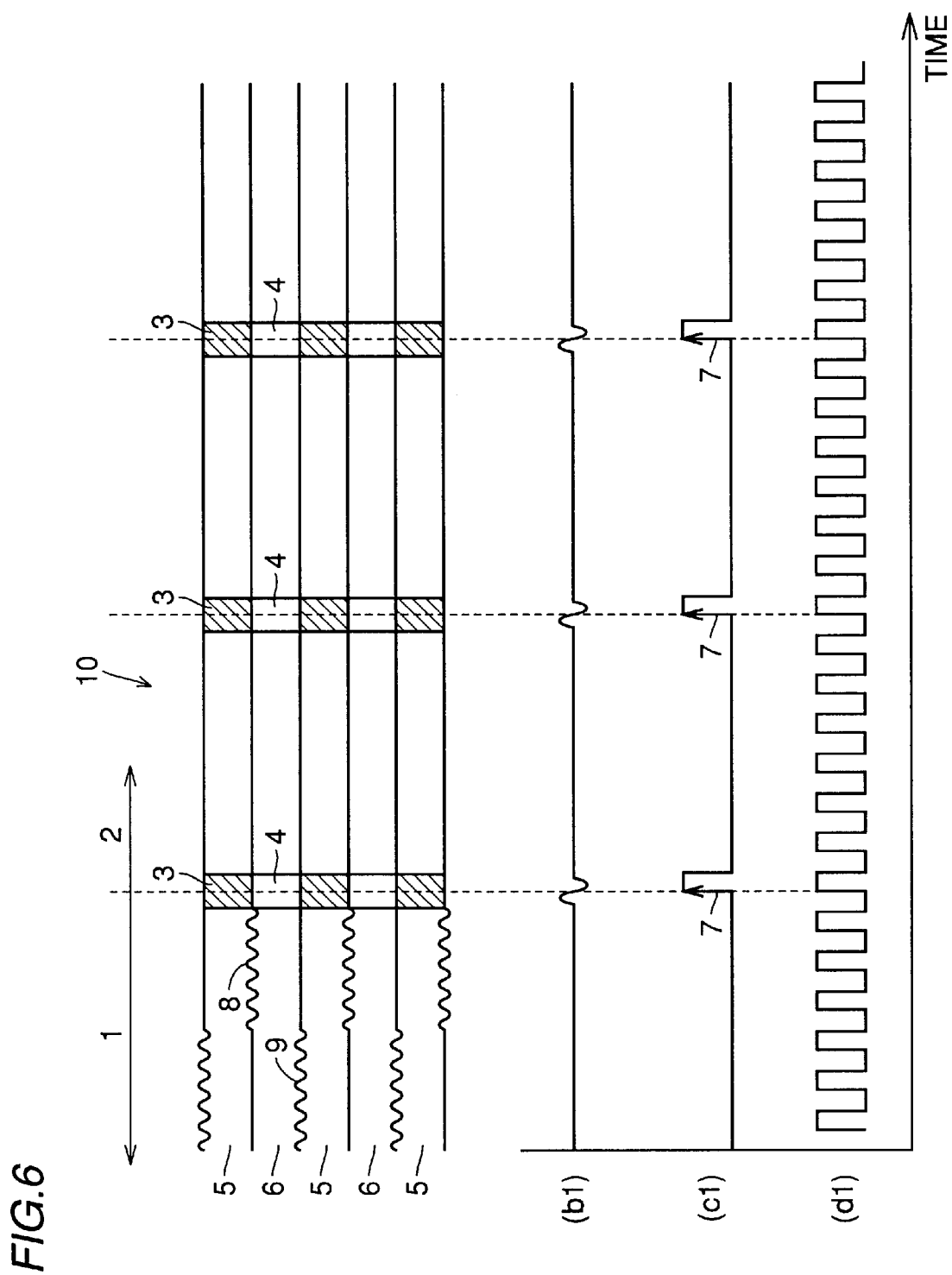
FIG. 6 is a plan view of a data region in the magneto-optical recording medium of FIG. 5.

The planar structure of data region 10D of magneto-optical recording medium 10 will be described in detail with reference to FIG. 6. Data region 10D having a land 5 and a groove 6 formed alternately is provided with discrete regions 3 and 4 at a constant interval. More specifically, a groove 3 of approximately 1–2 $\mu$m in length is formed at a constant interval at land 5. A land 4 of approximately 1–2 $\mu$m in length is formed at a constant interval at groove 6. An address region 1 is provided at the head of one sector. The first address information is recorded by wobble 8 at one side wall of groove 6. At the other side wall, address information identical to the first address information is recorded by wobble 9 at position differing from the position where wobble 8 is formed. The reason why wobbles 8 and 9 indicating the same information are formed alternately at a different position is to detect the address information reliably even in the case where magneto-optical recording medium 10 is tilted so that the optical axis of the laser beam is offset from the center of land 5 and groove 6.

A data record region 2 is provided following address region 1. A wobble is not formed at the side walls of groove 6 of data recording region 2.

Laser beam intensity signals corresponding to wobbles 8 and 9 of address region 1 are detected by photodetector 37 of optical head 30 by the so-called radial push-pull method. The detected signals are applied to reproduced signal amplify circuit 93 and servo circuit 92.

Groove 3 and land 4 formed at a constant interval are detected by photodetector 37 of optical head 30 by the so-called tangent push-pull method. Photodetector 37 outputs a signal (b1) which is amplified by reproduced signal amplify circuit 93 and provided to external synchronizing signal generation circuit 97. External synchronizing signal generation circuit 97 generates a pulse signal (c1) according to signal (b1) to generate an external synchronizing signal (d1) in synchronization with the rise 7, 7, . . . of pulse signal (c1). External synchronizing signal (d1) is generated so as to include 532 synchronizing components during the rises 7, 7 of the pulse signal (c1).

Figure 7:
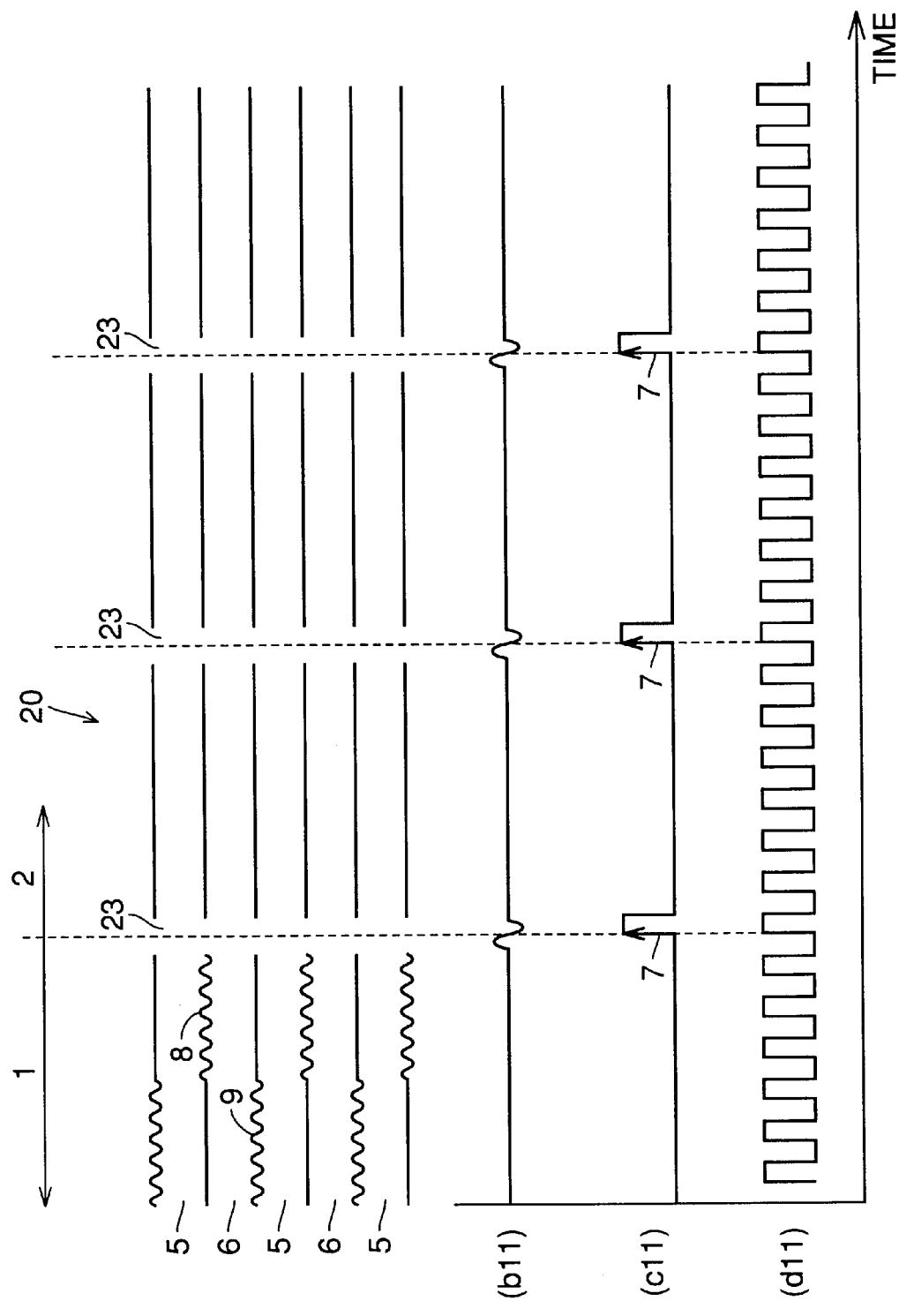
FIG. 7 is another plan view of the data region of the magneto-optical recording medium of FIG. 5.

The magneto-optical recording medium to which and/or from which a signal is reproduced is not limited to magneto-optical recording medium 10 in the present invention. A magneto-optical recording medium 20 having a data region 10D of another planar structure can be used. Referring to FIG. 7, magneto-optical recording medium 20 differs from magneto-optical recording medium 10 only in that a discrete region 23 is formed at a constant interval. The remaining elements are similar to those of magneto-optical recording medium 10. Discrete region 23 of magneto-optical recording medium 20 is detected by photodetector 37 of optical head 30 by the tangent push-pull method. Photodetector 37 outputs a signal (b11) which is applied to external synchronizing signal generation circuit 97 via reproduced signal amplify circuit 93. External synchronizing signal generation circuit 97 generates a pulse signal (c11) according to the signal (b11) to generate an external synchronizing signal (d11) in synchronization with the rises 7, 7, . . . of pulse signal (c11). The frequency of external synchronizing signal (d11) is identical to that of external synchronizing signal (d1). Wobbles 8 and 9 recorded with address information in magneto-optical recording medium 100 are detected by a method similar to that described above with reference to FIG. 6.

Figure 8:
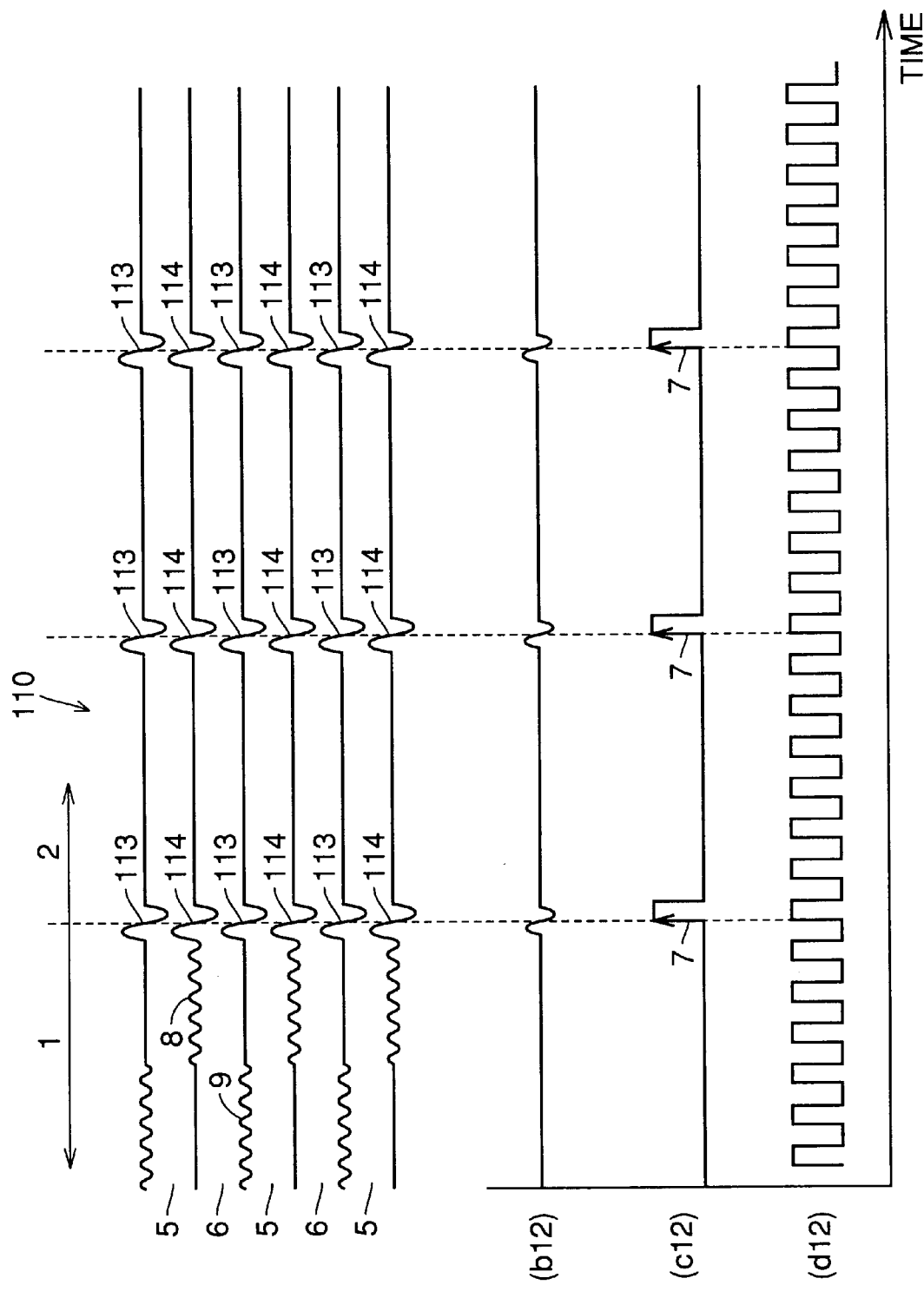
FIG. 8 is a further plan view of the data region of the magneto-optical recording medium of FIG. 5.

A magneto-optical recording medium 110 having a data region 10D of another planar structure can be used instead of magneto-optical recording medium 10 in the present invention. Referring to FIG. 8, magneto-optical recording medium 110 differs from magneto-optical recording medium 10 only in that wobbles 114 and 113 of large amplitude are formed at a constant interval at both side walls of groove 6. The remaining elements are identical to those of magneto-optical recording medium 10. Wobbles 114 and 113 of magneto-optical recording medium 110 are detected by photodetector 37 of optical head 30 by the radial push-pull method. Photodetector 37 outputs a signal (b12), which is applied to external synchronizing signal generation circuit 97 via reproduced signal amplify circuit 93. External synchronizing signal generation circuit 97 generates a pulse signal (c12) according to signal (b12) to generate an external synchronizing signal (d12) in synchronization with the rise 7, 7, . . . of pulse signal (c12). The frequency of external synchronizing signal (d12) is identical to that of external synchronizing signal (d1). In magneto-optical recording medium 110, wobbles 8, 9 recorded with address information are detected by a method similar to that described with reference to FIG. 6 External synchronizing signals (d1), (d11), and (d12) described with reference to FIGS. 6, 7 and 8 are used as clocks to record and/or reproduce a signal to and/or from magneto-optical recording media 10, 20 and 110.

Figure 9:
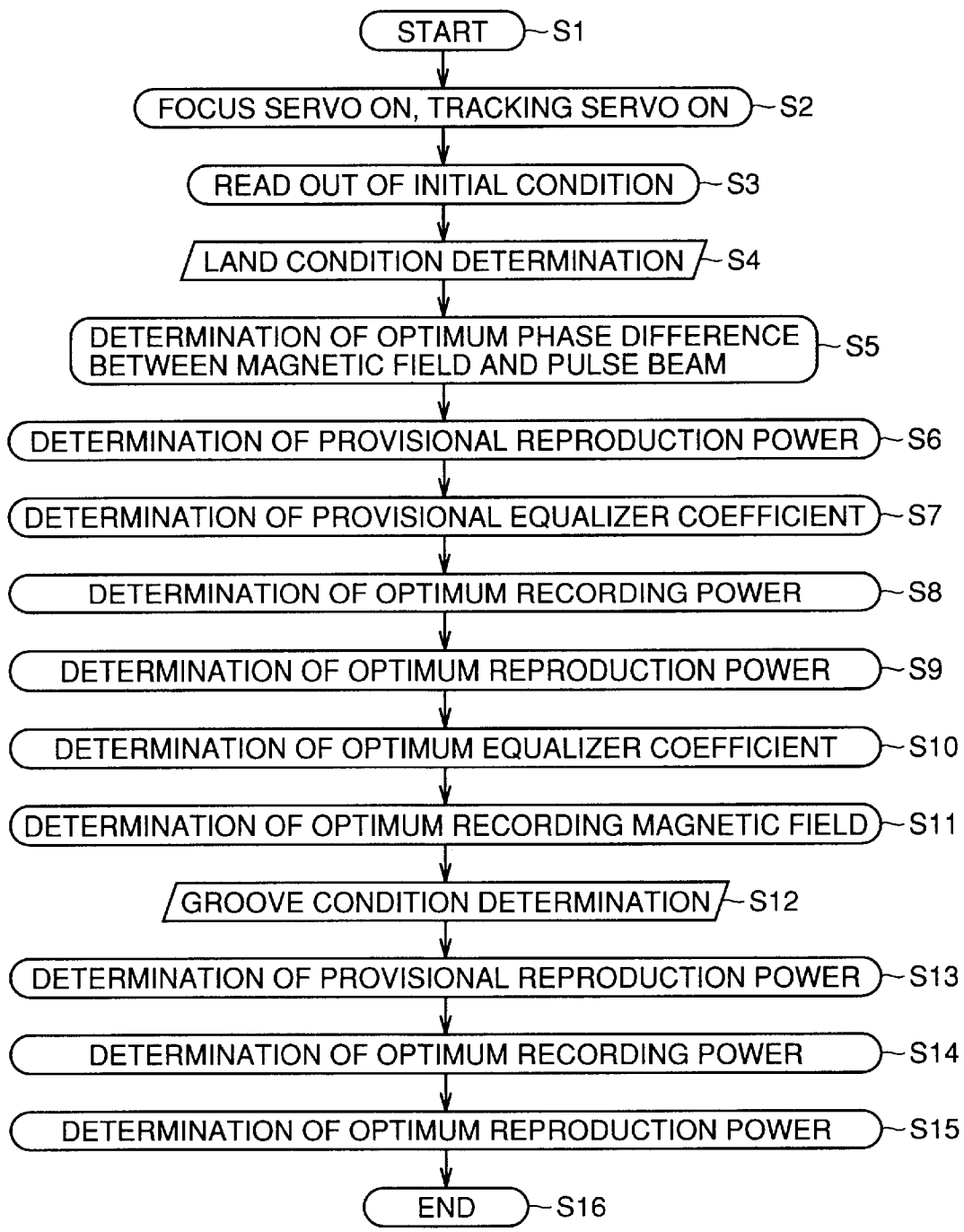
FIG. 9 is a flow chart of optimizing the phase difference between the magnetic field and a pulse beam, recording power, reproduction power, equalizer coefficient, and recording magnetic field.

A flow chart of optimizing a pulse beam intensity, magnetic field intensity, and phase difference between a pulse beam and a magnetic field in recording a signal to magneto-optical recording media 10, 20 and 110 and the laser beam intensity and equalizer coefficient of equalizer 95 in reproducing a signal from magneto-optical recording media 10, 20 and 110 will be described reference to FIG. 9.

The process is initiated at step S1. The focus servo and tracking servo of the objective lens in optical head 30 are turned on at step S2. At step S3, the initial conditions are read out from TOC region 10T1 of magneto-optical recording media 10, 20 and 110. The initial conditions read out at step S3 include the highest and lowest intensity of the pulse beam, the highest intensity of the recording magnetic field, the phase difference between the pulse beam and the magnetic field in recording a signal, and the highest and lowest intensity of a laser beam and the equalizer circuit in recording a signal.

First, land condition determination is carried out (step S4). More specifically, the optimum phase difference between the magnetic field and pulse beam (step S5), a provisional reproduction power (step S6), a provisional equalizer coefficient (step S7), an optimum record power (step s8), an optimum reproduction power (S9), an optimum equalizer coefficient (step S10) and an optimum recording magnetic field (step S11) are determined.

Then, groove condition determination is carried out (step S12). More specifically, the provisional reproduction power (step S13), optimum record power (step S14) and optimum reproduction power (step S15) are determined.

The process ends at step S16.

The flow chart of determining the optimum phase difference between the magnetic field and pulse beam of step S5 will be described with reference to FIG. 10. At step S50, a signal is recorded at the initial conditions read out while altering the phases of the magnetic field and the pulse beam. More specifically, signals are recorded onto magneto-optical recording media 10, 20 and 110 while altering the phase difference between the magnetic field and the pulse beam with the phase difference between the magnetic field and the pulse beam reproduced from TOC region 10T1 of magneto-optical recording media 10, 20 and 110 by optical head 30 as the reference. At step S51, the recorded signal is reproduced. At step S52, the phase difference corresponding to the lowest error rate of the reproduced signal is determined as the optimum phase difference.

Figure 11:
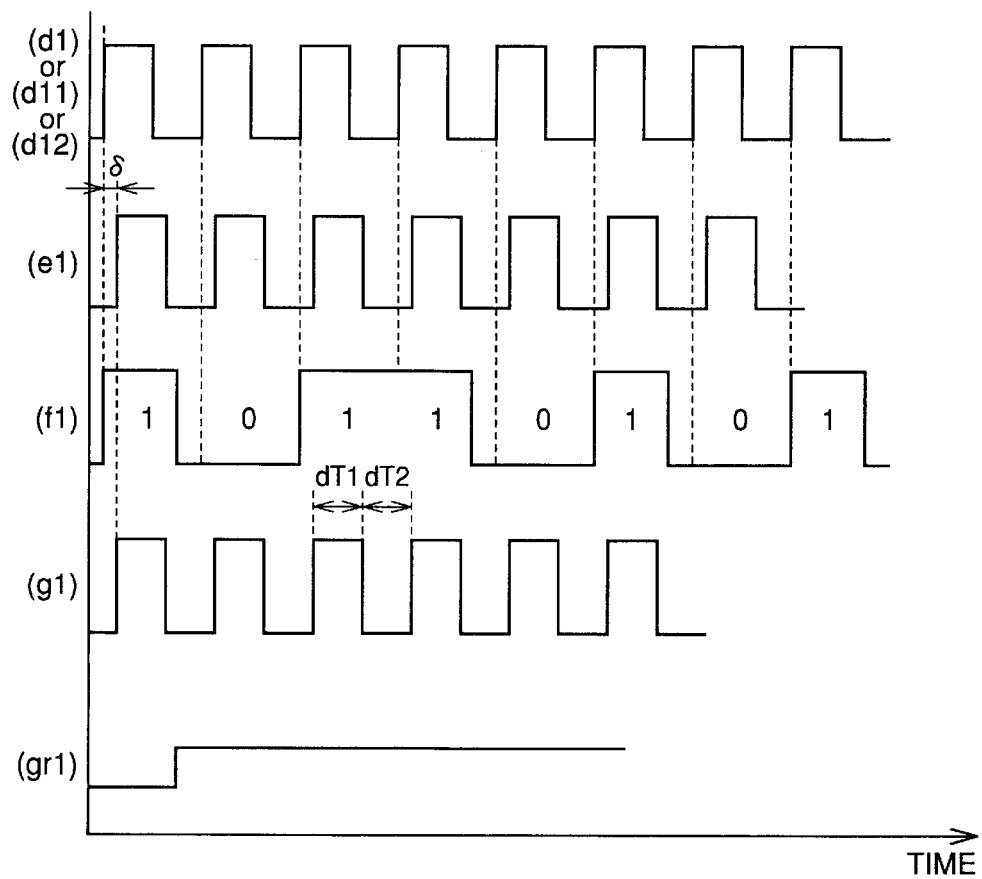
FIG. 11 shows signals to describe the operation of executing the flow chart of FIG. 10.

Referring to FIG. 11, control circuit 101 of FIG. 1 generates a driving signal (f1) to generate a magnetic field modulated according to a record signal "10110101" in synchronization with external synchronizing signals (d1), (d11) and (d12) from external synchronizing signal generation circuit 97. The generated driving signal (f1) is provided to magnetic head drive circuit 103. Also, a driving signal (g1) to project a pulse beam is generated, having the phase difference δ altered based on a synchronizing signal (e1) corresponding to external synchronizing signals (d1), (d11) and (d12) delayed by the phase difference δ read out by optical head 30. The generated driving signal (g1) is provided to laser drive circuit 102. Regarding driving signal (g1), the time dT1 and time dT2 to turn on and turn off semiconductor laser 31, respectively, are identical.

Magnetic head drive circuit 103 drives magnetic head 104 according to driving signal (f1). Magnetic head 104 applies a magnetic field to magneto-optical recording media 10, 20 and 110 according to driving signal (f1). Laser drive circuit 102 drives semiconductor laser 31 in optical head 30 according to driving signal (g1). Optical head 30 projects a pulse beam onto magneto-optical recording media 10, 20 and 110 according to driving signal (g1). In this case, the intensity of the pulse beam directed to magneto-optical recording medium (d1), (d11) and (d12) is the average of the highest and lowest intensity of the laser beam reproduced from TOC region 10T1. The intensity of the applied magnetic field is the maximum intensity of the magnetic field reproduced from TOC region 10T1.

Accordingly, signal "10110101" is recorded onto magneto-optical recording media 10, 20 and 110. Driving signal (g1) is generated with the phase difference from driving signal (f1) altered. The turn on period of semiconductor laser 31 is set so that the magnetic field is applied to magneto-optical recording media 10, 20 and 110. Accordingly, a signal can be reliably recorded onto magneto-optical recording media 10, 20 and 110.

Figure 10:
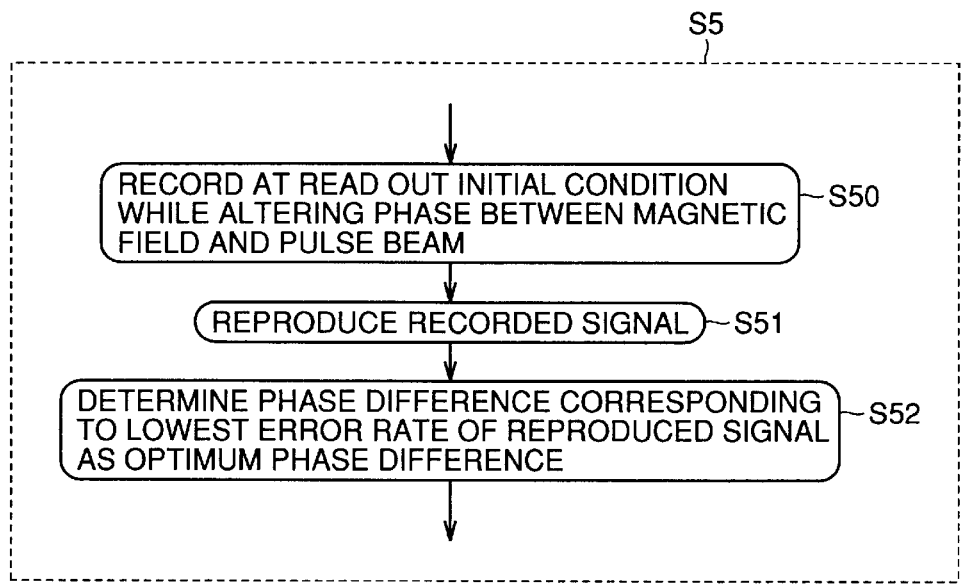
FIG. 10 is a flow chart of optimizing the phase difference between a magnetic field and a pulse beam of the flow chart of FIG. 9.

The operation of recording/reproduction apparatus carried out at step S50 of FIG. 10 has been provided in the foregoing.

Referring to FIG. 11 again, upon recording a signal onto magneto-optical recording media 10, 20 and 110, control circuit 101 generates a driving signal (gr1) setting the intensity of the laser beam to the average of the lowest and highest intensity of the laser beam (continuous light) read out from TOC region 10T1. The generated driving signal (gr1) is provided to laser drive circuit 102. Laser drive circuit 102 drives semiconductor laser 31 according to driving signal (gr1). Optical head 30 projects the laser beam generated according to driving signal (gr1) to magneto-optical recording media 10, 20 and 110 to reproduce a recorded signal.

The operation of the recording/reproduction apparatus carried out at step S51 of FIG. 10 has been provided in the foregoing.

The reproduced magneto-optical signal is reproduced as reproduced data by reproduced signal amplify circuit 93, BPF 94, equalizer 95 and PRML 96. Also, the number of errors of the reproduced signal is detected by PRML 96. The number of errors is provided to control circuit 101.

Figure 12:
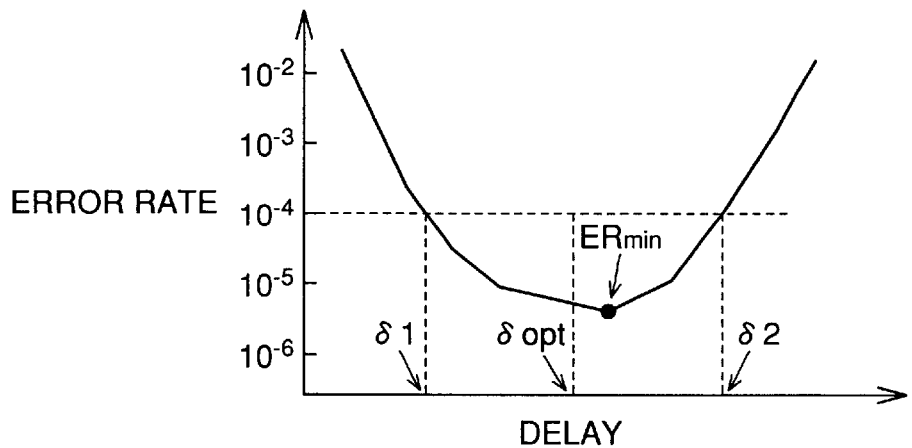
FIG. 12 is a diagram to describe the method of determining the optimum phase difference between a magnetic field and a pulse beam.

Control circuit 101 calculates the error rate of the reproduced signal according to the number of errors at functional unit 1011. The error rate with respect to the delay of the pulse beam to the magnetic field i.e., the phase difference between the magnetic field and the pulse beam is provided to determination unit 1012 (refer to FIG. 12). Determination unit 1012 detects the amount of delay $\delta 1$ and $\delta 2$ corresponding to the error rate of $10^{-4}$. The optimum delay amount $\delta opt$ is detected as the average $(\delta 1 + \delta 2)/2$ of delay amount $\delta 1$ and $\delta 2$. The detected optimum delay amount $\delta opt$ is provided to control unit 1014. Control unit 1014 generates a driving signal to produce a pulse beam having the phase delayed by optimum delay amount $\delta opt$ with respect to the driving signal to generate a magnetic field.

The signal recorded onto magneto-optical recording media 10, 20 and 110 is not limited to "10110101". The optimum delay amount $\delta opt$ may be determined by alternately recording a predetermined number of a signal having the domain length of 2T and a signal having the domain length of 8T.

The way of determining optimum delay amount $\delta opt$ is not limited to the average value $(\delta 1 + \delta 2)/2$ between delay amount $\delta 1$ and $\delta 2$. The delay amount realizing the minimum point $ER_{min}$ of the error rate of the reproduced signal in FIG. 12 may be determined as optimum delay amount $\delta opt$.

Figure 13:
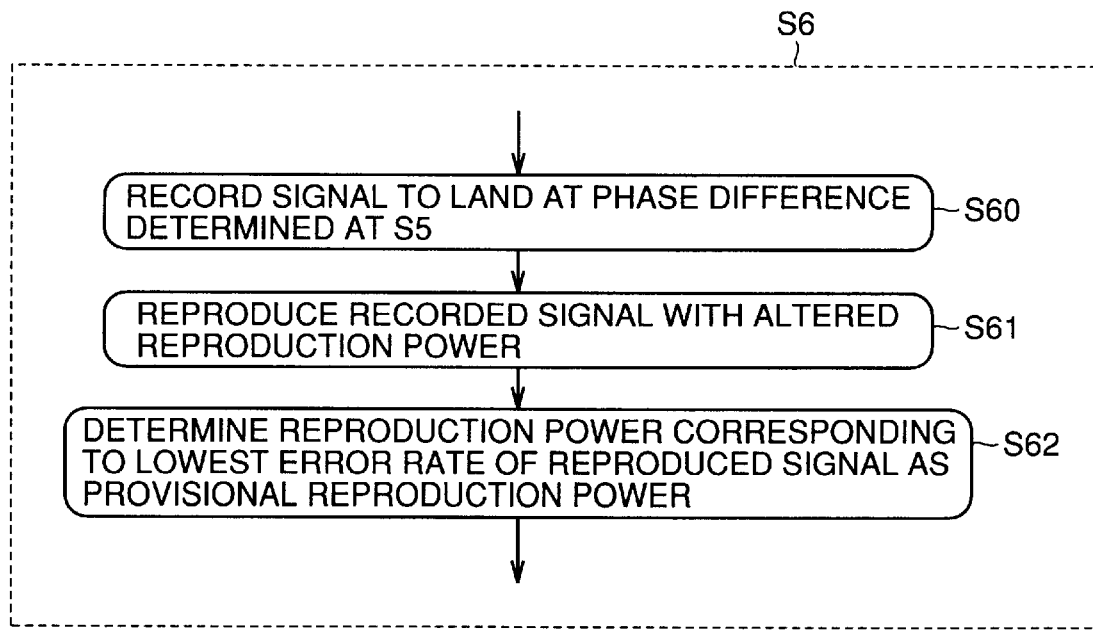
FIG. 13 is a flow chart of determining a provisional reproduction power of the flow chart of FIG. 9.

The flow chart of determining the provisional reproduction power at step S6 in FIG. 9 will be described with reference to FIG. 13. A driving signal to generate a magnetic field and a driving signal to generate a pulse beam are generated according to the optimum phase difference δopt determined at step S5. A signal is recorded onto magneto-optical recording media 10, 20 and 110 according to the generated driving signals (step S60). The recorded signal is reproduced with the intensity of the laser beam altered (step S61). The intensity of the laser beam corresponding to the lowest error rate of the reproduced signal is determined as the provisional reproduction power (step S62).

Figure 14:
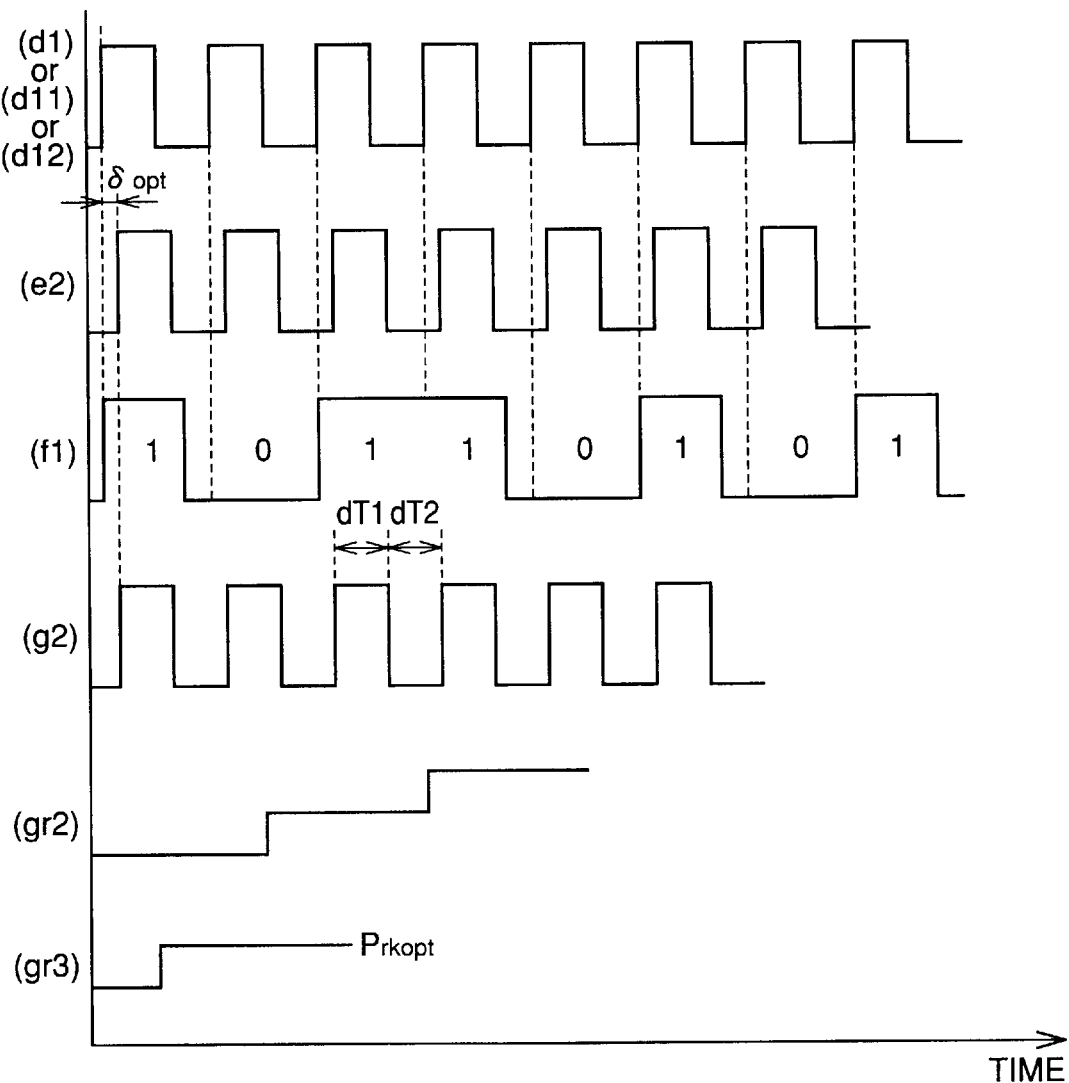
FIG. 14 shows signals to describe the operation of executing the flow chart of FIG. 13.

Referring to FIG. 14, control circuit 110 generates a driving signal (f1) to produce a magnetic field modulated by a signal "10110101" in synchronization with external synchronizing signals (d1), (d11) and (d12). Driving signal (f1) is provided to magnetic head drive circuit 103. Also, a synchronizing signal (e2) corresponding to external synchronizing signals (d1), (d11) and (d12) delayed by the optimum phase difference δopt is generated. A driving signal (g2) to generate a pulse beam is generated in synchronization with synchronizing signal (e2). Driving signal (g2) is provided to laser drive circuit 102. Magnetic head drive circuit 103 drives magnetic head 104 according to driving signal (f1). Magnetic head 104 applies a magnetic field to magneto-optical recording media 10, 20 and 110 according to driving signal (f1). Laser drive circuit 102 drives semiconductor laser 31 according to driving signal (g2). Semiconductor laser generates a pulse beam according to driving signal (g2). Optical head 30 projects that pulse beam onto magneto-optical recording media 10, 20 and 110. Accordingly, signal "10110101" is recorded on magneto-optical recording media 10, 20 and 110. Driving signal (g2) is generated with optimum phase difference δopt set with respect to driving signal (f1). The turn on period of semiconductor laser 31 is selected so that the magnetic field is applied on magneto-optical recording media 10, 20 and 110. Accordingly, a signal can be reliably recorded onto magneto-optical recording media 10, 20 and 110.

The operation of the recording/reproduction apparatus carried out at step S60 in FIG. 13 has been provided in the following.

Referring to FIG. 14 again, upon recording a signal onto magneto-optical recording media 10, 20 and 110, control circuit 101 generates a driving signal (gr2) to project a laser beam (continuous light) onto magneto-optical recording media 10, 20 and 110 with the intensity altered to reproduce a signal. The generated driving signal (gr2) is provided to laser drive circuit 102. Laser drive circuit 102 drives semiconductor laser 31 according to driving signal (gr2). Optical head 30 projects a laser beam whose power is altered, whereby a recorded signal is reproduced. In this case, the intensity of the laser beam is altered in the step of 0.2 mW in the range of 1.8 mW–3.8 mW.

The operation of the recording/reproduction apparatus carried out at step S61 of FIG. 13 has been provided in the following.

The reproduced magneto-optical signal is reproduced as reproduction data by reproduced signal amplify circuit 93, BPF 94, equalizer 95 and PRML 96. Also, the number of errors of the reproduced signal is detected by PRML 96 to be provided to control circuit 101.

Figure 15:
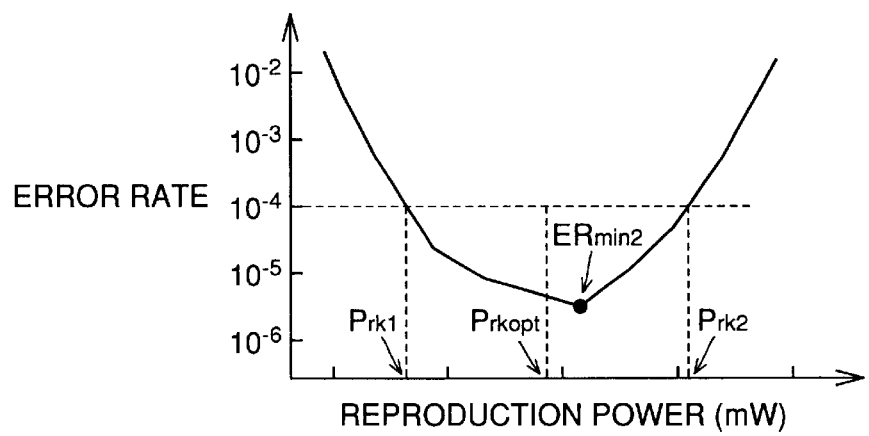
FIG. 15 is a diagram to describe a method of determining provisional reproduction power.

Control circuit 101 calculates the error rate of the reproduced signal according to the number of errors at functional unit 1011. The error rate with respect to the reproduction power is provided to determination unit 1012 (refer to FIG. 15). Determination unit 1012 detects reproduction power $P_{rk1}$ and $P_{rk2}$ corresponding to the error rate of $10^{-4}$ to detect a provisional reproduction power $P_{rkopt}$ as the average value $(P_{rk1}+P_{rk2})/2$ of reproduction power $P_{rk1}$ and $P_{rk2}$. As the method of identifying reproduction power $P_{rk1}$ and $P_{rk2}$, the reproduction power is increased from the lower level, and the point where the error rate is below the threshold value is set as reproduction power $P_{rk1}$. The reproduction power is further increased, and the point where the error rate exceeds the threshold value is detected as reproduction power $P_{rk2}$. Also, the reproduction power is reduced from the higher level, and the point where the error rate is below the threshold value is set as reproduction power $P_{rk2}$. The reproduction power is further reduced, and the point where the error rate exceeds the threshold value is detected as reproduction power $P_{rk1}$. The detected provisional reproduction power $P_{rkopt}$ is provided to control unit 1014. Control unit 1014 sets the intensity of the laser beam to reproduce a recorded signal to the provisional reproduction power $P_{rkopt}$, and generates a driving signal (gr3) to produce a laser beam to reproduce a recorded signal.

The signal recorded onto magneto-optical recording media 10, 20 and 110 is not limited to "10110101". Provisional reproduction power $P_{rkopt}$ can be determined by recording alternately a predetermined number of signals having the domain length of 2T and the domain length of 8T.

The determination of provisional reproduction power $P_{rkopt}$ is not limited to the average $(P_{rk1}+P_{rk2})/2$ between reproduction power $P_{rk1}$ and $P_{rk2}$. Reproduction power that realizes the smallest error point $ER_{min2}$ of the reproduced signal in FIG. 15 can be determined as provisional reproduction power $P_{rkopt}$.

Figure 16:
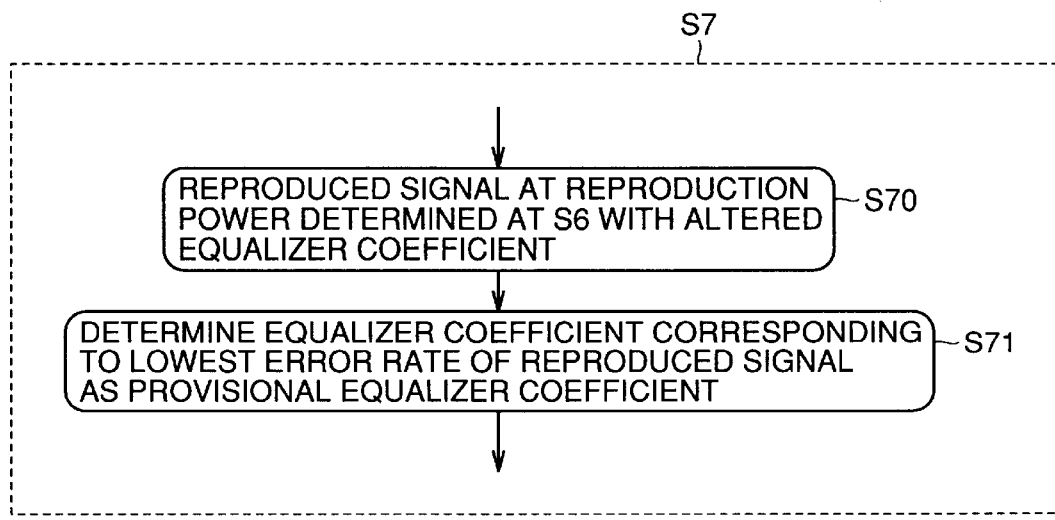
FIG. 16 is a flow chart of determining the provisional equalizer coefficient of the flow chart of FIG. 9.

The flow chart of determining a provisional equalizer coefficient at step S7 of FIG. 9 will be described with reference to FIG. 16. The intensity of the laser beam is set to the provisional reproduction power $P_{rkopt}$ determined at step S6 to reproduce a recorded signal. Waveform interference is removed from the reproduced magneto-optical signal with the equalizer coefficient of equalizer 95 altered (step S70). The equalizer coefficient corresponding to the lowest error rate of the reproduced signal when the equalizer coefficient is altered is determined as the provisional equalizer coefficient (step S71).

Referring to FIG. 1 again, control circuit 101 controls equalizer 95 so as to alter the equalizer coefficient. The magneto-optical signal reproduced with the laser beam set to the intensity of provisional reproduction power $P_{rkopt}$ has the number of errors detected for each equalizer coefficient altered by reproduced signal amplify circuit 93, BPF 94, equalizer 95 and PRML 96. The detected number of errors is applied to functional unit 1011 of control circuit 101.

Control circuit 101 calculates the error rate of the reproduced signal according to the number of errors at functional unit 1011. The error rate with respect to the equalizer coefficient is provided to determination unit 1012 (refer to FIG. 17). Determination unit 1012 detects equalizer coefficients $EQ_{k1}$ and $EQ_{k2}$ corresponding to the error rate of $10^{-4}$. The provisional equalizer coefficient $EQ_{kopt}$ is detected as the average $(EQ_{k1}+EQ_{k2})/2$ between equalizer coefficients $EQ_{k1}$ and $EQ_{k2}$. The detected provisional equalizer coefficient $EQ_{kopt}$ is provided to control unit 1014. Control unit 1014 sets the equalizer coefficient used in reproducing a recorded signal to the provisional equalizer coefficient $EQ_{kopt}$.

The signal recorded onto magneto-optical recording media 10, 20 and 110 is not limited to "10110101". A predetermined number of signals having the domain length of 2T and the domain length of 8T can be recorded alternately to determine provisional equalizer coefficient $EQ_{kopt}$.

Figure 17:
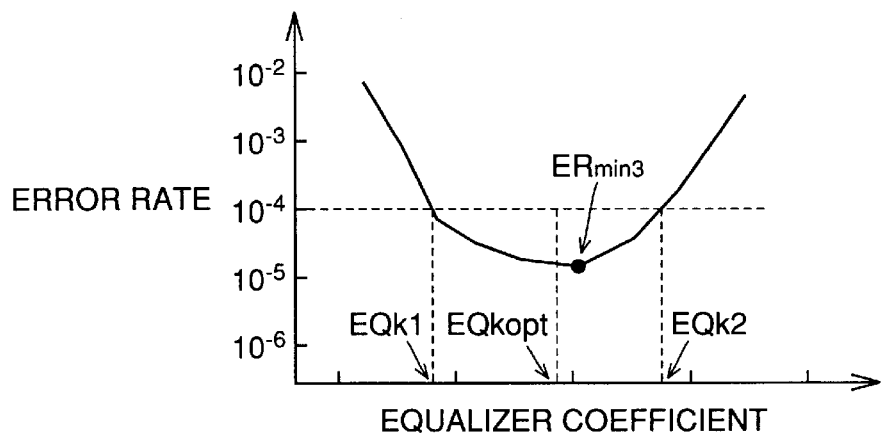
FIG. 17 is a diagram to describe a method of determining the provisional equalizer coefficient.

The way of determining provisional equalizer coefficient $EQ_{kopt}$ is not limited to the average value of $(EQ_{k1} + EQ_{k2})/2$ between equalizer coefficients $EQ_{k1}$ and $EQ_{k2}$. In FIG. 17, the equalizer coefficient realizing the lowest error rate $ER_{min3}$ of the reproduced signal may be determined as the provisional equalizer coefficient $EQ_{kpot}$.

The flow chart of determining the optimum recording power at step S8 of FIG. 9 will be described with reference to FIG. 18. A driving signal producing a magnetic field of the highest intensity, modulated according to a record signal, and a driving signal generating a pulse beam having the optimum phase difference δopt determined at step S5 with respect to the driving signal producing a magnetic field are generated. A signal is recorded at the land of magneto-optical recording media 10, 20 and 110 according to the generated driving signals (step S80). In this case, the recording power has a predetermined intensity. A signal is also recorded to the grooves (first and second grooves) adjacent to the land where the signal has been recorded under the conditions identical to those of step S80 (step S81). A signal is reproduced from the land using the provisional reproduction power determined at step S6 and the provisional equalizer coefficient determined at step S7 (step S82). The error rate of the reproduced signal is detected (step S83). The process from step S80 to step S83 is repeated while altering the recording power in the range between the highest intensity and the lowest intensity of the recording power reproduced from TOC region 10T1 of magneto-optical recording media 10, 20 and 110 (step S84). The recording power corresponding to the lowest error rate of the reproduced signal is determined as the optimum recording power (step S85).

Figure 19:
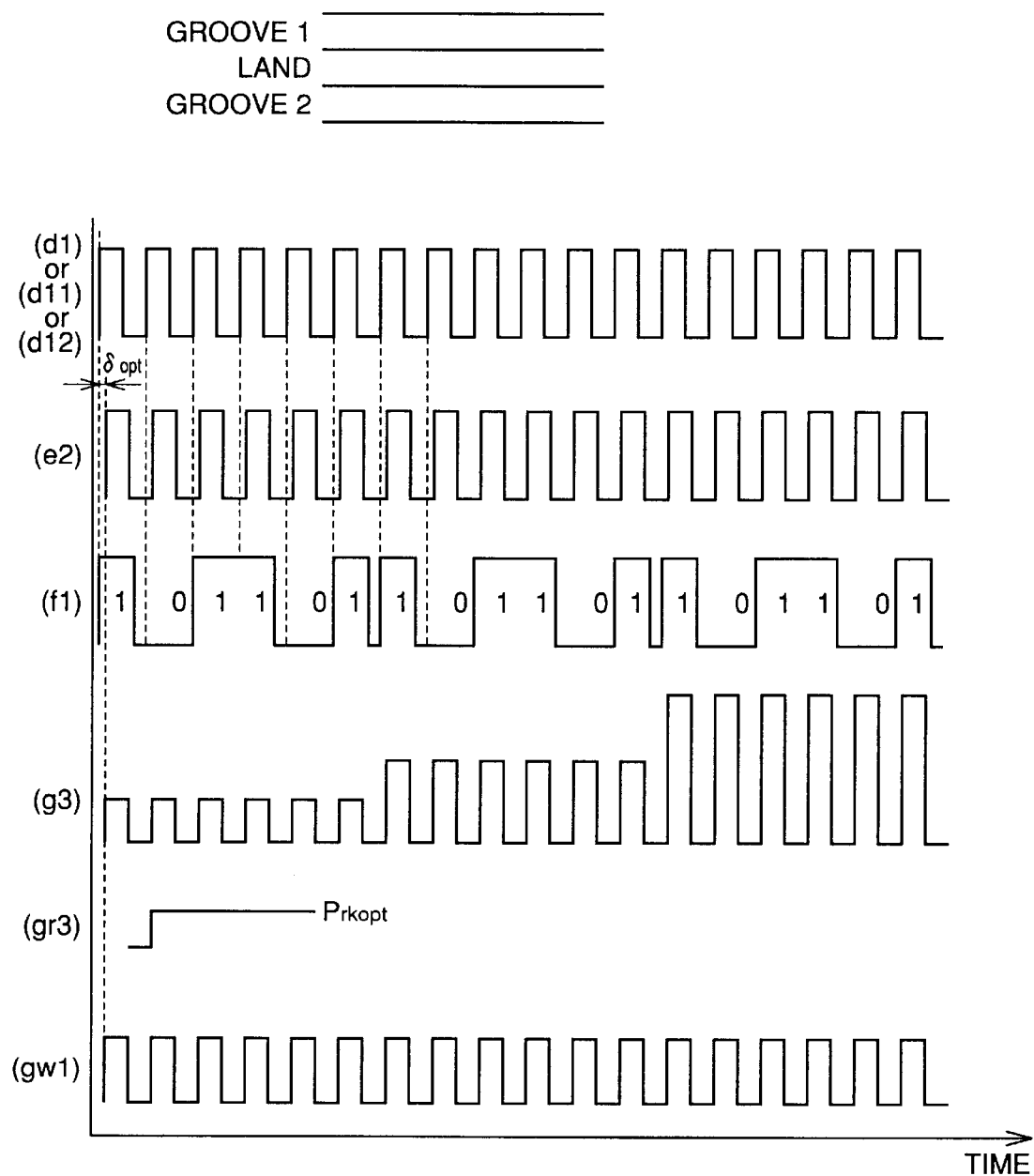
FIG. 19 shows signals to describe the operation of executing the flow chart of FIG. 18.

Referring to FIG. 19, control circuit 101 generates a driving signal (f1) to produce a magnetic field modulated by a signal "10110101". in synchronization with external synchronizing signals (d1), (d11) and (d12). Driving signal (f1) is provided to magnetic head drive circuit 103. Also, a synchronizing signal (e2) corresponding to external synchronizing signals (d1), (d11) and (d12) delayed by the optimum phase difference δopt is generated. A driving signal (g3) to produce a pulse beam with the intensity altered is generated in synchronization with synchronizing signal (e2). Driving signal (g3) is provided to laser drive circuit 102. Magnetic head drive circuit 103 drives magnetic head 104 according to driving signal (f1). Magnetic head 104 applies a magnetic field according to driving signal (f1) to magneto-optical recording media 10, 100 and 110. Laser drive circuit 102 drives semiconductor laser 31 according to driving signal (g3). Semiconductor laser 31 generates a pulse beam according to driving signal (g3). Optical head 30 projects that pulse beam to the land of magneto-optical recording media 10, 20 and 110. In this case, the intensity of the pulse beam is altered at the step of 0.5 mW in the range of 7.0 mW–13 mW. Accordingly, signal "10110101 ⋯ " is recorded at the land of magneto-optical recording media 10, 20 and 110. Although driving signal (g3) is generated with optimum phase difference δopt set with respect to driving signal (f1), the period of semiconductor laser 31 turned on is set so that the magnetic field is applied to the land of magneto-optical recording media 10, 20 and 110. Accordingly, a signal can be reliably recorded at the land of magneto-optical recording media 10, 20 and 110.

Figure 18:
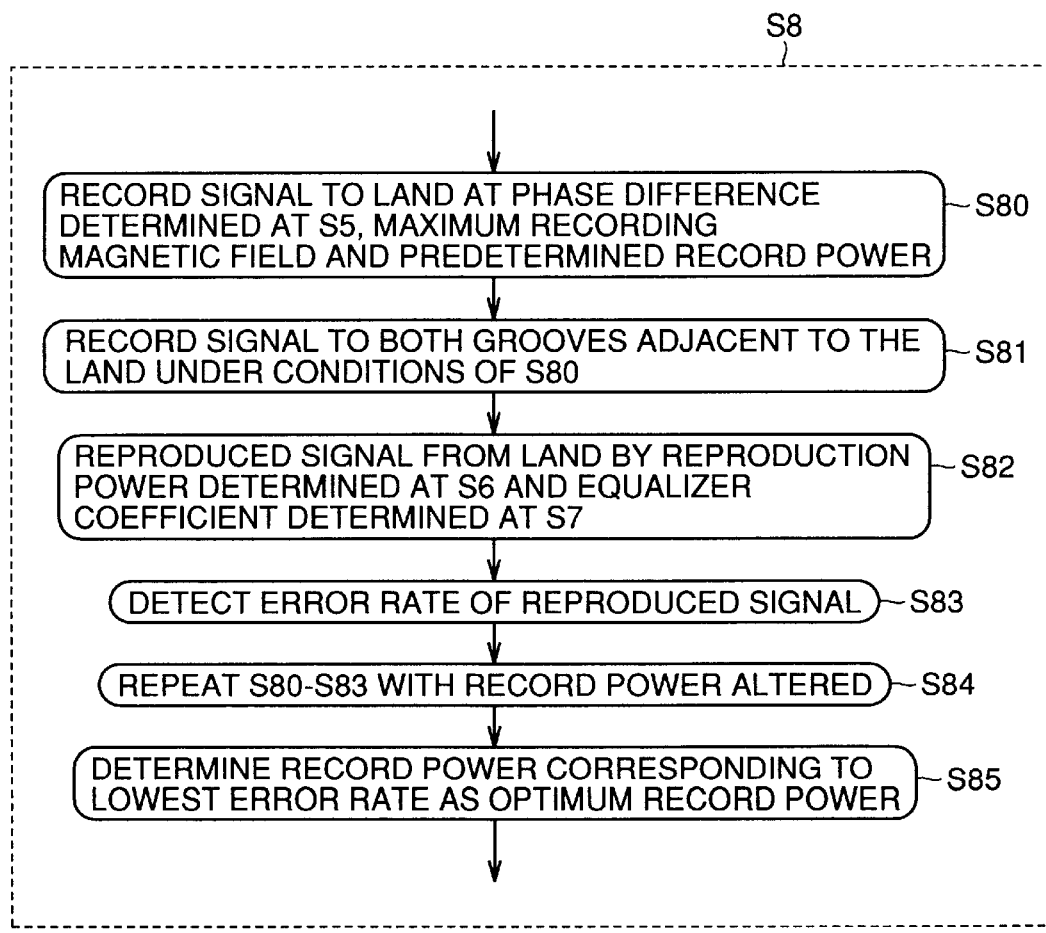
FIG. 18 is a flow chart of determining the optimum recording power of the flow chart of FIG. 9.

The operation of the recording/reproduction apparatus carried out at step S80 of FIG. 18 has been provided in the foregoing.

After recording a signal onto the land, control circuit 101 controls servo circuit 92 so as to jump to the track of groove 1 (the first groove) adjacent to the land according to the address information applied to control unit 1014 from PRML 96. After groove 1 is set to tracking ON, a signal is recorded onto groove 1 under the conditions identical to those of step S80. After a signal is recorded to groove 1, control circuit 101 controls servo circuit 92 so as to jump to the track of groove 2 (the second groove) adjacent to the land according to the address information. After groove 2 has been set to tracking ON, a signal is recorded onto groove 2 according to conditions identical to those of step S80.

The operation of the recording/reproduction apparatus carried out at step S81 of FIG. 18 has been provided in the foregoing.

Referring to FIG. 19 again, following signal recording onto the land, groove 1, and groove 2, control circuit 101 generates a driving signal (gr3) to produce a laser beam having an intensity of the provisional reproduction power $P_{rkopt}$ determined at step S6. Driving signal (gr3) is provided to laser drive circuit 102. Laser drive circuit 102 drives semiconductor laser 31 according to driving signal (gr3). Optical head 30 projects a laser beam according to driving signal (gr3) to the land of magneto-optical recording media 10, 20 and 110. A magneto-optical signal is detected at photodetector 37. Control circuit 101 controls equalizer 95 so as to set the equalizer coefficient of equalizer 95 to the provisional equalizer coefficient $EQ_{kopt}$ determined at step S7. The magneto-optical signal detected by photodetector 37 is reproduced by reproduced signal amplify circuit 93, BPF 94, equalizer 95 and PRML 96. The number of errors of the reproduced signal is provided from PRML 96 to functional unit 1011 of control circuit 101.

The operation of the recording/reproduction apparatus carried out at step S82 of FIG. 18 has been provided in the foregoing.

Figure 20:
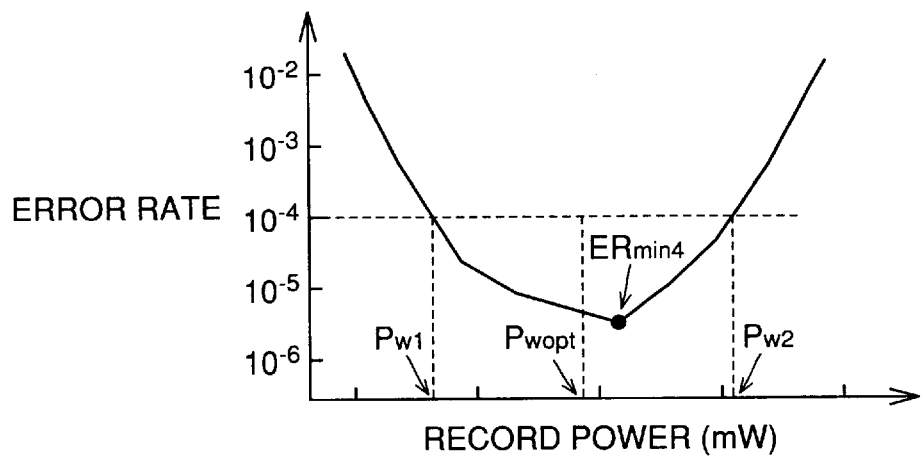
FIG. 20 is a diagram to describe a method of determining optimum recording power.

Control circuit 101 calculates the error rate of the reproduced signal according to the number of errors at functional unit 1011. The error rate with respect to the recording power(refer to FIG. 20) is provided to determination unit 1012. Determination unit 1012 detects recording power $P_{w1}$ and $P_{w2}$ corresponding to the error rate of $10^{-4}$ from the input. The optimum recording power $P_{wopt}$ is detected as the average $(P_{w1}+P_{w2})/2$ between recording power $P_{w1}$ and $P_{w2}$. As to the method of identifying recording power $P_{w1}$ and $P_{w2}$, the recording power is increased from the lower level, and the point where the error rate is below the threshold value is set as recording power $P_{w1}$. The recording power is further increased, and the point where the error rate exceeds the threshold value is detected as recording power $P_{w2}$. Also, the recording power is reduced from the higher level, and the point where the error rate is below the threshold value is set as recording power $P_{w2}$. The recording power is further reduced, and the point where the error rate exceeds the threshold value is detected as recording power $P_{w1}$. The detected optimum recording power $P_{wopt}$ is provided to control unit 1014. Control unit 1014 generates a driving signal (gw1) to produce a pulse beam to record a signal with the intensity of the pulse beam set to optimum recording power $P_{wopt}$.

The signal recorded at the land of magneto-optical recording media 10, 20 and 110 is not limited to "10110101 ⋯ ". A predetermined number of signals having the domain length of 2T and signals having the domain length of 8T may be recorded alternately to determine the optimum recording power $P_{wopt}$.

The method of determining optimum recording power $P_{wopt}$ is not limited to the average value $(P_{w1}+P_{w2})/2$ between recording power $P_{w1}$ and $P_{w2}$. The recording power realizing the lowest error rate $ER_{min4}$ of the reproduced signal of FIG. 20 can be determined as optimum recording power $P_{wopt}$.

The flow chart of determining the optimum reproduction power at step S9 of FIG. 9 will be described with reference to FIG. 21. A driving signal to produce a magnetic field of the highest intensity, modulated according to a record signal and having the optimum record power $P_{wopt}$ determined at step S8, and a driving signal generating a pulse beam having the optimum phase difference δopt determined at step S5 with respect to that driving signal generating a magnetic field are produced. A signal is recorded at the land of magneto-optical recording media 10, 20 and 110 according to the generated driving signals (step S90). A signal is also recorded to the grooves (first and second grooves) adjacent to the land where the signal has been recorded under the conditions identical to those of step S90 (step S91). A signal is reproduced from the land using the provisional equalizer coefficient determined at step S7 (step S92). The error rate of the reproduced signal is detected. The reproduction power corresponding to the lowest error rate is determined as the optimum reproduction power (step S93).

Figure 22:
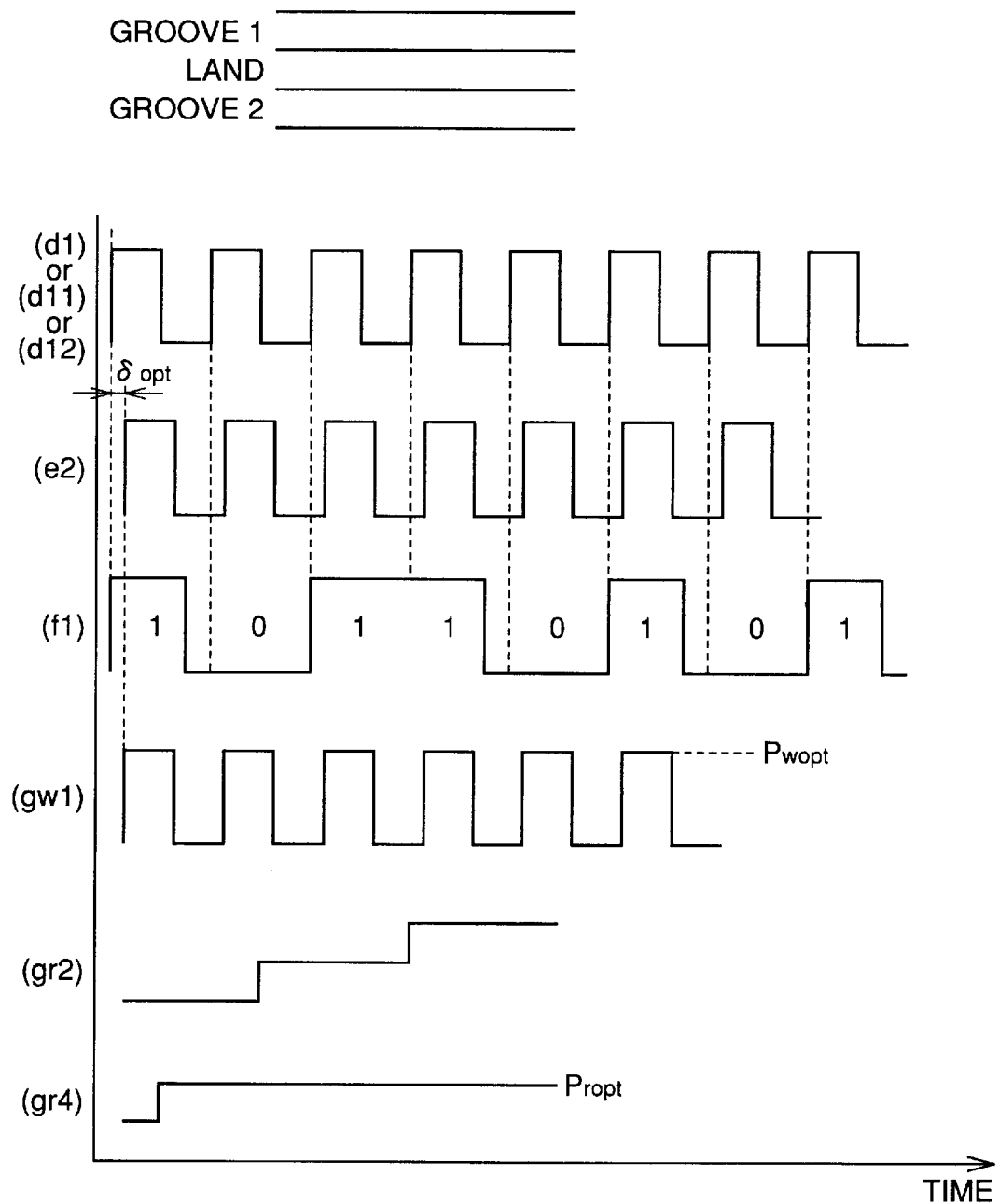
FIG. 22 shows signals to describe the operation executed by the flow chart of FIG. 21.

Referring to FIG. 22, control circuit 101 generates a driving signal (f1) to produce a magnetic field modulated by a signal "10110101 ⋯ " in synchronization with external synchronizing signals (d1), (d11) and (d12). Driving signal (f1) is provided to magnetic head drive circuit 103. Also, a synchronizing signal (e2) corresponding to external synchronizing signals (d1), (d11) and (d12) delayed by the optimum phase difference δopt is generated. A driving signal (gw1) to produce a pulse beam with the optimum recording power determined at step S8 is generated in synchronization with synchronizing signal (e2). Driving signal (gw1) is provided to laser drive circuit 102. Magnetic head drive circuit 103 drives magnetic head 104 according to driving signal (f1). Magnetic head 104 applies a magnetic field according to driving signal (f1) to the land of magneto-optical recording media 10, 100 and 110. Laser drive circuit 102 drives semiconductor laser 31 according to driving signal (gw1). Semiconductor laser 31 generates a pulse beam according to driving signal (gw1). Optical head 30 projects that pulse beam to the land of magneto-optical recording media 10, 20 and 110. Accordingly, signal "10110101 ⋯ " is recorded at the land of magneto-optical recording media 10, 20 and 110. Although driving signal (gw1) is generated with optimum phase difference δopt set with respect to driving signal (f1), the period of semiconductor laser 31 turned on is set so that the magnetic field is applied to the land of magneto-optical recording media 10, 20 and 110. Accordingly, a signal can be reliably recorded at the land of magneto-optical recording media 10, 20 and 110.

Figure 21:
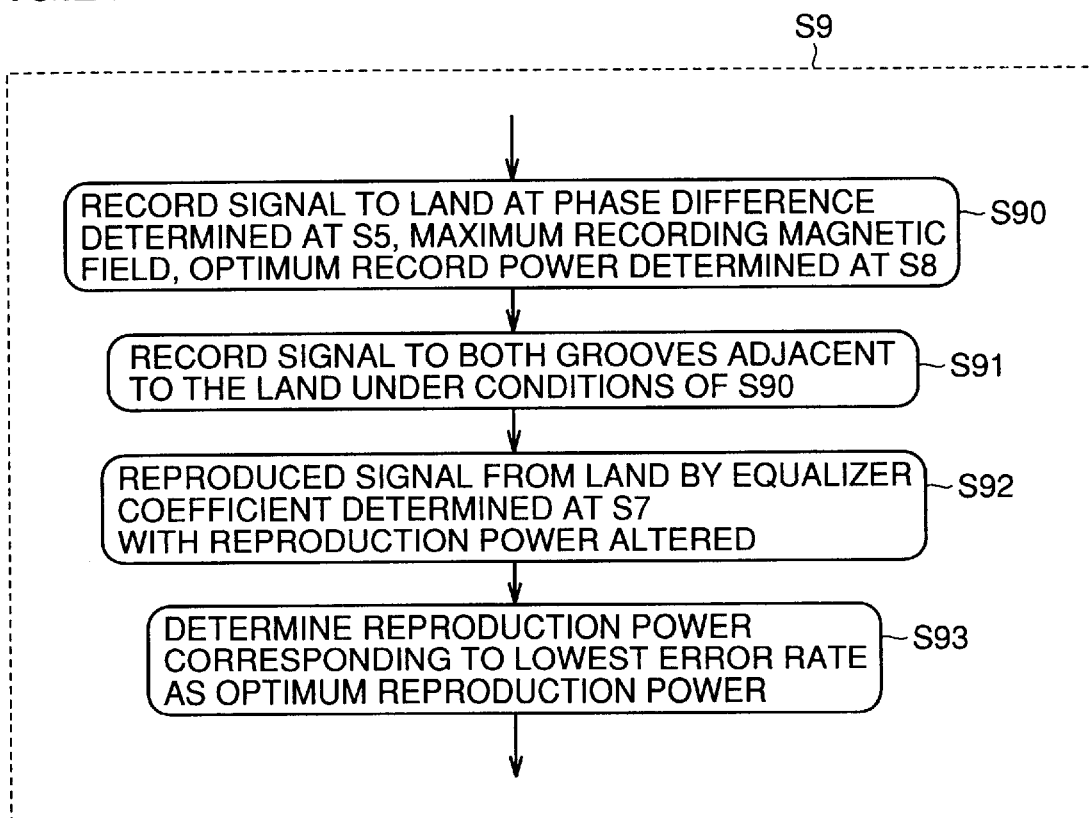
FIG. 21 is a flow chart of determining the optimum reproduction power of the flow chart of FIG. 9.

The operation of the recording/reproduction apparatus carried out at step S90 of FIG. 21 has been provided in the foregoing.

After recording a signal onto the land, control circuit 101 controls servo circuit 92 so as to jump to the track of groove 1 (the first groove) adjacent to the land according to the address information applied to control unit 1014 from PRML 96. After groove 1 is set to tracking ON, a signal is recorded onto groove 1 under the conditions identical to those of step S90. After a signal is recorded to groove 1, control circuit 101 controls servo circuit 92 so as to jump to the track of groove 2 (the second groove) adjacent to the land according to the address information. After groove 2 has been set to tracking ON, a signal is recorded onto groove 2 according to conditions identical to those of step S90.

The operation of the recording/reproduction apparatus carried out at step S91 of FIG. 21 has been provided in the foregoing.

Referring to FIG. 22 again, following signal recording onto the land, groove 1, and groove 2, control circuit 101 generates a driving signal (gr2) to produce a laser beam whose intensity is altered. Driving signal (gr2) is provided to laser drive circuit 102. Laser drive circuit 102 drives semiconductor laser 31 according to driving signal (gr2). Optical head 30 projects a laser beam to the land of magneto-optical recording media 10, 20 and 110 according to driving signal (gr2). A magneto-optical signal is detected at photodetector 37. Control circuit 101 controls equalizer 95 so as to set the equalizer coefficient of equalizer 95 to the provisional equalizer coefficient $EQ_{kopt}$ determined at step S7. The magneto-optical signal detected by photodetector 37 is reproduced by reproduced signal amplify circuit 93, BPF 94, equalizer 95 and PRML 96. The number of errors of the reproduced signal is provided from PRML 96 to functional unit 1011 of control circuit 101.

The operation of the recording/reproduction apparatus carried out at step S92 of FIG. 21 has been provided in the foregoing.

Figure 23:
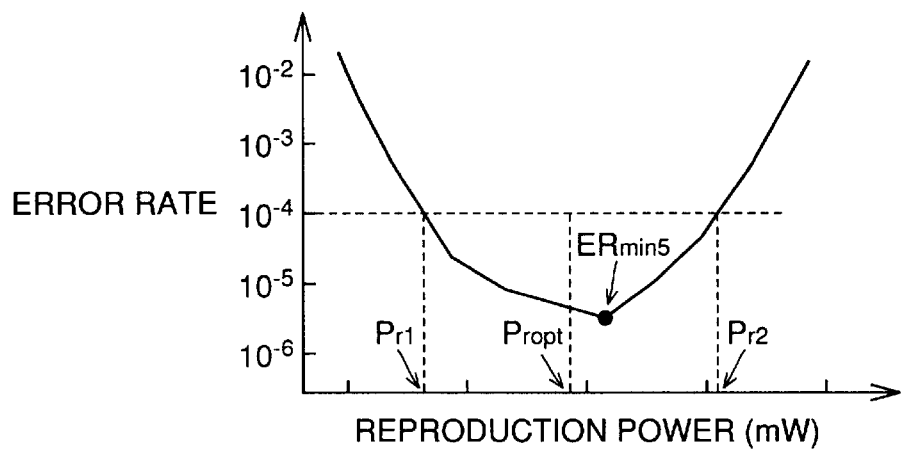
FIG. 23 is a diagram to describe a method of determining optimum reproduction power.

Control circuit 101 calculates the error rate of the reproduced signal according to the number of errors at functional unit 1011. The error rate with respect to the reproduction power (refer to FIG. 23) is provided to determination unit 1012. Determination unit 1012 detects reproduction power $P_{r1}$ and $P_{r2}$ corresponding to the error rate of $10^{-4}$ from the input. The optimum reproduction power $P_{ropt}$ is detected as the average $(P_{r1}+P_{r2})/2$ between reproduction power $P_{r1}$ and $P_{r2}$. As the method of identifying reproduction power $P_{r1}$ and $P_{r2}$, the reproduction power is increased from the lower level, and the point where the error rate is below the threshold value is set as reproduction power $P_{r1}$. The reproduction power is further increased, and the point where the error rate exceeds the threshold value is detected as reproduction power $P_{r2}$. Also, the reproduction power is reduced from the higher level, and the point where the error rate is below the threshold value is set as reproduction power $P_{r2}$. The reproduction power is further reduced, and the point where the error rate exceeds the threshold value is detected as reproduction power $P_{r1}$. The detected optimum reproduction power $P_{ropt}$ is provided to control unit 1014. Control unit 1014 generates a driving signal (gr4) to produce a pulse beam to reproduce a recorded signal with the intensity of the pulse beam set to optimum reproduction power $P_{ropt}$.

The signal recorded at the land of magneto-optical recording media 10, 20 and 110 is not limited to "10110101 ⋯ ". A predetermined number of signals having the domain length of 2T and signals having the domain length of 8T may be recorded alternately to determine the optimum reproduction power $P_{ropt}$.

The method of determining optimum reproduction power $P_{ropt}$ is not limited to the average value $(P_{r1}+P_{r2})/2$ between reproduction power $P_{r1}$ and $P_{r2}$. The recording power realizing the lowest error rate $ER_{min4}$ of the reproduced signal of FIG. 23 can be determined as optimum reproduction power $P_{ropt}$.

The flow chart of FIG. 24 to determine the optimum equalizer coefficient at step S10 of FIG. 9 will be described here. A driving signal to generate a magnetic field modulated according to a record signal having the highest intensity and the optimum recording power $P_{wopt}$ determined at step S8, and a driving signal generating a pulse beam having the optimum phase difference δopt determined at step S5 with respect to that driving signal generating a magnetic field are produced. A signal is recorded at the land of magneto-optical recording media 10, 20 and 110 according to the generated driving signals (step S100). A signal is also recorded to the grooves (first and second grooves) adjacent to the land where the signal has been recorded under the conditions identical to those of step S100 (step S101). The signal recorded at the land using the optimum reproduction power $P_{ropt}$ determined at step S9 is reproduced from the land with the provisional equalizer coefficient of equalizer 95 altered (step S102). The error rate of the reproduced signal is detected (step S103).

Figure 25:
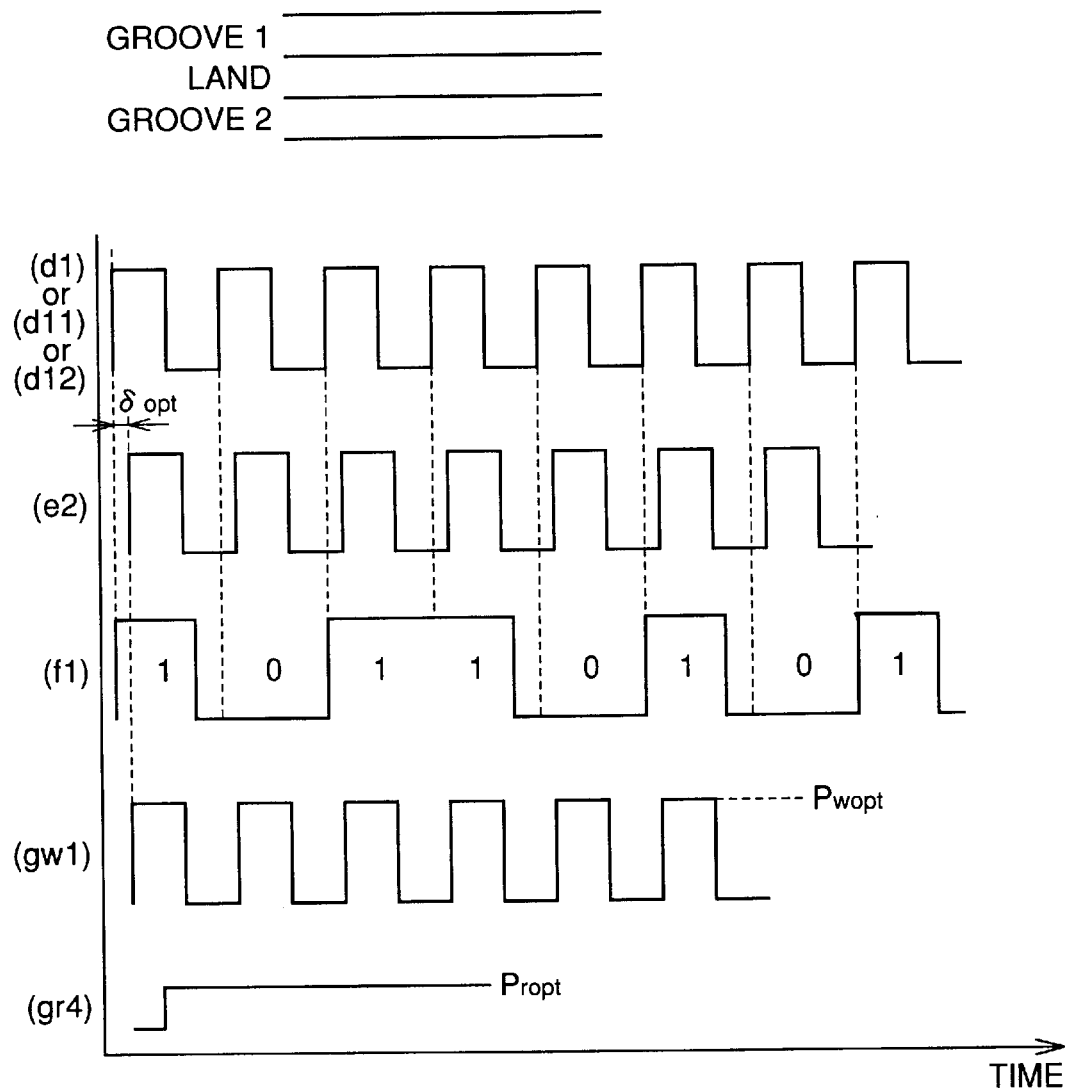
FIG. 25 shows signals to describe the operation executing the flow chart of FIG. 24.

Referring to FIG. 25, control circuit 101 generates a driving signal (f1) to produce a magnetic field of the maximum intensity modulated by a signal "10110101 ⋯ " in synchronization with external synchronizing signals (d1), (d11) and (d12). Driving signal (f1) is provided to magnetic head drive circuit 103. Also, a synchronizing signal (e2) corresponding to external synchronizing signals (d1), (d11) and (d12) delayed by the optimum phase difference δopt is generated. A driving signal (gw1) to produce a pulse beam having the optimum recording power determined at step S8 is generated in synchronization with synchronizing signal (e2). Driving signal (gw1) is provided to laser drive circuit 102. Magnetic head drive circuit 103 drives magnetic head 104 according to driving signal (f1). Magnetic head 104 applies a magnetic field according to driving signal (f1) to the land of magneto-optical recording media 10, 20 and 110. Laser drive circuit 102 drives semiconductor laser 31 according to driving signal (gw1). Semiconductor laser 31 generates a pulse beam according to driving signal (gw1). Optical head 30 projects that pulse beam to the land of magneto-optical recording media 10, 20 and 110. Accordingly, signal "10110101 ⋯ " is recorded at the land of magneto-optical recording media 10, 20 and 110. Although driving signal (gw1) is generated with optimum phase difference δopt set with respect to driving signal (f1), the period of semiconductor laser 31 turned on is set so that the magnetic field is applied to the land of magneto-optical recording media 10, 20 and 110. Accordingly, a signal can be reliably recorded at the land of magneto-optical recording media 10, 20 and 110.

Figure 24:
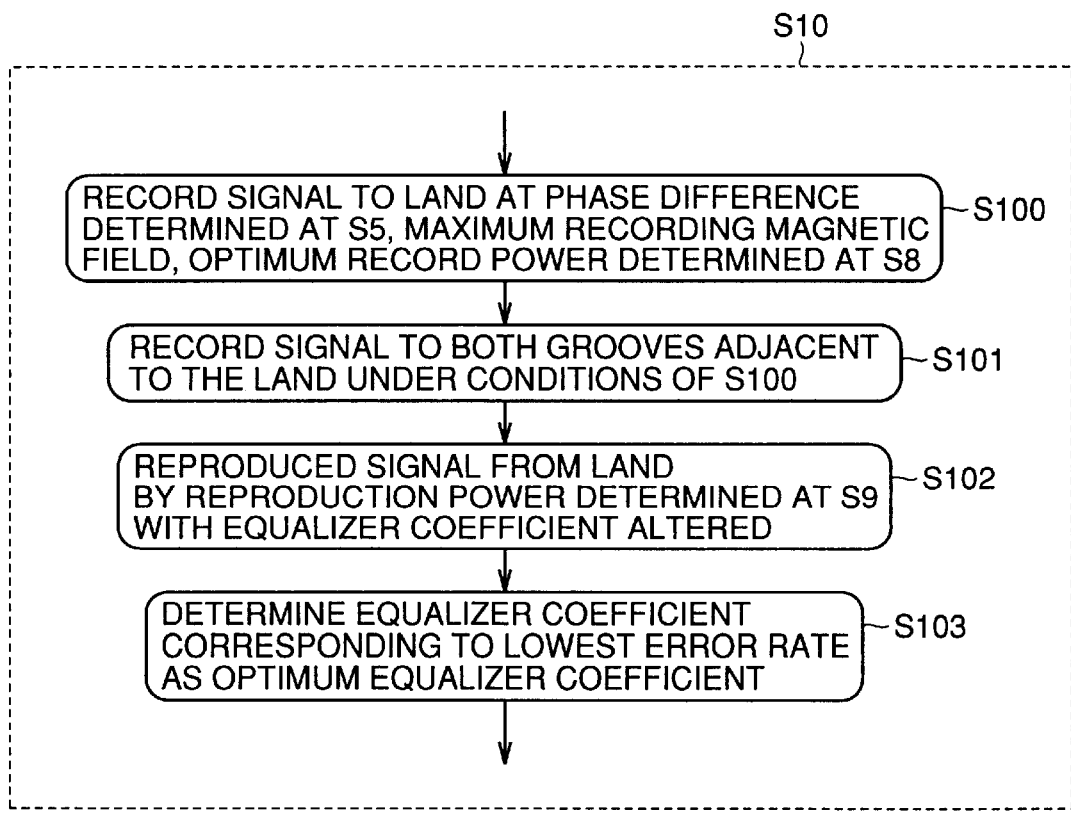
FIG. 24 is a flow chart of determining the optimum equalizer coefficient of the flow chart of FIG. 9.

The operation of the recording/reproduction apparatus carried out at step S100 of FIG. 24 has been provided in the foregoing.

After recording a signal onto the land, control circuit 101 controls servo circuit 92 so as to jump to the track of groove 1 (the first groove) adjacent to the land according to the address information applied to control unit 1014 from PRML 96. After groove 1 is set to tracking ON, a signal is recorded onto groove 1 under the conditions identical to those of step S100. After a signal is recorded to groove 1, control circuit 101 controls servo circuit 92 so as to jump to the track of groove 2 (the second groove) adjacent to the land according to the address information. After groove 2 has been set to tracking ON, a signal is recorded onto groove 2 according to conditions identical to those of step S100.

The operation of the recording/reproduction apparatus carried out at step S101 of FIG. 24 has been provided in the foregoing.

Referring to FIG. 25 again, following signal recording onto the land, groove 1, and groove 2, control circuit 101 controls equalizer 95 so as to remove waveform interference from the magneto-optical signal reproduced with the equalizer coefficient of equalizer 95 altered. Control circuit 101 also generates a driving signal (gr4) to produce a laser beam having the intensity set to the optimum reproduction power $P_{ropt}$ determined at step S9. Driving signal (gr4) is provided to laser drive circuit 102. Laser drive circuit 102 drives semiconductor laser 31 according to driving signal (gr4). Optical head 30 projects a laser beam to the land of magneto-optical recording media 10, 20 and 110 according to driving signal (gr4). A magneto-optical signal is reproduced by detecting the reflected light by photodetector 37.

The magneto-optical signal detected by photodetector 37 is reproduced by reproduced signal amplify circuit 93, BPF 94, equalizer 95 and PRML 96. The number of errors of the reproduced signal is provided from PRML 96 to functional unit 1011 of control circuit 101.

The operation of the recording/reproduction apparatus carried out at step 102 of FIG. 24 has been provided in the foregoing.

Figure 26:
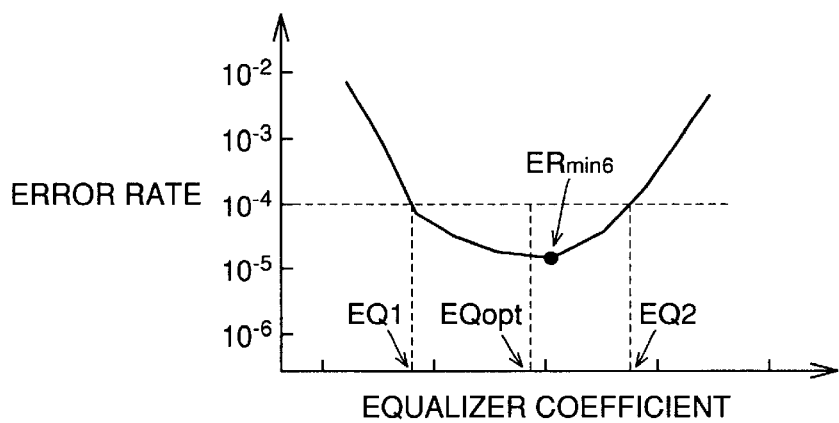
FIG. 26 is a diagram to describe the method of determining the optimum equalizer coefficient.

Control circuit 101 calculates the error rate of the equalizer coefficient according to the number of errors at functional unit 1011. The error rate with respect to the equalizer coefficient (refer to FIG. 26) is provided to determination unit 1012. Determination unit 1012 detects equalizer coefficient EQ1 and EQ2 corresponding to the error rate of $10^{-4}$ from the input. The optimum equalizer coefficient $EQ_{opt}$ is detected as the average (EQ1+EQ2)/2 between equalizer coefficient EQ1 and EQ2. The detected optimum equalizer coefficient $EQ_{opt}$ is provided to control unit 1014. Control unit 1014 set the equalizer coefficient of equalizer 95 to the optimum equalizer coefficient $EQ_{opt}$.

The signal recorded at the land of magneto-optical recording media 10, 20 and 110 is not limited to "10110101 ⋯ ". A predetermined number of signals having the domain length of 2T and signals having the domain length of 8T may be recorded alternately to determine the optimum equalizer coefficient $P_{wopt}$.

The method of determining optimum equalizer coefficient $EQ_{opt}$ is not limited to the average value (EQ1+EQ2)/2 between equalizer coefficient EQ1 and EQ2. The equalizer coefficient realizing the lowest error rate $ER_{min6}$ of the reproduced signal of FIG. 26 can be determined as optimum equalizer coefficient $EQ_{opt}$.

The flow chart of FIG. 27 to determine the optimum recording magnetic field at step S11 of FIG. 9 will be described here. A driving signal generating a magnetic field modulated according to a record signal and having the optimum recording power $P_{wopt}$ determined at step S8, and a driving signal generating a pulse beam having the optimum phase difference δopt determined at step S5 with respect to that driving signal generating a magnetic field are produced. A signal is recorded at magneto-optical recording media 10, 20 and 110 according to the generated driving signals (step S110). The signal recorded using the optimum reproduction power $P_{ropt}$ determined at step S9 is reproduced with the optimum equalizer coefficient $EQ_{opt}$ determined at step S10 set(step S111). The error rate of the reproduced signal is detected, and the magnetic intensity corresponding to the error rate that is below the predetermined value is determined as the optimum magnetic filed intensity (step S112).

Figure 28:
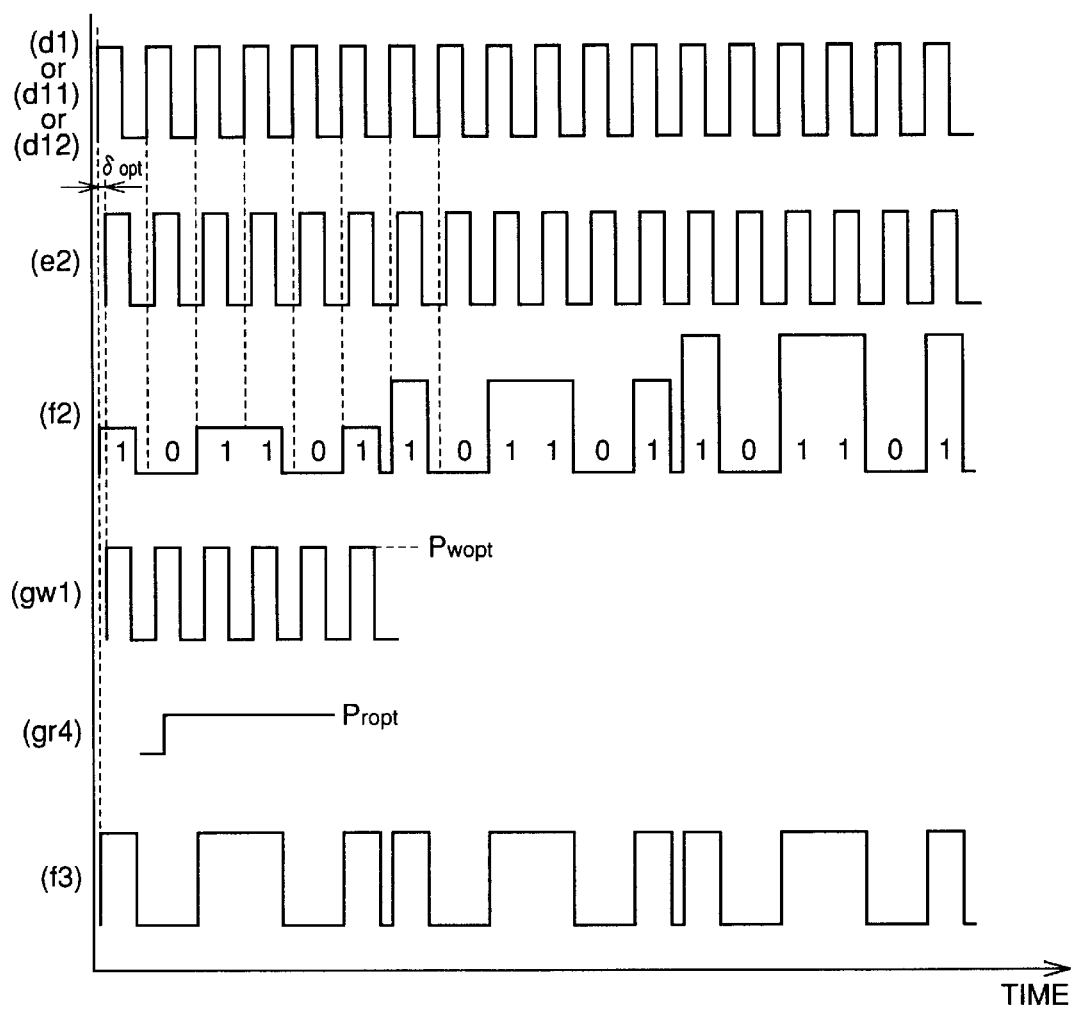
FIG. 28 shows signals to describe the operation executing the flow chart of FIG. 27.

Referring to FIG. 28, control circuit 101 generates a driving signal (f2) to produce a magnetic field modulated by a signal "10110101 ⋯ " in synchronization with external synchronizing signals (d1), (d11) and (d12). Driving signal (f2) is provided to magnetic head drive circuit 103. Also, a synchronizing signal (e2) corresponding to external synchronizing signals (d1), (d11) and (d12) delayed by the optimum phase difference δopt is generated. A driving signal (gw1) to produce a pulse beam having the optimum recording power determined at step S8 is generated in synchronization with synchronizing signal (e2). Driving signal (gw1) is provided to laser drive circuit 102. Magnetic head drive circuit 103 drives magnetic head 104 according to driving signal (f2). Magnetic head 104 applies a magnetic field according to driving signal (f2) to magneto-optical recording media 10, 20 and 110. Laser drive circuit 102 drives semiconductor laser 31 according to driving signal (gw1). Semiconductor laser 31 generates a pulse beam according to driving signal (gw1). Optical head 30 projects that pulse beam to the land of magneto-optical recording media 10, 20 and 110. Accordingly, signal "10110101 ··· " is recorded at the land of magneto-optical recording media 10, 20 and 110. Although driving signal (gw1) is generated with optimum phase difference δopt set with respect to driving signal (f2), the period of semiconductor laser 31 turned on is set so that the magnetic field is applied to magneto-optical recording media 10, 20 and 110. Accordingly, a signal can be reliably recorded at the land of magneto-optical recording media 10, 20 and 110.

Figure 27:
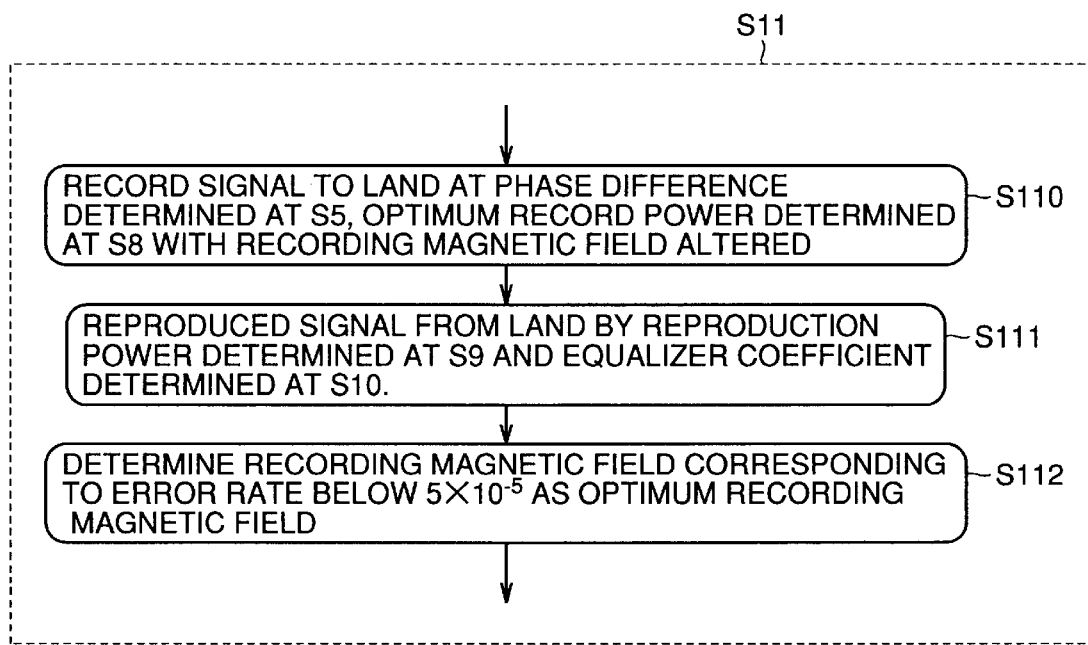
FIG. 27 is a flow chart of determining the optimum recording magnetic field of the flow chart of FIG. 9.

The operation of the recording/reproduction apparatus carried out at step S110 of FIG. 27 has been provided in the foregoing.

Referring to FIG. 28 again, following signal recording onto the land, groove 1, and groove 2, control circuit 101 generates a driving signal (gr4) to produce a laser beam having an intensity set to the optimum reproduction power $P_{ropt}$ determined at step S9. Driving signal (gr4) is provided to laser drive circuit 102. Laser drive circuit 102 drives semiconductor laser 31 according to driving signal (gr4). Optical head 30 projects a laser beam to magneto-optical recording media 10, 20 and 110 according to driving signal (gr4). A magneto-optical signal is reproduced by detecting the reflected light by photodetector 37. Control circuit 101 sets the equalizer coefficient of equalizer 95 to optimum equalizer coefficient EQ opt determined at step S10.

The magneto-optical signal detected by photodetector 37 is reproduced by reproduced signal amplify circuit 93, BPF 94, equalizer 95 and PRML 96. The number of errors of the reproduced signal is provided from PRML 96 to functional unit 1011 of control circuit 101.

The operation of the recording/reproduction apparatus carried out at step 1111 of FIG. 27 has been provided in the foregoing.

Figure 29:
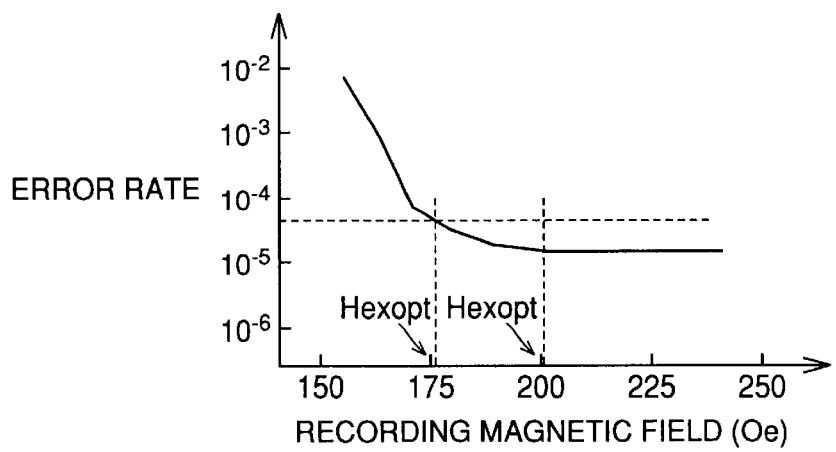
FIG. 29 is a diagram to describe the method of determining the optimum recording magnetic field.

Control circuit 101 calculates the error rate of the reproduced signal according to the number of errors at functional unit 1011. The error rate with respect to the reproduction power (refer to FIG. 29) is provided to determination unit 1012. Determination unit 1012 detects the recording magnetic field corresponding to the error rate of $5 \times 10^{-5}$ from the input as the optimum recording magnetic field Hexopt. The detected optimum recording magnetic field Hexopt is provided to control unit 1014. Control unit 1014 generates a driving signal (f3) to produce a magnetic field having optimum recording magnetic field Hexopt. That driving signal (f3) is provided to magnetic head driving circuit 103.

The signal recorded at the land of magneto-optical recording media 10, 20 and 110 is not limited to "10110101 ··· ". A predetermined number of signals having the domain length of 2T and signals having the domain length of 8T may be recorded alternately to determine the optimum recording magnetic field Hexopt.

The method of determining optimum magnetic field Hexopt is not limited to the record magnetic field corresponding to the error rate below $5 \times 10^{-5}$ The recording magnetic field corresponding to the reproduced signal error rate of substantially a constant value may be used instead.

Referring to FIG. 9 again, following the optimization of various conditions for the land, optimization of various conditions for the groove is carried out including determination of the provisional reproduction power (step S13), determination of the optimum recording power (step S14), and determination of the optimum reproduction power (step S15). The flow charts of steps S13, S14 and S15 are similar to those of steps S6, S8 and S9, respectively. More specifically, in determining the optimum recording power for the groove at step S14, a signal is recorded at the groove with the recording power altered. The recorded signal is reproduced to detect the optimum recording power from the error rate. The equalizer coefficient of equalizer 95 used here is the optimum equalizer coefficient determined at step S10. Similarly, the equalizer coefficient of equalizer 95 used in determining the optimum reproduction power in reproducing a signal from the groove at step S15 is the optimum equalizer coefficient. The remaining elements are similar to those already described, so that description thereof will not be repeated.

In the case where the optimum recording power differs between the land and groove, respective optimum recording powers are stored in memory 1013 (refer to FIG. 4) of control circuit 101. In recording a signal to the land, the land optimum recording power stored in memory 1013 is read out by control unit 1014. A driving signal generating a pulse beam of that intensity is generated, and provided to laser drive circuit 102. In recording a signal to a groove, the groove optimum recording power is read out from memory 1013 by control unit 1014. A driving signal generating a pulse beam of that intensity is generated and provided to laser drive circuit 102.

The land optimum recording power and the groove optimum recording power can be averaged to be used as the optimum recording power. In this case, the average between the amplitudes of the driving signal to generate a pulse beam having the land optimum recording power and the driving signal to generate a pulse beam having the groove optimum recording power is employed as the amplitude, and a driving signal having a phase identical to the driving signal that generates a pulse beam having the groove optimum recording power and a driving signal to generate a pulse beam having a land optimum recording power are generated by control circuit 101. The generated driving signals are provided to laser drive circuit 102.

Similarly, the average of the reproduction power may also be employed. In this case, the generation of driving signals are identical to those described above.

Various conditions are optimized with the error rate as the reference. The present invention is not limited to the error rate, and optimization can be carried out according to the number of errors applied from PRML 96 to functional unit 1011 of control circuit 101.

It has been described that the highest and lowest values of the recording power, the maximum recording magnetic field, the smallest and largest values of the reproduction power, the phase difference between the magnetic field and the pulse beam, and the equalizer coefficient are recorded in advance at TOC region 10T1 of magneto-optical recording media 10, 20 and 110. However, these values may be prestored in control circuit 101.

The above description has been provided wherein the provisional reproduction power, provisional equalizer coefficient, optimum recording power, optimum reproduction power, optimum equalizer coefficient and optimum recording magnetic field for the land are determined, followed by determination of the provisional reproduction power, optimum recording power, and optimum reproduction power for the groove. Determination can be made in an opposite manner.

Following the setting of the provisional reproduction power, provisional equalizer coefficient, optimum recording power, optimum reproduction power, optimum equalizer coefficient and optimum recording magnetic field with respect to the land/groove described with reference to FIGS. 9–29, control circuit 101 provides driving signals according to the optimized results to laser drive circuit 102 and magnetic head drive circuit 103, and the optimum equalizer coefficient is provided to equalizer 95, whereby a signal is recorded and/or reproduced to/from magneto-optical recording media, 10, 20 and 110 under the optimum condition.

Figure 30:
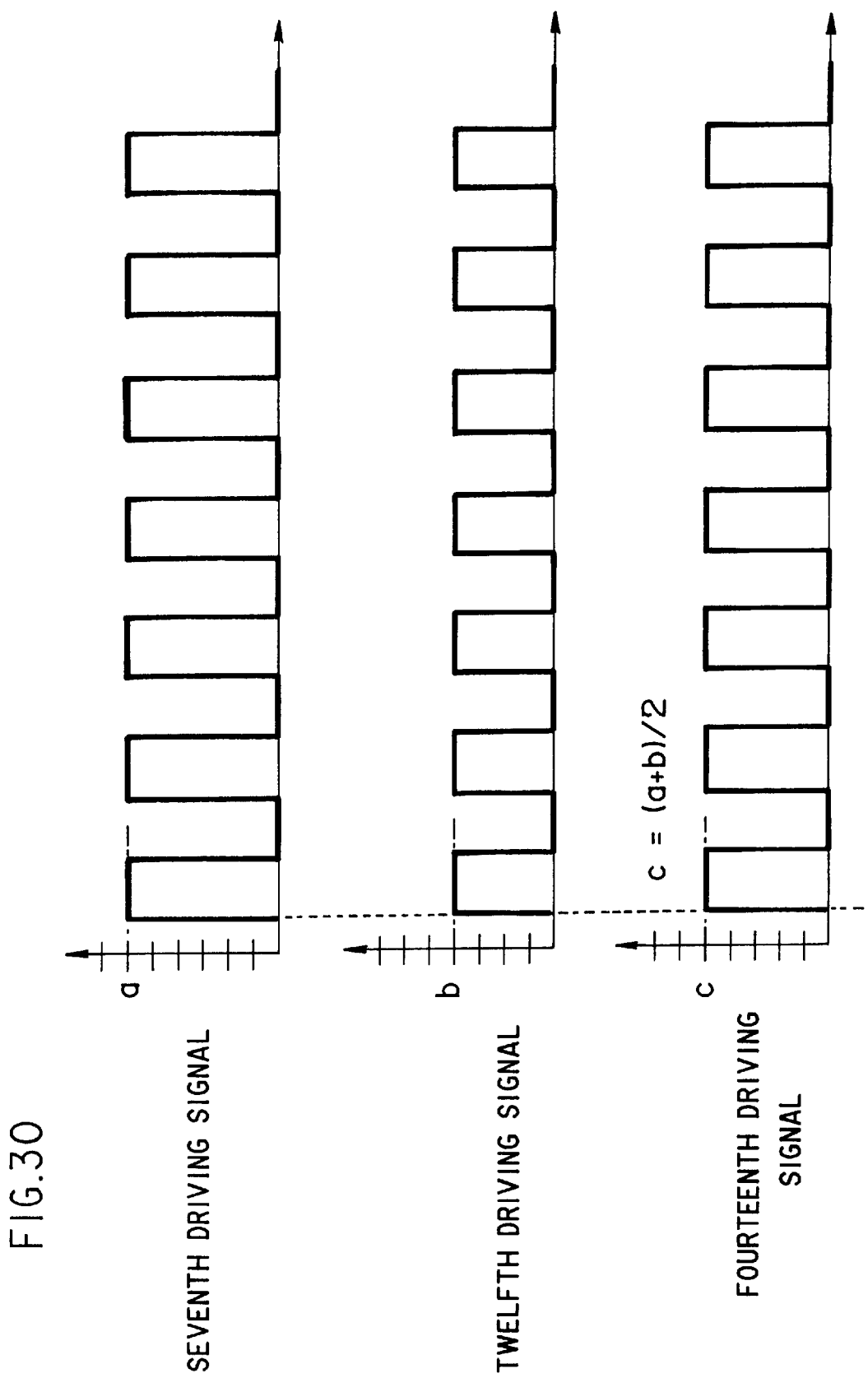
FIG. 30 is a diagram to describe the method of deriving the Fourteenth driving signal.

FIG. 30 shows three driving signals. The seventh driving signal is given a designation a. The twelfth driving signal is given a designation b. The fourteenth driving signal is given a designation c. As shown in the fourteenth driving signal, an equation c=(a+b)/2 describes the inter-relationship between the seventh driving signal, the twelfth driving signal and the fourteenth driving signal.

Figure 31:
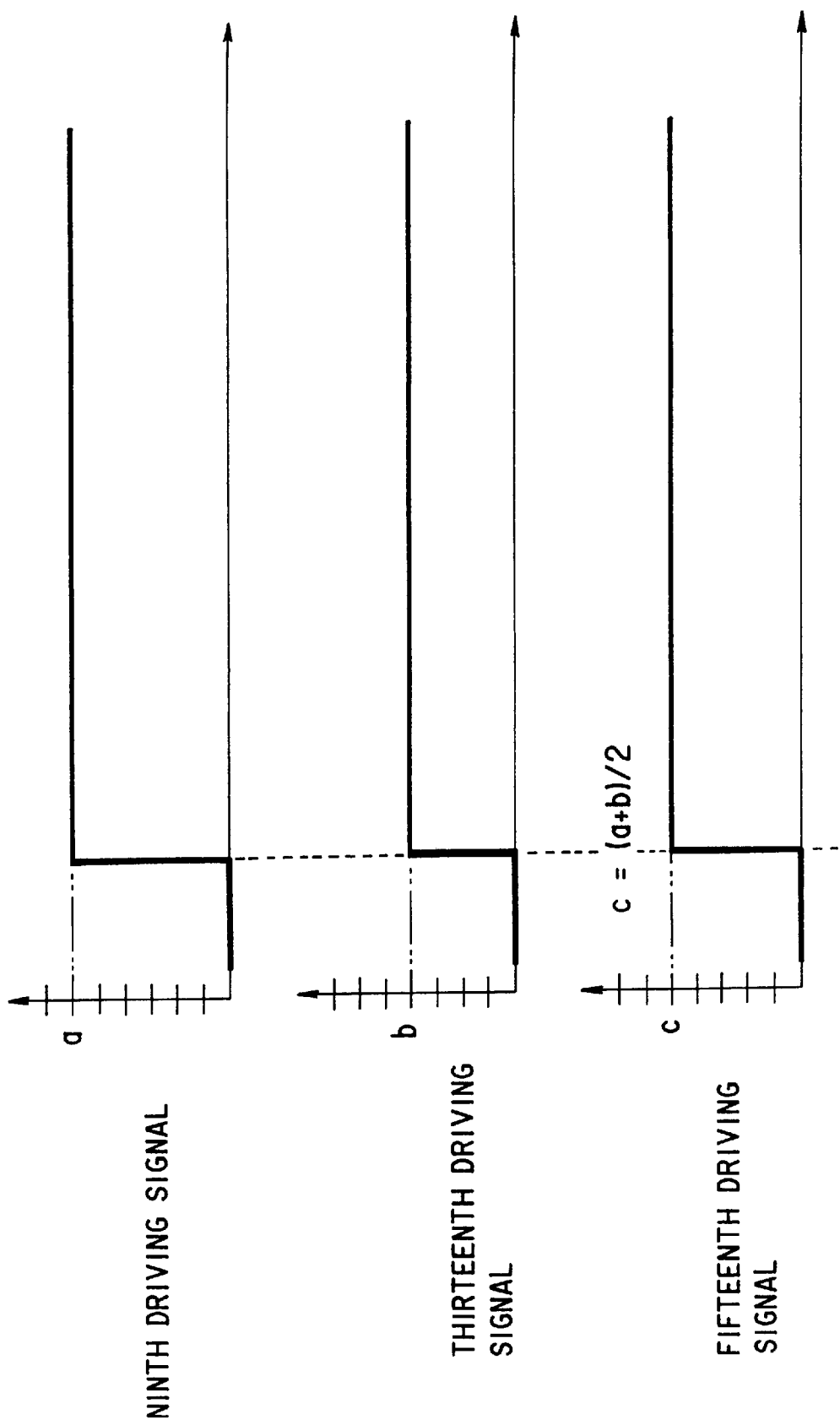
FIG. 31 is a diagram to describe the method of deriving the Fifteenth driving signal.

FIG. 31 shows three driving signals. The ninth driving signal is given a designation a. The thirteenth driving signal is given a designation b. The fifteenth driving signal is given a designation c. As shown in the fifteenth driving signal, an equation c=(a+b)/2 describes the inter-relationship between the ninth driving signal, the thirteenth driving signal and the fifteenth driving signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording/reproduction apparatus recording and/or reproducing a signal to and/or from a magneto-optical recording medium, comprising:

an optical head emitting a laser beam to said magneto-optical recording medium and detecting reflected light therefrom, a laser drive circuit driving a semiconductor laser in said optical head, a magnetic head applying a magnetic field to said magneto-optical recording medium, a magnetic head drive circuit driving said magnetic head, an equalizer removing waveform interference of a magneto-optical signal reproduced by said optical head, a servo circuit controlling tracking of a laser beam emitted from said optical head, and a control circuit, wherein said control circuit generates a first driving signal for said magnetic head to generate a magnetic field of a predetermined intensity modulated by a record signal, and provides said first driving signal to said magnetic head drive circuit, generates a second driving signal having an optimum phase difference from said first driving signal for said optical head to emit a pulse beam of a predetermined intensity, and provides said second driving signal to said laser drive circuit, after a signal is recorded on said magneto-optical recording medium by said first and second driving signals, generates a third driving signal altering intensity of the laser beam to reproduce the recorded signal and generates a fourth driving signal to set a provisional optimum laser beam intensity to reproduce the recorded signal, and provides said fourth driving signal to said laser drive circuit, determines a provisional optimum equalizer coefficient in removing waveform interference of a magneto-optical signal reproduced from said magneto-optical recording medium using a laser beam according to said fourth driving signal by said optical head, and sets the equalizer coefficient of said equalizer to the determined provisional optimum equalizer coefficient, following determination of the optimum phase difference between said first driving signal and said second driving signal, said provisional optimum laser beam intensity, and said provisional optimum equalizer coefficient, generates a fifth driving signal for said magnetic head to generate a magnetic field having the maximum magnetic field intensity, modulated by a record signal, and provides said fifth driving signal to said magnetic head drive circuit, generates a sixth driving signal having said optimum phase difference from said fifth driving signal for said optical head to emit a pulse beam whose intensity is altered, and provides said sixth driving signal to said laser drive circuit, generates a seventh driving signal having an optimum phase difference from said fifth driving signal for said optical head to emit a pulse beam having an optimum intensity to record a signal to said magneto-optical recording medium, determined using the optimum phase difference between said first and second driving signals, said provisional optimum laser beam intensity and said provisional optimum equalizer circuit, and provides said seventh driving signal to said laser drive circuit, controls said servo circuit so as to record a signal in an order of a land of said magneto-optical recording medium, a first groove adjacent to said land, and a second groove adjacent to said land, or in the order of a groove of said magneto-optical recording medium, a first land adjacent to said groove, and a second land adjacent to said groove according to said fifth and seventh driving signals, after recording a signal to said land, said first groove, and said second groove, or to said groove, said first land and said second land according to said fifth and seventh driving signals, generates an eighth driving signal for said optical head to reproduce the signal recorded in said land or said groove with the intensity of the laser beam altered, and provides said eighth driving signal to said laser drive circuit, and determines an optimum laser beam intensity according to a magneto-optical signal reproduced by said optical head from said land or said groove according to said eighth driving signal.

2. A recording/reproduction apparatus recording and/or reproducing a signal to and/or from a magneto-optical recording medium, comprising:

an optical head emitting a laser beam to said magneto-optical recording medium and detecting reflected light therefrom, a laser drive circuit driving a semiconductor laser in said optical head, a magnetic head applying a magnetic field to said magneto-optical recording medium, a magnetic head drive circuit driving said magnetic head, an equalizer removing waveform interference of a magneto-optical signal reproduced by said optical head, a servo circuit controlling tracking of a laser beam emitted from said optical head, and a control circuit, wherein said control circuit generates a first driving signal for said magnetic head to generate a magnetic field of a predetermined intensity modulated by a record signal, and provides said first driving signal to said magnetic head drive circuit, generates a second driving signal having an optimum phase difference from said first driving signal for said optical head to emit a pulse beam of a predetermined intensity, and provides said second driving signal to said laser drive circuit, after a signal is recorded on said magneto-optical recording medium by said first and second driving signals, generates a third driving signal altering intensity of the laser beam to reproduce the recorded signal and generates a fourth driving signal to set a provisional optimum laser beam intensity to reproduce the recorded signal, and provides said fourth driving signal to said laser drive circuit signal, determines a provisional optimum equalizer coefficient in removing waveform interference of a magneto-optical signal reproduced from said magneto-optical recording medium using a laser beam according to said fourth driving signal by said optical head, and sets the equalizer coefficient of said equalizer to the determined provisional optimum equalizer coefficient, following determination of the optimum phase difference between said first driving signal and said second driving signal, said provisional optimum laser beam intensity, and said provisional optimum equalizer coefficient, generates a fifth driving signal for said magnetic head to generate a magnetic field having the maximum magnetic field intensity, modulated by a record signal, and provides said fifth driving signal to said magnetic head drive circuit, generates a seventh driving signal having an optimum phase difference from said fifth driving signal for said optical head to emit a pulse beam having an optimum intensity to record a signal to said magneto-optical recording medium, determined using the optimum phase difference between said first and second driving signals, said provisional optimum laser beam intensity and said provisional optimum equalizer circuit, and provides said seventh driving signal to said laser drive circuit, generates a sixth driving signal having said optimum phase difference from said fifth driving signal for said optical head to emit a pulse beam whose intensity is altered, and provides said sixth driving signal to said laser drive circuit, controls said servo circuit so as to record a signal in an order of a land of said magneto-optical recording medium, a first groove adjacent to said land, and a second groove adjacent to said land, or in the order of a groove of said magneto-optical recording medium, a first land adjacent to said groove, and a second land adjacent to said groove according to said fifth and seventh driving signals, after recording a signal to said land, said first groove and said second groove, or said groove, said first land and said second land according to said fifth and seventh driving signals, generates a ninth driving signal for said optical head to emit a laser beam of an optimum intensity to reproduce a signal recorded at said land or said groove, and provides said ninth driving signal to said laser drive circuit, determines an optimum equalizer coefficient to remove waveform interference according to a magneto-optical signal removed of waveform interference with the equalizer coefficient of said equalizer altered corresponding to a magneto-optical signal reproduced from said recorded signal at said land or said groove by said optical head according to said ninth driving signal, and setting the equalizer coefficient of said equalizer to the optimum equalizer coefficient.

3. A recording/reproduction apparatus recording and/or reproducing a signal to and/or from a magneto-optical recording medium, comprising:

an optical head emitting a laser beam to said magneto-optical recording medium and detecting reflected light therefrom, a laser drive circuit driving a semiconductor laser in said optical head, a magnetic head applying a magnetic field to said magneto-optical recording medium, a magnetic head drive circuit driving said magnetic head, an equalizer removing waveform interference of a magneto-optical signal reproduced by said optical head, a servo circuit controlling tracking of a laser beam emitted from said optical head, and a control circuit, wherein said control circuit generates a first driving signal for said magnetic head to generate a magnetic field of a predetermined intensity modulated by a record signal, and provides said first driving signal to said magnetic head drive circuit, generates a second driving signal having an optimum phase difference from said first driving signal for said optical head to emit a pulse beam of a predetermined intensity, and provides said second driving signal to said laser drive circuit, after a signal is recorded on said magneto-optical recording medium by said first and second driving signals, generates a third driving signal altering intensity of the laser beam to reproduce the recorded signal and generates a fourth driving signal to set a provisional optimum laser beam intensity to reproduce the recorded signal, and provides said fourth driving signal to said laser drive circuit, determines a provisional optimum equalizer coefficient in removing waveform interference of a magneto-optical signal reproduced from said magneto-optical recording medium using a laser beam according to said fourth driving signal by said optical head, and sets the equalizer coefficient of said equalizer to the determined provisional optimum equalizer coefficient, following determination of the optimum phase difference between said first driving signal and said second driving signal, said provisional optimum laser beam intensity, and said provisional optimum equalizer coefficient, generates a fifth driving signal for said magnetic head to generate a magnetic field having the maximum magnetic field intensity, modulated by a record signal, and provides said fifth driving signal to said magnetic head drive circuit, generates a sixth driving signal having said optimum phase difference from said fifth driving signal for said optical head to emit a pulse beam whose intensity is altered, and provides said sixth driving signal to said laser drive circuit, generates a seventh driving signal having an optimum phase difference from said fifth driving signal for said optical head to emit a pulse beam having an optimum intensity to record a signal to said magneto-optical recording medium; determined using the optimum phase difference between said first and second driving signals, said provisional optimum laser beam intensity and said provisional optimum equalizer circuit, and provides said seventh driving signal to said laser drive circuit, controls said servo circuit so as to record a signal in an order of a land of said magneto-optical recording medium, a first groove adjacent to said land, and a second groove adjacent to said land, or in the order of a groove of said magneto-optical recording medium, a first land adjacent to said groove, and a second land adjacent to said groove according to said fifth and seventh driving signals, after recording a signal to said land of said magneto-optical recording medium, said first groove adjacent to said land and said second groove adjacent to said land, or to said groove of said magneto-optical recording-medium, said first land adjacent to said groove and said second land adjacent to said groove according to said fifth and seventh driving signals, generates an eighth driving signal by a laser beam whose intensity is altered and determining a provisional optimum laser beam intensity according to the reproduced magneto-optical signal, generates a ninth driving signal for said optical head to emit a laser beam of an optimum intensity to reproduce a signal recorded at said land or said groove, and provides said ninth driving signal to said laser drive circuit, sets the equalizer coefficient of said equalizer to the optimum equalizer coefficient determined from a magneto-optical signal which is a reproduction by said optical head according to said ninth driving signal of said signal recorded at said land or said groove, generates a tenth driving signal having a phase identical to the phase of said fifth driving signal for said magnetic head to generate a magnetic field modulated by a record signal to be altered in intensity, and provides said tenth driving signal to said magnetic head drive circuit, determines an optimum magnetic field intensity to record a signal from a magneto-optical signal corresponding to the signal recorded said magneto-optical recording medium according to said seventh and tenth driving signals reproduced by said optical head according to said ninth driving signal.

4. A recording/reproduction apparatus recording and/or reproducing a signal to and/or from a magneto-optical recording medium, comprising:

an optical head emitting a laser beam to said magneto-optical recording medium and detecting reflected light therefrom, a laser drive circuit driving a semiconductor laser in said optical head, a magnetic head applying a magnetic field to said magneto-optical recording medium, a magnetic head drive circuit driving said magnetic head, an equalizer removing waveform interference of a magneto-optical signal reproduced by said optical head, a servo circuit controlling tracking of a laser beam emitted from said optical head, and a control circuit, wherein said control circuit generates a first driving signal for said magnetic head to generate a magnetic field of a predetermined intensity modulated by a record signal, and provides said first driving signal to said magnetic head drive circuit, generates a second driving signal having an optimum phase difference from said first driving signal for said optical head to emit a pulse beam of a predetermined intensity, and provides said second driving signal to said laser drive circuit, after a signal is recorded on said magneto-optical recording medium by said first and second driving signals, generates a third driving signal altering intensity of the laser beam to reproduce the recorded signal and generates a fourth driving signal to set a provisional optimum laser beam intensity to reproduce the recorded signal, and provides said fourth driving signal to said laser drive circuit, determines a provisional optimum equalizer coefficient in removing waveform interference of a magneto-optical signal reproduced from said magneto-optical recording medium using a laser beam according to said fourth driving signal by said optical head, and sets the equalizer coefficient of said equalizer to the determined provisional optimum equalizer coefficient, following determination of the optimum phase difference between said first driving signal and said second driving signal, said provisional optimum laser beam intensity, and said provisional optimum equalizer coefficient, generates a fifth driving signal for said magnetic head to generate a magnetic field having the maximum magnetic field intensity, modulated by a record signal, and provides said fifth driving signal to said magnetic head drive circuit, generates a sixth driving signal having said optimum phase difference from said fifth driving signal for said optical head to emit a pulse beam whose intensity is altered, and provides said sixth driving signal to said laser drive circuit, generates a seventh driving signal having an optimum phase difference from said fifth driving signal for said optical head to emit a pulse beam having an optimum intensity to record a signal to said magneto-optical recording medium, determined using the optimum phase difference between said first and second driving signals, said provisional optimum laser beam intensity and said provisional optimum equalizer coefficient, and provides said seventh driving signal to said laser drive circuit, controls said servo circuit so as to record a signal in an order of a land of said magneto-optical recording medium, a first groove adjacent to said land, and a second groove adjacent to said land, or in the order of a groove of said magneto-optical recording medium, a first land adjacent to said groove, and a second land adjacent to said groove according to said fifth and seventh driving signals, after recording a signal to said land of said magneto-optical recording medium, said first groove adjacent to said land and said second groove adjacent to said land, or to said groove of said magneto-optical recording medium, said first land adjacent to said groove and said second land adjacent to said groove according to said fifth and seventh driving signals, generates an eighth driving signal by a laser beam whose intensity is altered and determining a provisional optimum laser beam intensity according to the reproduced magneto-optical signal, generates a ninth driving signal for said optical head to emit a laser beam of an optimum intensity to reproduce a signal recorded at said land or said groove, and provides said ninth driving signal to said laser chive circuit, sets the equalizer coefficient of said equalizer to the optimum equalizer coefficient determined from a magneto-optical signal which is a reproduction by said optical head according to said ninth driving signal of said signal recorded at said land or said groove, generates a tenth driving signal having a phase identical to the phase of said fifth driving signal for said magnetic head to generate a magnetic field modulated by a record signal to be altered in intensity, and provides said tenth driving signal to said magnetic head drive circuit, determines an optimum magnetic field intensity to record a signal from a magneto-optical signal corresponding to a signal recorded at said magneto-optical recording medium according to said seventh and tenth driving signals reproduced by said optical head according to said ninth driving signal, and generates an eleventh driving signal having the determined intensity, and a phase identical to the phase of said fifth driving signal, recording and/or reproducing a signal to and/or from said magneto-optical recording medium according to said optimum phase difference, said optimum equalizer coefficient, said seventh driving signal, said ninth driving signal and said eleventh driving signals.

5. A recording/reproduction apparatus recording and/or reproducing a signal to and/or from a magneto-optical recording medium, comprising:

an optical head emitting a laser beam to said magneto-optical recording medium and detecting reflected light therefrom, a laser drive circuit driving a semiconductor laser in said optical head, a magnetic head applying a magnetic field to said magneto-optical recording medium, a magnetic head drive circuit driving said magnetic head, an equalizer removing waveform interference of a magneto-optical signal reproduced by said optical head, a servo circuit controlling tracking of a laser beam emitted from said optical head, and a control circuit, wherein said control circuit generates a first driving signal for said magnetic head to generate a magnetic field of a predetermined intensity modulated by a record signal, and provides said first driving signal to said magnetic head drive circuit, generates a second driving signal having an optimum phase difference from said first driving signal for said optical head to emit a pulse beam of a predetermined intensity, and provides said second driving signal to said laser drive circuit, after a signal is recorded on said magneto-optical recording medium by said first and second driving signals, generates a third driving signal altering intensity of the laser beam to reproduce the recorded signal and generates a fourth driving signal to set a provisional optimum laser beam intensity to reproduce the recorded signal, and provides said fourth driving signal to said laser drive circuit, determines a provisional optimum equalizer coefficient in removing waveform interference of a magneto-optical signal reproduced from said magneto-optical recording medium using said laser beam using said fourth driving signal by said optical head, and sets the equalizer coefficient of said equalizer to the determined provisional optimum equalizer coefficient, following determination of the optimum phase difference between said first driving signal and said second driving signal, said provisional optimum laser beam intensity, and said provisional optimum equalizer coefficient, generates a fifth driving signal for said magnetic head to generate a magnetic field having the maximum magnetic field intensity, modulated by a record signal, and provides said fifth driving signal to said magnetic head drive circuit, generates a sixth driving signal having said optimum phase difference from said fifth driving signal for said optical head to emit a pulse beam whose intensity is altered, and provides said sixth driving signal to said laser drive circuit, generates a seventh driving signal having an optimum phase difference from said fifth driving signal for said optical head to emit a pulse beam having an optimum intensity to record a signal to said magneto-optical recording medium, determined using the optimum phase difference between said first and second driving signals, said provisional optimum laser beam intensity and said provisional optimum equalizer coefficient, and provides said seventh driving signal to said laser drive circuit, controls said servo circuit so as to record a signal in an order of a land of said magneto-optical recording medium, a first groove adjacent to said land, and a second groove adjacent to said land, or in the order of a groove of said magneto-optical recording medium, a first land adjacent to said groove, and a second land adjacent to said groove according to said fifth and seventh driving signals, after recording a signal to said land of said magneto-optical recording medium, said first groove adjacent to said land and said second groove adjacent to said land, or to said groove of said magneto-optical recording medium, said first land adjacent to said groove and said second land adjacent to said groove according to said fifth and seventh driving signals, generates an eighth driving signal by a laser beam whose intensity is altered and determining a provisional optimum laser beam intensity according to the reproduced magneto-optical signal, generates a ninth chiming signal for said optical head to emit a laser beam of an optimum intensity to reproduce a signal recorded at said land or said groove, and provides said ninth driving signal to said laser chive circuit, sets the equalizer coefficient of said equalizer to the optimum equalizer coefficient determined from a magneto-optical signal which is a reproduction by said optical head according to said ninth driving signal of said signal recorded at said land or said groove, generates a tenth driving signal having a phase identical to the phase of said fifth driving signal for said magnetic head to generate a magnetic field modulated by a record signal to be altered in intensity, and provides said tenth driving signal to said magnetic head drive circuit, determines an optimum magnetic field intensity to record a signal from a magneto-optical signal corresponding to a signal recorded at said magneto-optical recording medium according to said seventh and tenth driving signals reproduced by said optical head according to said ninth driving signal, and generates an eleventh driving signal having the determined intensity, and a phase identical to the phase of said fifth driving signal, following determination of said optimum phase difference and said optimum equalizer coefficient, and generation of said seventh driving signal, said ninth driving signals and said eleventh driving signal for said land or said groove, determines a provisional optimum laser beam intensity for a groove or a land, determines a pulse beam having the optimum intensity and a laser beam having the optimum intensity based on the determined provisional optimum laser beam intensity, and generates a twelfth driving signal to generate a pulse beam having the optimum intensity and a thirteenth driving signal to generate a laser beam having the optimum intensity, recording and/or reproducing a signal to and/or from said magneto-optical recording medium according to said optimum phase difference, said optimum equalizer coefficient, said seventh driving signal, said ninth driving signal, said eleventh driving signal, said twelfth driving signal and said thirteenth driving signal.

6. A recording/reproduction apparatus recording and/or reproducing a signal to and/or from a magneto-optical recording medium, comprising:

an optical head emitting a laser beam to said magneto-optical recording medium and detecting reflected light therefrom, a laser drive circuit driving a semiconductor laser in said optical head, a magnetic head applying a magnetic field to said magneto-optical recording medium, a magnetic head drive circuit driving said magnetic head, an equalizer removing waveform interference of a magneto-optical signal reproduced by said optical head, a servo circuit controlling tracking of a laser beam emitted from said optical head, and a control circuit wherein said control circuit generates a first diving signal for said magnetic head to generate a magnetic field of a predetermined intensity modulated by a record signal, and provides said first driving signal to said magnetic head drive circuit, generates a second driving signal having an optimum phase difference from said first driving signal of said optical head to emit a pulse beam of a predetermined intensity, and provides said second driving signal to said laser drive circuit, after a signal is recorded on said magneto-optical recording medium by said first and second driving signals, generates a third driving signal altering intensity of the laser beam to reproduce the recorded signal and generates a fourth driving signal to set a provisional optimum laser beam intensity to reproduce the recorded signal, and provides said fourth driving signal to said laser chive circuit, determines a provisional optimum equalizer coefficient in removing waveform interference of a magneto-optical signal reproduced from said magneto-optical recording medium using a laser beam according to said fourth driving signal by said optical head, and sets the equalizer coefficient of said equalizer to the predetermined provisional optimum equalizer coefficient, following determination of the optimum phase difference between said first driving signal and said second driving signal, said provisional optimum laser beam intensity, and said provisional optimum equalizer coefficient, generates a fifth driving signal for said magnetic head to generate a magnetic field having the maximum magnetic field intensity, modulated by a record signal, and provides said fifth diving signal to said magnetic head drive circuit, generates a sixth driving signal having said optimum phase difference from said fifth driving signal for said optical head to emit a pulse beam whose intensity is altered, and provides said sixth driving signal to said laser drive circuit, generates a seventh driving signal having an optimum phase difference from said fifth driving signal for said optical head to emit a pulse beam having an optimum intensity to record a signal to said magneto-optical recording medium, determined using the optimum phase difference between said first and second driving signals, said provisional optimum laser beam intensity and said provisional optimum equalizer coefficient, and provides said seventh driving signal to said laser drive circuit, controls said servo circuit so as to record a signal in an order of a land of said magneto-optical recording medium, a first groove adjacent to said land, and a second groove adjacent to said land, or in the order of a groove of said magneto-optical recording medium, a first land adjacent to said groove, and a second land adjacent to said groove according to said fifth and seventh driving signals, after recording a signal to said land of said magneto-optical recording medium, said first groove adjacent to said land and said second groove adjacent to said land, or to said groove of said magneto-optical recording medium, said first land adjacent to said groove and said second land adjacent to said groove according to said fifth and seventh driving signals, generates an eighth driving signal by a laser beam whose intensity is altered and determining a provisional optimum laser beam intensity according to the reproduced magneto-optical signal, generates a ninth driving signal for said optical head to emit a laser beam of an optimum intensity to reproduce a signal recorded at said land or said groove, and provides said ninth driving signal to said laser dive circuit, sets the equalizer coefficient of said equalizer to the optimum equalizer coefficient determined from a magneto-optical signal which is a reproduction by said optical head according to said ninth driving signal of said signal recorded at said land or said groove, generates a tenth driving signal having a phase identical to the phase of said fifth driving signal for said magnetic head to generate a magnetic field modulated by a record signal to be altered in intensity, and provides said tenth driving signal to said magnetic head drive circuit, determines an optimum magnetic field intensity to record a signal from a magneto-optical signal corresponding to a signal recorded at said magneto-optical recording medium according to said seventh and tenth driving signals reproduced by said optical head according to said ninth driving signal, and generates an eleventh driving signal having the determined intensity, and a phase identical to the phase of said fifth driving signal, following determination of said optimum phase difference and said optimum equalizer coefficient, and generation of said seventh driving signal, said ninth driving signals and said eleventh driving signal for said land or said groove, determines a provisional optimum laser beam intensity for a groove or a land, determines a pulse beam having the optimum intensity and a laser beam having the optimum intensity based on the determined provisional optimum laser beam intensity, and generates a twelfth driving signal to generate a pulse beam having the optimum intensity and a thirteenth driving signal to generate a laser beam having the optimum intensity, recording and/or reproducing a signal to and/or from said magneto-optical recording medium according to said optimum phase difference, said optimum equalizer coefficient, said seventh driving signal, a fourteenth driving signal of a phase identical to the phases of said ninth and twelfth driving signals, and having an amplitude of the average of the amplitudes of said ninth driving signal and said twelfth driving signal, and a fifteenth driving signal of a phase identical to the phases of said eleventh and thirteenth driving signals, and having an amplitude of the average of the amplitudes of said eleventh and thirteenth driving signals.

7. A recording/reproduction method of recording and/or reproducing a signal to and/or from a magneto-optical recording medium, comprising:

a first step of determining an optimum phase difference between a pulse beam and a magnetic field to record a signal to said magneto-optical recording medium, a second step of recording a signal to said magneto-optical recording medium using the optimum phase difference determined at said first step, reproducing the recorded signal by a laser beam with altered intensity, and determining a provisional optimum laser beam intensity according to a reproduced magneto-optical signal, a third step of recording a signal to said magneto-optical recording medium using the optimum phase difference determined at said first step, and determining a provisional optimum equalizer coefficient of an equalizer removing waveform interference of a magneto-optical signal corresponding to the recorded signal reproduced using the provisional optimum laser beam intensity determined at said second step, a fourth step of recording a signal in an order of a land of said magneto-optical recording medium, a first groove adjacent to said land, and a second groove adjacent to said land using the optimum phase difference determined at said first step with the intensity of the pulse beam altered, and determining an optimum pulse beam intensity to record a signal according to a magneto-optical signal corresponding to reproduction of the signal recorded at said land using the provisional optimum laser beam intensity determined at said second step and the provisional optimum equalizer coefficient determined at said third step, a fifth step of recording a signal in an order of said land, said first groove and said second groove using the pulse beam having the optimum intensity determined at said fourth step and the magnetic field having the optimum phase difference from said pulse beam determined at said first step and a maximum intensity modulated by a recording signal, reproducing said signal recorded in said land with the intensity of the laser beam altered, and determining an optimum laser beam intensity to reproduce a signal according to a magneto-optical signal removed of waveform interference corresponding to the reproduced magneto-optical signal using the provisional optimum equalizer coefficient determined at said third step, a sixth step of recording a signal in an order of said land, said first groove and said second groove using a pulse beam having the optimum intensity determined at said fourth step and a magnetic field having the optimum phase difference from said pulse beam determined at said first step, and a maximum intensity modulated by the recording signal, reproducing said signal recorded in said land using a laser beam of the optimum intensity determined at said fifth step, and determining an optimum equalizer coefficient according to a magneto-optical signal removed of waveform interference with the equalizer coefficient altered corresponding to the reproduced magneto-optical signal, and a seventh step of recording a signal in an order of said land, said first groove and said second groove using a pulse beam having the optimum intensity determined at said fourth step and a magnetic field having the optimum phase difference from said pulse beam determined at said first step and an intensity modulated by a record signal to be altered, reproducing said signal recorded in said land using a laser beam of the optimum intensity determined at said fifth step, and determining an optimum magnetic field intensity according to a magneto-optical signal removed of waveform interference corresponding to the reproduced magneto-optical signal using an optimum equalizer coefficient determined at said sixth step, recording and/or reproducing a signal to and/or from said magneto-optical recording medium according to the phase difference determined at said first step, the optimum pulse beam intensity determined at said fourth step, the optimum laser beam intensity determined at said fifth step, the optimum equalizer coefficient determined at said sixth step, and the optimum magnetic field intensity determined at said seventh step.

8. A recording/reproduction method of recording and/or reproducing a signal to and/or from a magneto-optical recording medium, comprising:

a land condition determination step determining condition in recording and/or reproducing a signal to and/or from a land of said magneto-optical recording medium, and a groove condition determination step of determining condition in recording and/or reproducing a signal to and/or from a groove of said magneto-optical recording medium, wherein said land condition determination step comprises:

a first step of determining an optimum phase difference between a pulse beam and a magnetic field to record a signal to said magneto optical recording medium, a second step of recording a signal to said magneto-optical recording medium using the optimum phase difference determined at said first step, reproducing the recorded signal by a laser beam with altered intensity, and determining a provisional optimum laser beam intensity according to a reproduced magneto-optical signal, a third step of recording a signal to said land of said magneto-optical recording medium using the optimum phase difference determined at said first step, and determining a provisional optimum equalizer coefficient of an equalizer removing waveform interference of a magneto-optical signal corresponding to the recorded signal reproduced using the provisional optimum laser beam intensity determined at said second step, a fourth step of recording a signal in an order of a land of said magneto-optical recording medium, a first groove adjacent to said land, and a second groove adjacent to said land using the optimum phase difference determined at said first step with the intensity of the pulse beam altered, and determining an optimum pulse beam intensity to record a signal according to a magneto-optical signal corresponding to reproduction of the signal recorded at said land using the provisional optimum laser beam intensity determined at said second step and the provisional optimum equalizer coefficient determined at said third step, a fifth step of recording a signal in an order of said land, said first groove and said second groove using the pulse beam having the optimum intensity determined at said fourth step and the magnetic field having the optimum phase difference from said pulse beam determined at said first step and a maximum intensity modulated by a recording signal, reproducing said signal recorded in said land with the intensity of the laser beam altered, and determining an optimum laser beam intensity to reproduce a signal according to a magneto-optical signal removed of waveform interference corresponding to the reproduced magneto-optical signal using the provisional optimum equalizer coefficient determined at said third step, a sixth step of recording a signal in an order of said land, said first groove and said second groove using a pulse beam having the optimum intensity determined at said fourth step and a magnetic field having the optimum phase difference determined at said first step from said pulse beam, and a maximum intensity modulated by the recording signal, reproducing said signal recorded in said land using a laser beam of the optimum intensity determined at said fifth step, and determining an optimum equalizer coefficient according to a magneto-optical signal whose waveform interference was removed with the equalizer coefficient altered corresponding to the reproduced magneto-optical signal, and a seventh step of recording a signal in an order of said land, said first groove and said second groove using a pulse beam having the optimum intensity determined at said fourth step and a magnetic field having the optimum phase difference determined at said first step from said pulse beam and an intensity modulated by a record signal to be altered, reproducing said signal recorded in said land using a laser beam of the optimum intensity determined at said fifth step, and determining an optimum magnetic field intensity according to a reproduced magneto-optical signal whose waveform interference was removed using an optimum equalizer coefficient determined at said sixth step, wherein said groove condition determination step comprises:

an eighth step of recording a signal at a groove of said magneto-optical recording medium using the optimum phase difference determined at said first step, reproducing the recorded signal by a laser beam whose intensity is altered, and determining a provisional optimum laser beam intensity according to the reproduced magneto-optical signal, a ninth step of sequentially recording a signal at said magneto-optical recording medium in an order of a groove, a first land adjacent to said groove, and a second land adjacent to said groove using the optimum phase difference determined at said first step with the intensity of the pulse beam altered, and determining the optimum pulse beam intensity to record a signal according to a magneto-optical signal reproduced corresponding to the signal recorded at said groove using the provisional optimum laser beam intensity determined at said eighth step and the optimum equalizer coefficient determined at said sixth step, and a tenth step recording a signal in the order of said groove, said first land and said second land using the pulse beam having the optimum intensity determined at said ninth step and the magnetic field having the optimum phase difference from said pulse beam determined at said first step, and the maximum intensity modulated by a recording signal, reproducing the signal recorded at said groove with the intensity of the laser beam altered, and determining the optimum laser beam intensity to reproduce a signal according to a reproduced magneto-optical signal whose waveform interference was removed using the optimum equalizer coefficient determined at said sixth step, wherein a signal is recorded and/or reproduced to and/or from said magneto-optical recording medium using the phase difference determined at said first step, the optimum pulse beam intensity determined at said fourth step, the optimum laser beam intensity determined at said fifth step, the optimum equalizer coefficient determined at said sixth step, the optimum magnetic field intensity determined at said seventh step, the optimum pulse beam intensity determined at said ninth step, and the optimum laser beam intensity determined at said tenth step.

9. A recording/reproduction method of recording and/or reproducing a signal to and/or from a magneto-optical recording medium, comprising:

a land condition determination step determining conditions in recording and/or reproducing a signal to and/or from a land of said magneto-optical recording medium, and a groove condition determination step of determining conditions in recording and/or reproducing a signal to and/or from a groove of said magneto-optical recording medium, wherein said land condition determination step comprises:

a first step of determining an optimum phase difference between a pulse beam and a magnetic field to record a signal to said magneto optical recording medium, a second step of recording a signal to said magneto-optical recording medium using the optimum phase difference determined at said first step, reproducing the recorded signal by a laser beam with altered intensity, and determining a provisional optimum laser beam intensity according to a reproduced magneto-optical signal, a third step of recording a signal to a land of said magneto-optical recording medium using the optimum phase difference determined at said first step, and determining a provisional optimum equalizer coefficient of an equalizer removing waveform interference of a magneto-optical signal corresponding to the recorded signal reproduced using the provisional optimum laser beam intensity determined at said second step, a fourth step of recording a signal in an order of a land of said magneto-optical recording medium, a first groove adjacent to said land, and a second groove adjacent to said land using the optimum phase difference determined at said first step with the intensity of the pulse beam altered, and determining an optimum pulse beam intensity to record a signal according to a magneto-optical signal corresponding to reproduction of the signal recorded at said land using the provisional optimum laser beam intensity determined at said second step and the provisional optimum equalizer coefficient determined at said third step, a fifth step of recording a signal in an order of said land, said first groove and said second groove using the pulse beam having the optimum intensity determined at said fourth step and the magnetic field having the optimum phase difference from said pulse beam determined at said first step and a maximum intensity modulated by a recording signal, reproducing said signal recorded in said land with the intensity of the laser beam altered, and determining an optimum laser beam intensity to reproduce a signal according to a reproduced magneto-optical signal whose waveform interference was removed using the provisional optimum equalizer coefficient determined at said third step, a sixth step of recording a signal in an order of said land, said first groove and said second groove using a pulse beam having the optimum intensity determined at said fourth step and a magnetic field having the optimum phase difference determined at said first step from said pulse beam, and a maximum intensity modulated by the recording signal, reproducing said signal recorded in said land using a laser beam of the optimum intensity determined at said fifth step, and determining an optimum equalizer coefficient according to a reproduced magneto-optical signal whose waveform interference was removed with the equalizer coefficient altered, and a seventh step of recording a signal in an order of said land, said first groove and said second groove using a pulse beam having the optimum intensity determined at said fourth step and a magnetic field having the optimum phase difference determined at said first step from said pulse beam and an intensity modulated by a record signal to be altered, reproducing said signal recorded in said land using a laser beam of the optimum intensity determined at said fifth step, and determining an optimum magnetic field intensity according to a reproduced magneto-optical signal whose waveform interference was removed using an optimum equalizer coefficient determined at said sixth step, wherein said groove condition determination step comprises:

an eighth step of recording a signal at a groove of said magneto-optical recording medium using the optimum phase difference determined at said first step, reproducing the recorded signal by a laser beam whose intensity is altered, and determining a provisional optimum laser beam intensity according to the reproduced optical signal, a ninth step of sequentially recording a signal on said magneto-optical recording medium in an order of a groove, a first land adjacent to said groove, and a second land adjacent to said groove using the optimum phase difference determined at said first step with the intensity of the pulse beam altered, and determining the optimum pulse beam intensity to record a signal according to a magneto-optical signal reproduced corresponding to the signal recorded at said groove using the provisional optimum laser beam intensity determined at said eighth step and the optimum equalizer coefficient determined at said sixth step, and a tenth step recording a signal in the order of said groove, said first land and said second land using the pulse beam having the optimum intensity determined at said ninth step and the magnetic field having the optimum phase difference from said pulse beam determined at said first step, and the maximum intensity modulated by a recording signal, reproducing the signal recorded at said groove with the intensity of the laser beam altered, and determining the optimum laser beam intensity to reproduce a signal according to a magneto-optical signal removed of waveform interference corresponding to the reproduced magneto-optical signal using the optimum equalizer coefficient determined at said sixth step, wherein a signal is recorded and/or reproduced to and/or from said magneto-optical recording medium using the phase difference determined at said first step, the optimum laser beam intensity determined at said fifth step, the optimum equalizer coefficient determined at said sixth step, the optimum magnetic field intensity determined at said seventh step, the average of the optimum pulse beam intensity determined at said fourth step and the optimum pulse beam intensity determined at said ninth step, and the optimum laser beam intensity determined at said tenth step.

* * * * *